US012715960B2

(12) United States Patent
Yagyu et al.

(10) Patent No.: US 12,715,960 B2
(45) Date of Patent: Aug. 25, 2026

(54) FLUORINE-CONTAINING ETHER COMPOUND, LUBRICANT FOR MAGNETIC RECORDING MEDIUM AND MAGNETIC RECORDING MEDIUM

(71) Applicant: Resonac Corporation, Tokyo (JP)

(72) Inventors: Daisuke Yagyu, Tokyo (JP); Tsuyoshi Kato, Tokyo (JP); Naoya Fukumoto, Tokyo (JP); Ayano Asano, Tokyo (JP); Masaki Nanko, Tokyo (JP); Yutaka Tanji, Tokyo (JP); Shoko Uetake, Tokyo (JP)

(73) Assignee: Resonac Corporation, Tokyo (JP)

( * ) Notice: Subject to any disclaimer, the term of this patent is extended or adjusted under 35 U.S.C. 154(b) by 679 days.

(21) Appl. No.: 18/267,704

(22) PCT Filed: Dec. 13, 2021

(86) PCT No.: PCT/JP2021/045798
§ 371 (c)(1),
(2) Date: Jun. 15, 2023

(87) PCT Pub. No.: WO2022/131202
PCT Pub. Date: Jun. 23, 2022

(65) Prior Publication Data

US 2024/0101759 A1 Mar. 28, 2024

(30) Foreign Application Priority Data

Dec. 18, 2020 (JP) ................................ 2020-210570

(51) Int. Cl.
*C08G 65/22* (2006.01)
*C10M 107/38* (2006.01)
(Continued)

(52) U.S. Cl.
CPC ......... *C08G 65/226* (2013.01); *C10M 107/38* (2013.01); *C10M 2213/0606* (2013.01); *C10N 2040/18* (2013.01); *C10N 2050/025* (2020.05)

(58) Field of Classification Search
None
See application file for complete search history.

(56) References Cited

U.S. PATENT DOCUMENTS 8,513,471 B2 * 8/2013 Tonelli ............... C08G 65/3312 568/619
11,820,953 B2 * 11/2023 Shibata ................ G11B 5/7257

FOREIGN PATENT DOCUMENTS

JP 2004-253110 A 9/2004
JP 2006-202372 A 8/2006
(Continued)

*Primary Examiner* — Randy P Gulakowski
*Assistant Examiner* — Audra J Destefano
(74) *Attorney, Agent, or Firm* — Sughrue Mion, PLLC

(57) ABSTRACT

The present invention provides a fluorine-containing ether compound represented by the following Formula. $R^1$-[B]-[A]-$CH_2$—$R^2$—$CH_2$-[C]-[D]-$R^3$ ($R^2$ is a perfluoropolyether chain; [A] is Formula (2-1); [B] is Formula (2-2); [C] is Formula (3-1); [D] is Formula (3-2); $R^3$ is Formula (4); and $R^1$ is a terminal group.)

(2-1)

(2-2)

(Continued)

-continued (3-1)

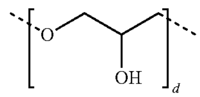

(3-2)

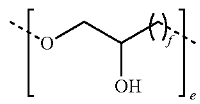

(4)

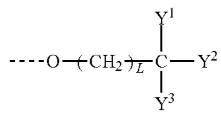

16 Claims, 1 Drawing Sheet

(51) Int. Cl.
*C10N 40/18* (2006.01)
*C10N 50/00* (2006.01)

(56) References Cited

FOREIGN PATENT DOCUMENTS

| | | | |
|---|---|---|---|
| JP | 4632144 | B2 | 2/2011 |
| JP | 5334064 | B | 6/2013 |
| JP | 5465454 | B2 | 9/2014 |
| JP | 5909837 | B2 | 4/2016 |
| JP | 2018-521183 | A | 8/2018 |
| WO | 2017/145995 | A1 | 8/2017 |
| WO | 2017/154403 | A1 | 9/2017 |
| WO | 2019/039200 | A1 | 2/2019 |
| WO | 2019/049585 | A1 | 3/2019 |
| WO | 2019/054148 | A1 | 3/2019 |
| WO | 2020/184653 | A1 | 9/2020 |
| WO | 2021/054202 | A1 | 3/2021 |
| WO | 2021/090940 | A1 | 5/2021 |
| WO | 2021/131961 | A1 | 7/2021 |

* cited by examiner

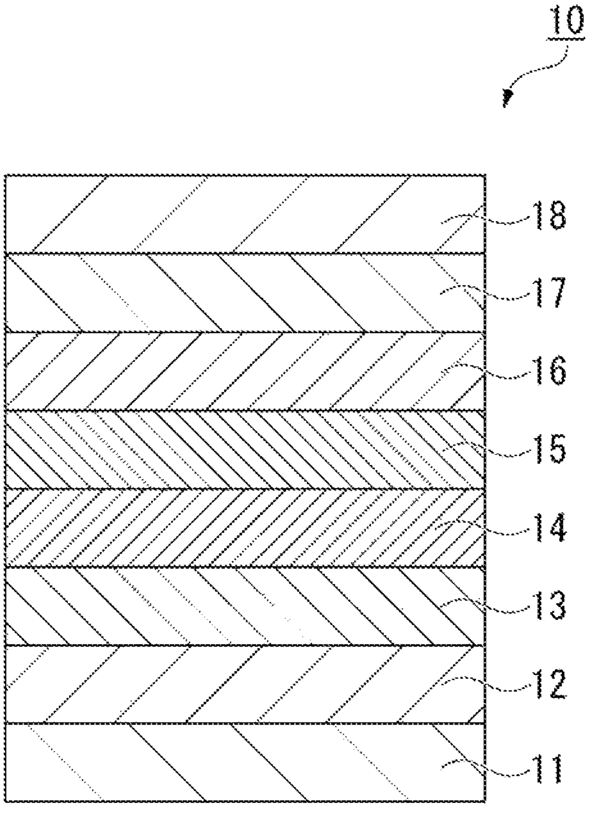
10
18
17
16
15
14
13
12
11

FLUORINE-CONTAINING ETHER COMPOUND, LUBRICANT FOR MAGNETIC RECORDING MEDIUM AND MAGNETIC RECORDING MEDIUM

CROSS REFERENCE TO RELATED APPLICATIONS

This application is a National Stage of International Application No. PCT/JP2021/045798 filed Dec. 13, 2021, claiming priority based on Japanese Patent Application No. 2020-210570 filed Dec. 18, 2020.

TECHNICAL FIELD

The present invention relates to a fluorine-containing ether compound, a lubricant for a magnetic recording medium and a magnetic recording medium.

BACKGROUND ART

In recent years, the amount of information processing via the Internet has increased dramatically. Accordingly, the development of recording media for storing information has been focused on. In particular, magnetic recording media, which are a type of recording media, are expected to serve as a receiver for increasing amounts of information because they can store a large amount of information at a low cost.

Generally, in order to secure the durability and reliability of the magnetic recording medium, a protective layer and a lubricating layer are provided on the magnetic layer (magnetic recording layer) of the magnetic recording medium. The lubricating layer arranged as the outermost surface of the magnetic recording medium is required to have various characteristics such as long-term stability, chemical substance resistance (preventing contamination with siloxane or the like), wear resistance, and heat resistance.

Conventionally, a lubricant which includes a compound having a polar group such as a hydroxyl group at a terminal of a fluorine polymer having a repeating structure containing $CF_2$ has been proposed as a lubricant for a magnetic recording medium (for example, refer to Patent Documents 1 to 7).

Patent Document 1 discloses a compound having a plurality of hydroxyl groups at both terminal moieties of a fluorine polymer and arranged such that the shortest distance between the hydroxyl groups is 3 atoms or more.

Patent Document 2 discloses a fluoropolyether compound having an aromatic group at one terminal of a fluorine polymer and a hydroxyl group at the other terminal thereof.

Patent Document 3 discloses a compound having a perfluoropolyether main chain and having an aromatic group and a hydroxyl group at terminals of a molecule, and in which the aromatic group and the hydroxyl group are bonded to different carbon atoms.

Patent Document 4 discloses a fluorine-containing ether compound having a perfluoropolyether chain. At one end of the perfluoropolyether chain, a terminal group containing an organic group having at least one double bond or triple bond is arranged via a divalent linking group which is bonded by an etheric oxygen. At the other end of the perfluoropolyether chain, a terminal group is arranged which includes 2 or 3 polar groups and in which respective polar groups are bonded to different carbon atoms, and the carbon atoms to which the polar groups are bonded are bonded via a linking group including carbon atoms to which no polar group is bonded.

Patent Document 5 discloses a fluorine-containing ether compound having a perfluoropolyether chain. As the terminal group located at both ends of the fluorine-containing ether compound, any of an optionally substituted alkyl group, an organic group having at least one double bond or triple bond, and a hydrogen atom is arranged. In addition, a linking group including a hydroxyl group is arranged between the perfluoropolyether chain and the terminal group located at both ends.

Patent Document 6 discloses a fluorine-containing ether compound having a perfluoropolyether chain. At one end of the perfluoropolyether chain, an alkyl group which may have a substituent is arranged via a divalent linking group. At the other end of the perfluoropolyether chain, a terminal group is arranged which includes 2 or 3 polar groups and in which respective polar groups are bonded to different carbon atoms, and the carbon atoms to which the polar groups are bonded are bonded via a linking group including carbon atoms to which no polar groups are bonded.

Patent Document 7 discloses a fluorine-containing ether compound having a perfluoropolyether chain. As at least one of the terminal groups of the fluorine-containing ether compound, a group in which one or more hydrogen atoms of an organic group having 1 to 8 carbon atoms are substituted with a cyano group is arranged. In addition, a divalent linking group having a polar group is arranged between the perfluoropolyether chain and the terminal group.

Patent Document 8 discloses a method of producing a polyol perfluoropolyether compound useful as a lubricant for a magnetic medium. Patent Document 8 describes that a polyol (per)fluoropolyether derivative is produced by reacting a triol with an activating agent to synthesize an activated protected triol, and performing a nucleophilic substitution reaction with hydroxyl groups arranged at both ends of a functional perfluoropolyether.

CITATION LIST

Patent Document

Patent Document 1: Japanese Patent No. 4632144

Patent Document 2: Japanese Patent No. 5909837

Patent Document 3: Japanese Patent No. 5465454

Patent Document 4: PCT International Publication No. WO2017/154403

Patent Document 5: PCT International Publication No. WO2019/054148

Patent Document 6: PCT International Publication No. WO2019/049585

Patent Document 7: PCT International Publication No. WO2019/039200

Patent Document 8: Japanese Patent No. 5334064

SUMMARY OF INVENTION

Technical Problem

In recent years, due to the diversity of applications of magnetic recording media, environmental resistance required for magnetic recording media has become extremely severe. Accordingly, the lubricating layer, which greatly influences the reliability and durability of the magnetic recording medium, is required to have further improved long-term stability.

As indexes for long-term stability of the lubricating layer, pickup characteristics and spin-off characteristics are known. Pickup is a phenomenon in which a lubricant adheres to a magnetic head as foreign matter (smear). Pickup influences flight stability of the magnetic head. Spin-off is a phenomenon in which a lubricant scatters and evaporates due to a centrifugal force and heat generated according to rotation of the magnetic recording medium. If spin-off occurs, since the film thickness of the lubricating layer is reduced, chemical substance resistance and wear resistance of the lubricating layer deteriorate.

In addition, in recent years, in order to increase the capacity of the magnetic recording medium, further reduction in the magnetic spacing (distance between the magnetic head and the magnetic layer of the magnetic recording medium) and increase in the rotational speed of the magnetic recording medium have been required. However, when the flying height of the magnetic head decreases, pickup is more likely to occur. In addition, when the rotational speed of the magnetic recording medium increases, spin-off is more likely to occur.

The present invention has been made in view of the above circumstances, and an object of the present invention is to provide a fluorine-containing ether compound which allows a lubricating layer in which pickup and spin-off are less likely to occur to be formed and is suitably used as a material of a lubricant for a magnetic recording medium.

In addition, an object of the present invention is to provide a lubricant for a magnetic recording medium containing a fluorine-containing ether compound of the present invention.

In addition, an object of the present invention is to provide a magnetic recording medium having a lubricating layer containing a fluorine-containing ether compound of the present invention.

Solution to Problem

A first aspect of the present invention provides the following fluorine-containing ether compound.

[1] A fluorine-containing ether compound represented by Formula (1) shown below:

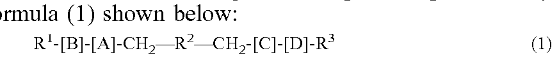

$$R^1\text{-[B]-[A]-}CH_2\text{—}R^2\text{—}CH_2\text{-[C]-[D]-}R^3 \quad (1)$$

(in Formula (1), $R^2$ is a perfluoropolyether chain; [A] is represented by Formula (2-1) shown below, and in Formula (2-1), a is an integer of 0 to 3; [B] is represented by Formula (2-2) shown below, and in Formula (2-2), b is an integer of 0 to 3, and c is an integer of 2 to 5; provided that, a sum of values of a and b is 1 to 3; in Formula (1), [A] and [B] may be interchanged; [C] is represented by Formula (3-1) shown below, and in Formula (3-1), d is an integer of 0 to 2; [D] is represented by Formula (3-2) shown below, and in Formula (3-2), e is an integer of 0 to 2, and f is an integer of 2 to 5; provided that, a sum of values of d and e is 1 or 2; in Formula (1), [C] and [D] may be interchanged; $R^3$ is a branched terminal group having 3 to 30 carbon atoms and represented by Formula (4) shown below; in Formula (4), L represents an integer of 0 to 6; in Formula (4), $Y^1$ and $Y^2$ are each independently a hydrocarbon group containing one primary hydroxyl group and optionally containing an ether oxygen atom; in Formula (4), $Y^3$ is a hydrogen atom or a hydrocarbon group containing one primary hydroxyl group and optionally containing an ether oxygen atom; and $R^1$ and $R^3$ are terminal groups which may be the same or may be different from each other)

(2-1)

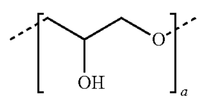

-continued (2-2)

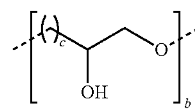

(3-1)

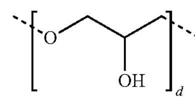

(3-2)

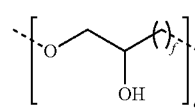

(4)

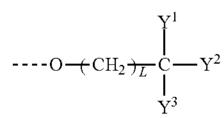

The fluorine-containing ether compound of the first aspect of the present invention preferably has characteristics described in [2] to [13] below. It is also preferable to arbitrarily combine two or more characteristics described in [2] to [13] below.

[2] The fluorine-containing ether compound according to [1], wherein, in Formula (1), $R^3$ is a branched terminal group of any of Formulae (5-1) to (5-3) shown below:

(5-1)

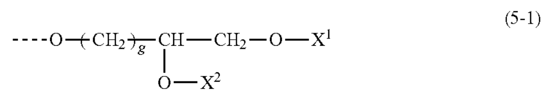

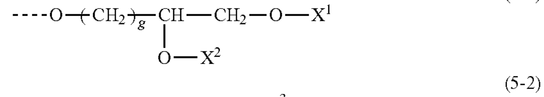

(5-2)

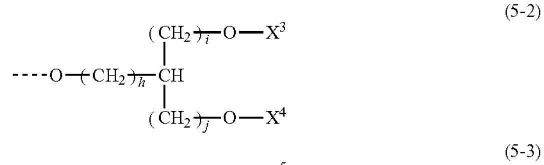

(5-3)

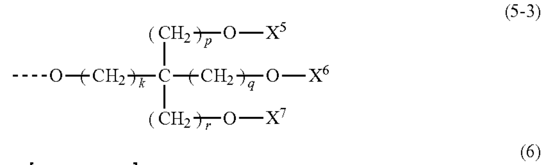

(6)

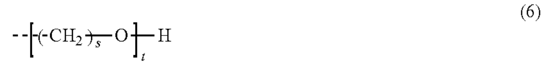

(in Formula (5-1), g represents an integer of 1 to 6; $X^1$ and $X^2$ are represented by Formula (6); and $X^1$ and $X^2$ may be the same or may be different from each other)

(in Formula (5-2), h represents an integer of 0 to 6; i and j each independently represents an integer of 1 to 6; $X^3$ and $X^4$ are a hydrogen atom or represented by Formula (6); and $X^3$ and $X^4$ may be the same or may be different from each other)

(in Formula (5-3), k represents an integer of 0 to 6; p, q and r each independently represents an integer of 1 to 6; $X^5$, $X^6$ and $X^7$ are a hydrogen atom or represented by Formula (6); $X^5$, $X^6$ and $X^7$ may be different from each other, or some or all of them may be the same)

(in Formula (6), s represents an integer of 2 to 6, and t represents 1 or 2).

[3] The fluorine-containing ether compound according to [1] or [2], wherein, in Formula (1), $R^1$ is a branched terminal group having 3 to 30 carbon atoms, and represented by Formula (4).

[4] The fluorine-containing ether compound according to [2], wherein, in Formula (1), both $R^1$ and $R^3$ are a branched terminal group of any of Formulae (5-1) to (5-3).

[5] The fluorine-containing ether compound according to any one of [1] to [4], wherein, in Formula (1), $R^1$-[B]-[A]- and -[C]-[D]-$R^3$ are the same.

[6] The fluorine-containing ether compound according to [1] or [2], wherein $R^1$ in Formula (1) is represented by Formula (7) shown below:

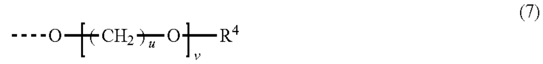

(7)

(in Formula (7), u represents an integer of 2 to 6, v represents 0 or 1; $R^4$ is any of a hydrogen atom, an alkyl group which may have a substituent containing no hydroxyl group, and an organic group having at least one double bond or triple bond; and the alkyl group and the organic group may be linear or branched).

[7] The fluorine-containing ether compound according to [6], wherein $R^4$ in Formula (7) is an alkyl group having 1 to 6 carbon atoms.

[8] The fluorine-containing ether compound according to [6], wherein $R^4$ in Formula (7) is an alkyl group having a substituent and having 1 to 6 carbon atoms, and the substituent is a fluoro group or a cyano group.

[9] The fluorine-containing ether compound according to [6], wherein $R^4$ in Formula (7) is any of an aromatic hydrocarbon-containing organic group having 6 to 12 carbon atoms, an aromatic heterocycle-containing organic group having 3 to 10 carbon atoms, an alkenyl group having 2 to 8 carbon atoms, and an alkynyl group having 3 to 8 carbon atoms.

[10] The fluorine-containing ether compound according to [6], wherein $R^4$ in Formula (7) is one group selected from the group consisting of a methyl group, ethyl group, n-propyl group, isopropyl group, 2,2,2-trifluoroethyl group, 2,2,3,3,3-pentafluoropropyl group, 2,2,2,2,2,2-hexafluoroisopropyl group, 2-cyanoethyl group, 3-cyanopropyl group, 4-cyanobutyl group, phenyl group, methoxyphenyl group, cyanophenyl group, phenethyl group, thienylethyl group, N-methylpyrazolylmethyl group, allyl group, 3-butenyl group, 4-pentenyl group, propargyl group, 3-butynyl group, and 4-pentynyl group.

[11] The fluorine-containing ether compound according to [6], wherein $R^4$ in Formula (7) is a hydrogen atom.

[12] The fluorine-containing ether compound according to any one of [1] to [11], wherein $R^2$ in Formula (1) is any one of Formulae (8-1) to (8-4) shown below:

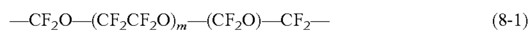

$$—CF_2O—(CF_2CF_2O)_m—(CF_2O)—CF_2— \quad (8\text{-}1)$$

(in Formula (8-1), m and n indicate the average degree of polymerization, and each are 0 to 30, provided that m or n is 0.1 or more)

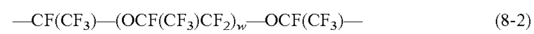

$$—CF(CF_3)—(OCF(CF_3)CF_2)_w—OCF(CF_3)— \quad (8\text{-}2)$$

(in Formula (8-2), w indicates the average degree of polymerization, and is 0.1 to 30)

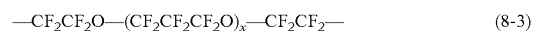

$$—CF_2CF_2O—(CF_2CF_2CF_2O)_x—CF_2CF_2— \quad (8\text{-}3)$$

(in Formula (8-3), x indicates the average degree of polymerization, and is 0.1 to 30)

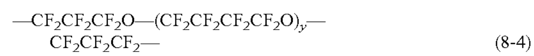

$$—CF_2CF_2CF_2O—(CF_2CF_2CF_2CF_2O)_y—CF_2CF_2CF_2— \quad (8\text{-}4)$$

(in Formula (8-4), y indicates the average degree of polymerization, and is 0.1 to 30)

[13] The fluorine-containing ether compound according to any one of [1] to [12], wherein the number-average molecular weight thereof is in a range of 500 to 10,000.

A second aspect of the present invention provides the following lubricant for a magnetic recording medium.

[14] A lubricant for a magnetic recording medium, comprising the fluorine-containing ether compound according to any one of [1] to [13].

A third aspect of the present invention provides the following magnetic recording medium.

[15] A magnetic recording medium comprising, on a substrate, at least a magnetic layer, a protective layer, and a lubricating layer in this order, wherein the lubricating layer contains the fluorine-containing ether compound according to any one of [1] to [13].

The magnetic recording medium of the third aspect of the present invention preferably has a characteristic described in the following [16].

[16] The magnetic recording medium according to [15], wherein the lubricating layer has an average film thickness of 0.5 nm to 2.0 nm.

Advantageous Effects of Invention

The fluorine-containing ether compound of the present invention is the compound represented by Formula (1) shown above, and is suitable as a material for the lubricant for a magnetic recording medium.

The lubricant for a magnetic recording medium of the present invention contains the fluorine-containing ether compound of the present invention. Therefore, it is possible to form a lubricating layer which has favorable adhesion to the protective layer and can prevent the occurrence of pickup and spin-off.

The magnetic recording medium of the present invention has a lubricating layer which has favorable adhesion to the protective layer and can prevent the occurrence of pickup and spin-off. Therefore, it has excellent reliability and durability.

BRIEF DESCRIPTION OF DRAWING

The FIGURE is a schematic cross-sectional view showing an example of a preferable embodiment of a magnetic recording medium of the present invention.

DESCRIPTION OF EMBODIMENTS

In order to achieve the above objects, the inventors have focused on the relationship between the molecular structure of the fluorine-containing ether compound contained in the lubricating layer and the protective layer, and conducted extensive studies as follows.

Conventionally, in order to obtain a lubricating layer having favorable adhesion to the protective layer, a compound which is based on a perfluoropolyether (hereinafter abbreviated as "PFPE" in some cases) containing a hydroxyl group in the molecule is used as a lubricant. However, the lubricating layer formed using such a conventional lubricant may not have sufficient adhesion to the protective layer. In addition, the inventors conducted intensive studies and as a result, found that pickup and spin-off are likely to occur when the adhesion of the lubricating layer to the protective layer is insufficient.

Therefore, the inventors conducted further studies in order to improve the adhesion of the lubricating layer to the protective layer. As a result, it was found that it is necessary to use a PFPE-based compound which has a hydroxyl group and allows the following functions <1> and <2> to be obtained as a lubricant.

<1> the hydroxyl group in the PFPE-based compound is effectively involved in bonding with active sites on the protective layer.

<2> the hydroxyl group in the PFPE-based compound is involved in the formation of the intermolecular hydrogen bonds between PFPE-based compounds.

Therefore, the inventors conducted extensive studies regarding the molecular structure of the fluorine-containing ether compound in which the functions <1> and <2> are effectively obtained.

As a result, the inventors found that a fluorine-containing ether compound in which specific linking groups having a secondary hydroxyl group are arranged via a methylene group ($—CH_2—$) at both ends of the perfluoropolyether chain, and a branched terminal group having a plurality of primary hydroxyl groups is arranged at at least one terminal is sufficient. Then, the inventors confirmed that the lubricating layer containing such a fluorine-containing ether compound has favorable adhesion to the protective layer and can prevent the occurrence of pickup and spin-off, and completed the present invention.

Hereinafter, a fluorine-containing ether compound, a lubricant for a magnetic recording medium (hereinafter abbreviated as a "lubricant" in some cases) and a magnetic recording medium of the present invention will be described in detail. In addition, the present invention is not limited only to the following embodiments. For example, the present invention is not limited only to the following examples, and numbers, amounts, ratios, compositions, types, positions, materials, configurations and the like can be added, omitted, substituted, and changed without departing from the scope of the present invention.

[Fluorine-Containing Ether Compound]

A fluorine-containing ether compound of the present embodiment is represented by Formula (1) shown below.

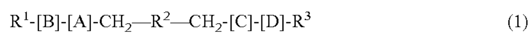

$$R^1\text{-[B]-[A]-}CH_2—R^2—CH_2\text{-[C]-[D]-}R^3 \quad (1)$$

(in Formula (1), $R^2$ is a perfluoropolyether chain; [A] is represented by Formula (2-1) shown below, and in Formula (2-1), a is an integer of 0 to 3; [B] is represented by Formula (2-2) shown below, and in Formula (2-2), b is an integer of 0 to 3, and c is an integer of 2 to 5; provided that, a sum of values of a and b is 1 to 3; in Formula (1), [A] and [B] may be interchanged; [C] is represented by Formula (3-1) shown below, and in Formula (3-1), d is an integer of 0 to 2; [D] is represented by Formula (3-2) shown below, and in Formula (3-2), e is an integer of 0 to 2, and f is an integer of 2 to 5; provided that, a sum of values of d and e is 1 or 2; in Formula (1), [C] and [D] may be interchanged; $R^3$ is a branched terminal group having 3 to 30 carbon atoms and represented by Formula (4) shown below; in Formula (4), L represents an integer of 0 to 6; in Formula (4), $Y^1$ and $Y^2$ are each independently a hydrocarbon group containing one primary hydroxyl group and optionally containing an ether oxygen atom; in Formula (4), $Y^3$ is a hydrogen atom or a hydrocarbon group containing one primary hydroxyl group and optionally containing an ether oxygen atom; and $R^1$ and $R^3$ are terminal groups which may be the same or may be different from each other)

(2-1)

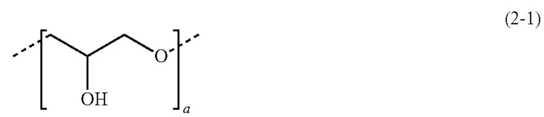

(2-2)

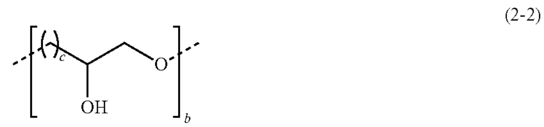

(3-1)

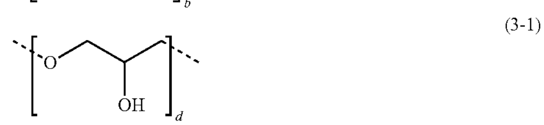

(3-2)

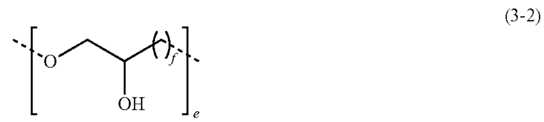

(4)

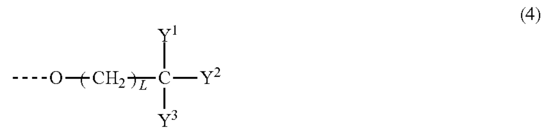

(PFPE Chain Represented by $R^2$)

As shown in Formula (1), the fluorine-containing ether compound of the present embodiment has a PFPE chain represented by $R^2$. When a lubricant containing a fluorine-containing ether compound is applied on a protective layer and a lubricating layer is formed, the PFPE chain covers the surface of the protective layer, imparts lubricity to the lubricating layer, and reduces a frictional force between a magnetic head and the protective layer. The PFPE chain represented by $R^2$ is not particularly limited, and can be appropriately selected depending on the performance required of the lubricant.

The PFPE chain represented by $R^2$ is made of, for example, a perfluoromethylene oxide polymer, a perfluoroethylene oxide polymer, a perfluoro-n-propylene oxide polymer, a perfluoroisopropylene oxide polymer, a perfluoro-n-butylene oxide polymer, or a copolymer thereof.

The PFPE chain may be, for example, a structure represented by the following Formula (Rf) derived from a perfluoroalkylene oxide polymer or copolymer.

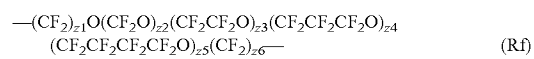

$$—(CF_2)_{z1}O(CF_2O)_{z2}(CF_2CF_2O)_{z3}(CF_2CF_2CF_2O)_{z4}(CF_2CF_2CF_2CF_2O)_{z5}(CF_2)_{z6}— \quad (Rf)$$

(in Formula (Rf), z2, z3, z4, and z5 indicate the average degree of polymerization, and are each independently 0 to 30, provided that z2, z3, z4, and z5 are not all 0 at the same time; z1 and z6 are an average value indicating the number of $—CF_2—$'s, and are each independently 1 to 3; and the arrangement order of the repeating units in Formula (Rf) is not particularly limited)

In Formula (Rf), z2, z3, z4, and z5 indicate the average degree of polymerization, and are each independently 0 to 30, preferably 0 to 20, and more preferably 0 to 15.

In Formula (Rf), z1 and z6 are an average value indicating the number of $—CF_2—$'s and are each independently 1 to 3. In the polymer represented by Formula (Rf), z1 and z6 are determined according to the structure of repeating units arranged at the ends of the chain structure and the like.

In Formula (Rf), $(CF_2O)$, $(CF_2CF_2O)$, $(CF_2CF_2CF_2O)$, and $(CF_2CF_2CF_2CF_2O)$ are repeating units. The arrangement order of the repeating units in Formula (Rf) is not particularly limited. In addition, the number of types of repeating units in Formula (Rf) is not particularly limited.

In Formula (1), $R^2$ is also preferably any one of Formulae (8-1) to (8-5) shown below.

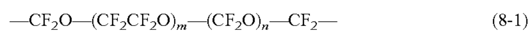

$$—CF_2O—(CF_2CF_2O)_m—(CF_2O)_n—CF_2— \quad (8\text{-}1)$$

(in Formula (8-1), m and n indicate the average degree of polymerization, and each are 0 to 30, provided that m or n is 0.1 or more)

In Formula (8-1), the arrangement order of the repeating units $(CF_2—CF_2—O)$ and $(CF_2—O)$ is not particularly limited. In Formula (8-1), the number m of $(CF_2—CF_2—O)$ and the number n of $(CF_2—O)$ which indicate the average degree of polymerization may be the same or may be different from each other. Formula (8-1) may contain any of a random copolymer, a block copolymer, and an alternating copolymer composed of monomer units $(CF_2—CF_2—O)$ and $(CF_2—O)$.

In Formula (8-1), m indicating the average degree of polymerization is 0 to 30, and is preferably 1 to 20, and more preferably 2 to 15. In Formula (8-1), n indicating the average degree of polymerization is 0 to 30, preferably 0 to 20, and more preferably 0 to 15. In Formula (8-1), if n is 0, m is preferably 1 to 20. For example, as necessary, m and n each may be 1 to 3, 3 to 5, 5 to 10, 10 to 25, or 20 to 30.

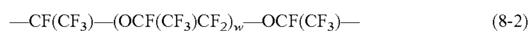

$$—CF(CF_3)—(OCF(CF_3)CF_2)_w—OCF(CF_3)— \quad (8\text{-}2)$$

(in Formula (8-2), w indicates the average degree of polymerization, and is 0.1 to 30)

In Formula (8-2), w indicating the average degree of polymerization is 0.1 to 30. If w is 0.1 to 30, the number-average molecular weight of the fluorine-containing ether compound of the present embodiment tends to fall within a preferable range. w is preferably 1 to 20 and more preferably 2 to 15. As necessary, w may be 1 to 3, 3 to 5, 5 to 10, or 10 to 20.

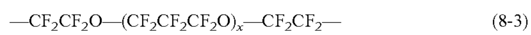

$$—CF_2CF_2O—(CF_2CF_2CF_2O)_x—CF_2CF_2— \quad (8\text{-}3)$$

(in Formula (8-3), x indicates the average degree of polymerization, and is 0.1 to 30)

In Formula (8-3), x indicating the average degree of polymerization is 0.1 to 30. If x is 0.1 to 30, the number-average molecular weight of the fluorine-containing ether compound of the present embodiment tends to fall within a preferable range. x is preferably 1 to 20 and more preferably 2 to 15. As necessary, x may be 1 to 3, 3 to 5, 5 to 10, or 10 to 20.

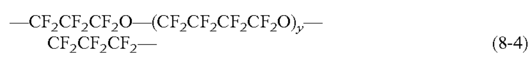

$$—CF_2CF_2CF_2O—(CF_2CF_2CF_2CF_2O)_y—CF_2CF_2CF_2— \quad (8\text{-}4)$$

(in Formula (8-4), y indicates the average degree of polymerization, and is 0.1 to 30)

In Formula (8-4), y indicating the average degree of polymerization is 0.1 to 30. If y is 0.1 to 30, the number-average molecular weight of the fluorine-containing ether compound of the present embodiment tends to fall within a preferable range. y is preferably 1 to 20 and more preferably 2 to 15. As necessary, y may be 1 to 3, 3 to 5, 5 to 10, or 10 to 20.

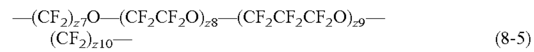

$$—(CF_2)_{z7}O—(CF_2CF_2O)_{z8}—(CF_2CF_2CF_2O)_{z9}—(CF_2)_{z10}— \quad (8\text{-}5)$$

(in Formula (8-5), z8 and z9 indicate the average degree of polymerization, and are each independently 0.1 to 30; z7 and z10 are an average value indicating the number of $—CF_2—$'s, and are each independently 1 to 2)

The arrangement order of the repeating units $(CF_2CF_2O)$ and $(CF_2CF_2CF_2O)$ in Formula (8-5) is not particularly limited. Formula (8-5) may be any of a random copolymer, a block copolymer, and an alternating copolymer composed of monomer units $(CF_2CF_2O)$ and $(CF_2CF_2CF_2O)$. In Formula (8-5), z8 and z9 indicating the average degree of polymerization are each independently 0.1 to 30, preferably 1 to 20, and more preferably 2 to 15. In Formula (8-5), z7 and z10 are an average value indicating the number of $—CF_2—$'s, and are each independently 1 to 2. In the polymer represented by Formula (8-5), z7 and z10 are determined according to the structure of repeating units arranged at the ends of the chain structure and the like.

If $R^2$ in Formula (1) is any of Formulae (8-1) to (8-5), the fluorine-containing ether compound provides a lubricating layer having favorable lubricity. In addition, if $R^2$ in Formula (1) is any of Formulae (8-1) to (8-5), the ratio of the number of oxygen atoms (the number of ether bonds (—O—)) to the number of carbon atoms in the PFPE chain, and the arrangement of oxygen atoms in the PFPE chain are appropriate. Therefore, the fluorine-containing ether compound having appropriate hardness is provided. Therefore, the fluorine-containing ether compound applied on the protective layer is less likely to be aggregated on the protective layer, and it is possible to form an even thinner lubricating layer having sufficient coverage.

In addition, if $R^2$ in Formula (1) is any one of Formulae (8-1) to (8-5), this is preferable because a fluorine-containing ether compound is easily synthesized.

Particularly, if $R^2$ is Formula (8-1) or Formula (8-3), this is more preferable because a raw material is readily available.

(Linking Group Represented by -[C]-[D]-)

In the fluorine-containing ether compound represented by Formula (1) of the present embodiment, [C] is represented by Formula (3-1), and [D] is represented by Formula (3-2). In Formula (1), [C] and [D] are a divalent linking group. In Formula (1), [C] and [D] may be interchanged. d in Formula (3-1) and e in Formula (3-2) are an integer of 0 to 2. Here, a sum of values of d and e is 1 or 2.

In consideration of the availability of raw materials and ease of synthesis, Formula (3-1) and Formula (3-2) are preferably a combination in which d is 1 and e is 0 or a combination in which d is 0 and e is 1.

In addition, in consideration of the adhesion to the protective layer, Formula (3-1) and Formula (3-2) are preferably a combination in which d is 2 and e is 0 or a combination in which d is 1 and e is 1. Particularly, if d is 2 and e is 0, in the fluorine-containing ether compound, the direction in which two hydroxyl groups in Formula (3-1) are arranged is sterically the same direction with respect to the extending direction of the PFPE chain, and the two hydroxyl groups in Formula (3-1) tend to be easily adsorbed to the protective layer. In addition, if d and e are 1 and the bonding order of [C] and [D] is -[D]-[C]- from the $R^2$ side, the distance between hydroxyl groups included in the -[D]-[C]- structure becomes longer. Therefore, it is possible to reduce the degree of intramolecular hydrogen bonds of the fluorine-containing ether compound represented by Formula (1) and increase the affinity with the protective layer.

In Formula (3-2), f is an integer of 2 to 5. If e is an integer of 1 to 2, f is preferably an integer of 2 to 3, and most preferably 2.

(Branched Terminal Group Represented by $R^3$)

In Formula (1), $R^3$ is a branched terminal group having 3 to 30 carbon atoms. The number of carbon atoms in $R^3$ is preferably 3 to 20 and more preferably 3 to 12. The number may be 3 to 5, 5 to 10, or 10 to 15. If the number of carbon atoms in $R^3$ is 3 to 12, it is possible to prevent an increase in the surface free energy of the whole molecule which occurs when the proportion of fluorine atoms in the fluorine-containing ether compound molecule decreases.

$R^3$ in Formula (1) is represented by Formula (4). Formula (4) is a branched terminal group containing two or three primary hydroxyl groups and having a carbon atom as a branch point. A plurality of primary hydroxyl groups included in $R^3$ are involved in the formation of intermolecular hydrogen bonds between fluorine-containing ether compounds.

In Formula (4), L represents an integer of 0 to 6. In Formula (4), $Y^1$ and $Y^2$ are each independently a hydrocarbon group containing one primary hydroxyl group and optionally containing an ether oxygen atom. The hydrocarbon groups represented by $Y^1$ and $Y^2$ may be linear or branched, and preferably contain no secondary hydroxyl group or tertiary hydroxyl group. $Y^3$ is a hydrogen atom or a hydrocarbon group containing one primary hydroxyl group and optionally containing an ether oxygen atom. The hydrocarbon group represented by $Y^3$ may be linear or branched, and preferably contains no secondary hydroxyl group or tertiary hydroxyl group.

$R^3$ preferably contains three or more ether bonds (—O—). In this case, since $R^3$ has appropriate flexibility, the lubricating layer containing the fluorine-containing ether compound represented by Formula (1) has even better adhesion to the protective layer.

If $R^3$ has a plurality of ether bonds, adjacent ether bonds are preferably bonded to each other via a linking group in which two or more carbon atoms are linked. In this case, the distance between adjacent ether bonds is appropriate, and the fluorine-containing ether compound is less likely to aggregate.

$R^3$ is preferably a branched terminal group of any one of Formulae (5-1) to (5-3) shown below. If $R^3$ is a branched terminal group of any one of Formulae (5-1) to (5-3), carbon atoms, to which the primary hydroxyl groups included in $R^3$ are bonded, are bonded via a linking group including a methine group and/or methylene group, and an ether bond. Therefore, the distance between adjacent primary hydroxyl groups included in $R^3$ is appropriate, and a plurality of primary hydroxyl groups included in $R^3$ are arranged to facilitate formation of hydrogen bonds between molecules of fluorine-containing ether compounds. Moreover, if $R^3$ is a branched terminal group of any one of Formulae (5-1) to (5-3) shown below, it is possible to prevent an increase in the surface free energy of the whole molecule which occurs when the molecular weight of $R^3$ is so large that the proportion of fluorine atoms in the fluorine-containing ether compound molecule decreases. $R^3$ is more preferably Formula (5-1) or (5-2) because it is possible to prevent the surface free energy of the whole molecule from increasing.

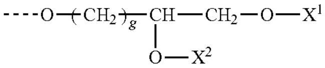

(5-1)

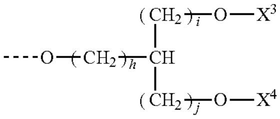

(5-2)

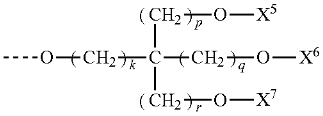

(5-3)

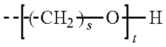

(6)

(in Formula (5-1), g represents an integer of 1 to 6; $X^1$ and $X^2$ are represented by Formula (6); and $X^1$ and $X^2$ may be the same or may be different from each other)

(in Formula (5-2), h represents an integer of 0 to 6; i and j each independently represents an integer of 1 to 6; $X^3$ and $X^4$ are a hydrogen atom or represented by Formula (6), and $X^3$ and $X^4$ may be the same or may be different from each other)

(in Formula (5-3), k represents an integer of 0 to 6; p, q and r each independently represents an integer of 1 to 6; $X^5$, $X^6$ and $X^7$ are a hydrogen atom or represented by Formula (6); $X^5$, $X^6$ and $X^7$ may be different from each other, or some or all of them may be the same)

(in Formula (6), s represents an integer of 2 to 6, and t represents 1 or 2).

In Formula (5-1), g represents an integer of 1 to 6. g is preferably an integer of 1 to 4 and more preferably is 1 or 2 so that it is easy to secure the proportion of fluorine atoms in the fluorine-containing ether compound molecules. $X^1$ and $X^2$ are represented by Formula (6). $X^1$ and $X^2$ may be the same or may be different from each other.

In Formula (5-2), h represents an integer of 0 to 6. h is preferably an integer of 0 to 4 and more preferably is an integer of 0 to 2 because it is easy to secure the proportion of fluorine atoms in the fluorine-containing ether compound molecules. i and j each independently represents an integer of 1 to 6. i and j are each independently preferably an integer of 1 to 4 and more preferably is 1 or 2 because it is easy to secure the proportion of fluorine atoms in the fluorine-containing ether compound molecules. i and j may be the same or may be different from each other. i and j are preferably the same because it is easy to produce the fluorine-containing ether compound. $X^3$ and $X^4$ are a hydrogen atom or represented by Formula (6). $X^3$ and $X^4$ may be the same or may be different from each other.

In Formula (5-3), k represents an integer of 0 to 6. k is preferably an integer of 0 to 4 and more preferably an integer of 0 to 2 because it is easy to secure the proportion of fluorine atoms in the fluorine-containing ether compound molecules. p, q and r each independently represents an integer of 1 to 6. p, q and r are each independently preferably an integer of 1 to 4 and more preferably 1 or 2 because it is easy to secure the proportion of fluorine atoms in the fluorine-containing ether compound molecules. p, q and r may be different from each other, or some or all of them may be the same. Preferably, p, q and r are all the same because it is easy to produce the fluorine-containing ether compound.

$X^5$, $X^6$ and $X^7$ are a hydrogen atom or represented by Formula (6). $X^5$, $X^6$ and $X^7$ may be different from each other, or some or all of them may be the same.

In Formula (6), s represents an integer of 2 to 6. s is preferably an integer of 2 to 4 and more preferably 2 or 3 because it is easy to secure the proportion of fluorine atoms in the fluorine-containing ether compound molecules. t represents 1 or 2. If t is 2, s in respective [$-(CH_2)_s-O-$] may be the same or may be different from each other. t is preferably 1 because it is easy to secure the proportion of fluorine atoms in the fluorine-containing ether compound molecules.

Specifically, -[C]-[D]-$R^3$ in Formula (1) preferably has a structure represented by Formulae (9-1) to (9-23) shown below.

(9-1)

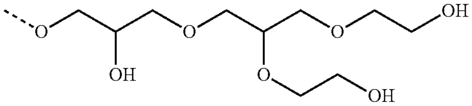

(9-2)

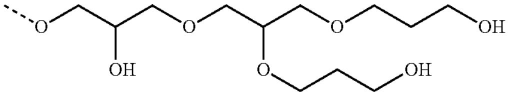

(9-3)

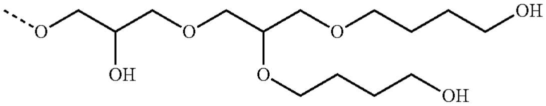

(9-4)

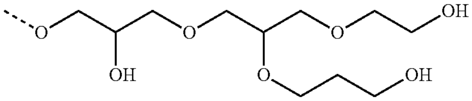

(9-5)

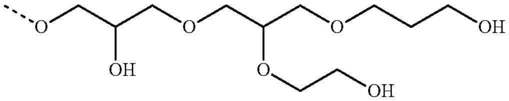

(9-6)

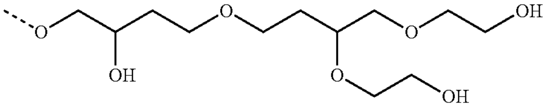

(9-7)

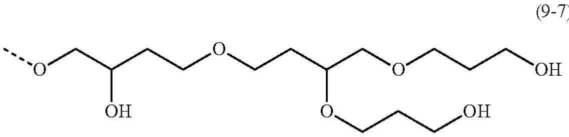

(9-8)

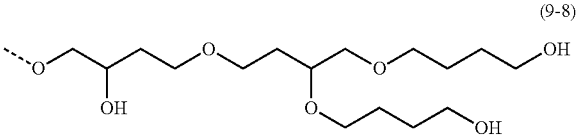

(9-9)

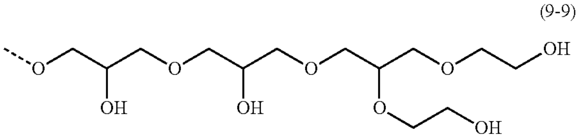

-continued (9-10)

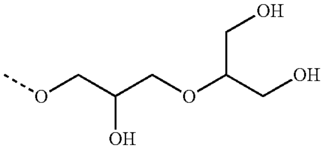

(9-11)

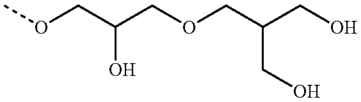

(9-12)

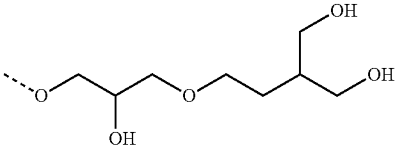

(9-13)

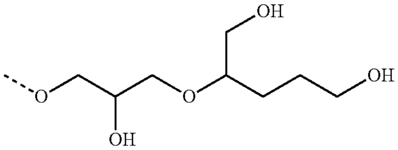

(9-14)

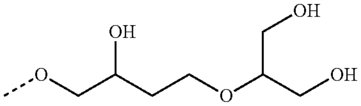

(9-15)

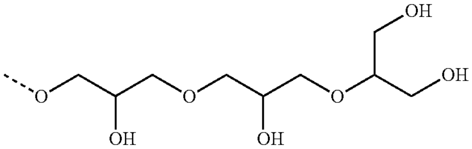

(9-16)

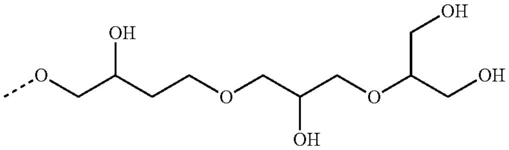

(9-17)

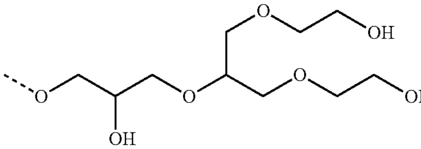

(9-18)

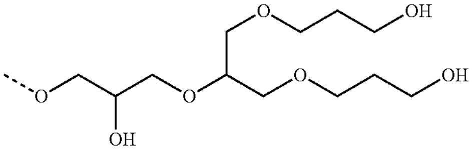

(9-19)

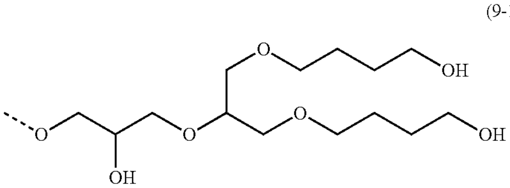

-continued (9-20)

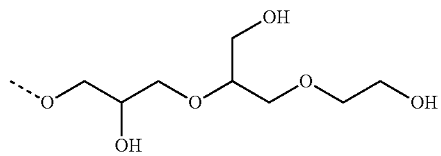

(9-21)

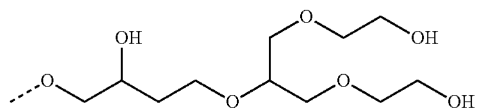

(9-22)

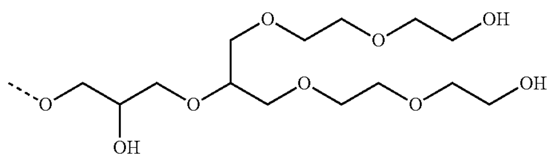

(9-23)

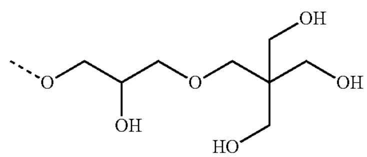

(9-23)

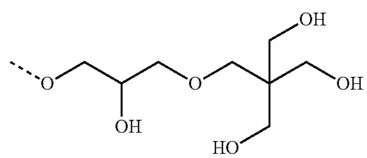

(Linking Group Represented by -[B]-[A]-)

In the fluorine-containing ether compound represented by Formula (1) of the present embodiment, [A] is represented by Formula (2-1), and [B] is represented by Formula (2-2). In Formula (1), [A] and [B] are a divalent linking group. In Formula (1), [A] and [B] may be interchanged. a in Formula (2-1) and b in Formula (2-2) are an integer of 0 to 3. Here, a sum of values of a and b is 1 to 3.

In consideration of the availability of raw materials and ease of synthesis, Formula (2-1) and Formula (2-2) are preferably a combination in which a is 1 and b is 0 or a combination in which a is 0 and b is 1.

In addition, in consideration of the adhesion to the protective layer, Formula (2-1) and Formula (2-2) are preferably a combination in which a is 2 and b is 0 or a combination in which a is 1 and b is 1. Particularly, if a is 2 and b is 0, in the fluorine-containing ether compound, the direction in which two hydroxyl groups in Formula (2-1) are arranged is sterically the same direction with respect to the extending direction of the PFPE chain, and the two hydroxyl groups in Formula (2-1) tend to be easily absorbed to the protective layer. In addition, if a and b are 1 and the bonding order of [A] and [B] is -[A]-[B]- from the $R^1$ side, the distance between hydroxyl groups included in the -[A]-[B]- structure becomes longer. Therefore, it is possible to reduce the degree of intramolecular hydrogen bonds of the fluorine-containing ether compound represented by Formula (1) and increase the affinity with the protective layer.

In Formula (2-2), c is an integer of 2 to 5. If b is an integer of 1 to 3, c is preferably an integer of 2 to 4 and most preferably 2.

(Terminal Group Represented by $R^1$)

The terminal group represented by $R^1$ in (1) can be appropriately selected depending on the performance required of the lubricant containing a fluorine-containing ether compound. $R^1$ and $R^3$ may be the same or may be different from each other.

$R^1$ may be a branched terminal group having 3 to 30 carbon atoms, and may be the terminal group represented by Formula (4). In this case, $R^1$ is a branched terminal group containing two or three primary hydroxyl groups and having a carbon atom as a branch point. Therefore, a plurality of primary hydroxyl groups included in $R^1$ are involved in the formation of intermolecular hydrogen bonds between fluorine-containing ether compounds, and thus the intermolecular hydrogen bonds between fluorine-containing ether compounds are further strengthened.

If $R^1$ is the terminal group represented by Formula (4), $R^1$ is preferably a branched terminal group of any one of Formulae (5-1) to (5-3). In this case, preferable values of g in Formula (5-1), h to j in Formula (5-2), k, and p to r in Formula (5-3) and s and t in Formula (6) are the same as those when $R^3$ is a branched terminal group of any one of Formulae (5-1) to (5-3).

In Formula (1), if $R^1$ is the terminal group represented by Formula (4), both $R^1$ and $R^3$ are more preferably a branched terminal group of any one of Formulae (5-1) to (5-3).

In Formula (1), if $R^1$ is the terminal group represented by Formula (4), $R^1$ and $R^3$ are preferably the same, and both $R^1$ and $R^3$ are more preferably a branched terminal group of any one of Formulae (5-1) to (5-3).

Particularly, $R^1$-[B]-[A]- and -[C]-[D]-$R^3$ in Formula (1) preferably have the same structure, so that both sides of the PFPE chain represented by $R^2$ have a symmetrical structure. In this case, the production cost is low because production is easy.

Specifically, -[A]-[B]-$R^1$ in Formula (1) preferably has a structure represented by Formulae (9-1) to (9-23).

In the fluorine-containing ether compound represented by Formula (1) of the present embodiment, $R^1$ may be the terminal group represented by Formula (7) shown below. In this case, it is possible to prevent an increase in the surface free energy of the whole molecule which occurs when the molecular weight of $R^1$ is so large that the proportion of fluorine atoms in the fluorine-containing ether compound molecule decreases.

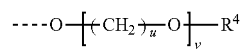

(7)

(in Formula (7), u represents an integer of 2 to 6, v represents 0 or 1; $R^4$ is any of a hydrogen atom, an alkyl group which may have a substituent containing no hydroxyl group, and an organic group having at least one double bond or triple bond; and the alkyl group and the organic group may be linear or branched).

In Formula (7), u represents an integer of 2 to 6, v represents 0 or 1. If v in Formula (7) is 0, it is possible to prevent more effectively an increase in the surface free energy of the whole molecule which occurs when the proportion of fluorine atoms in the fluorine-containing ether compound molecule decreases. If v is 1, the ether bond included in Formula (7) imparts flexibility to the fluorine-containing ether compound represented by Formula (1) and thus adsorption to the protective layer becomes easier.

In addition, if v in Formula (7) is 1, since u is an integer of 2 to 6, the terminal group represented by $R^1$ is chemically stable and is less likely to be decomposed. u is preferably an integer of 2 to 4 and more preferably 2 or 3. If u is 2 or 3, it is possible to prevent an increase in the surface free energy of the whole molecule which occurs when the proportion of fluorine atoms in the fluorine-containing ether compound molecule decreases.

$R^4$ in Formula (7) is any of a hydrogen atom, an alkyl group which may have a substituent containing no hydroxyl group, and an organic group having at least one double bond or triple bond.

If $R^4$ is a hydrogen atom, $R^4$ forms a hydroxyl group together with an oxygen atom in Formula (7). If v in Formula (7) is 1, $R^1$ represented by Formula (7) is an alkoxy group having a terminal hydroxyl group. If v in Formula (7) is 0, $R^1$ represented by Formula (7) is a hydroxyl group.

If $R^4$ is a hydrogen atom and v in Formula (7) is 1, preferable specific examples of $R^1$ represented by Formula (7) include $—O—CH_2CH_2—OH$ (u in Formula (7) is 2), and $—O—CH_2CH_2CH_2—OH$ (u in Formula (7) is 3).

If $R^4$ is a hydrogen atom and v in Formula (7) is 0 (that is, if $R^1$ is a hydroxyl group), $R^1$ may be bonded to [A] represented by Formula (2-1) or may be bonded to [B] represented by Formula (2-2). If $R^1$ is bonded to [B], this is preferable because the distance between the hydroxyl group represented by $R^1$ and the adjacent hydroxyl group is more appropriate.

If $R^4$ is an alkyl group which may have a substituent containing no hydroxyl group, $R^4$ is preferably an unsubstituted alkyl group having 1 to 6 carbon atoms or an alkyl group having a substituent and having 1 to 6 carbon atoms. The substituent of the alkyl group having a substituent and having 1 to 6 carbon atoms is preferably a fluoro group or a cyano group, and does not contain a hydroxyl group. The alkyl group having a substituent and having 1 to 6 carbon atoms is one in which one or more hydrogen atoms of the alkyl group are substituted with a substituent, and may be one in which all hydrogen atoms of the alkyl group are substituted with a substituent.

The unsubstituted alkyl group having 1 to 6 carbon atoms, and the alkyl group of the alkyl group having a substituent and having 1 to 6 carbon atoms, may be linear or branched. Specific examples of alkyl groups thereof include a methyl group, ethyl group, n-propyl group, isopropyl group, n-butyl group, sec-butyl group, isobutyl group, tert-butyl group, n-pentyl group and its structural isomers, and n-hexyl group and its structural isomers.

Examples of alkyl groups having 1 to 6 carbon atoms in which one or more hydrogen atoms are substituted with a fluoro group include a trifluoromethyl group, perfluoroethyl group, perfluoropropyl group, perfluorobutyl group, perfluoropentyl group, perfluorohexyl group, 2,2,2-trifluoroethyl group, 2,2,3,3,3-pentafluoropropyl group, 2,2,2,2,2,2-hexafluoroisopropyl group, 2,2,3,3,4,4,4-heptafluorobutyl group, 2,2,3,3,4,4,5,5,5-nonafluoropentyl group, and 2,2,3,3,4,4,5,5,6,6,6-undecafluorohexyl group.

The number of cyano groups in the alkyl group having 1 to 6 carbon atoms in which one or more hydrogen atoms are substituted with a cyano group may be one or two or more. Since the polarity of the fluorine-containing ether compound becomes too high if the number of cyano groups is large, the number of cyano groups is preferably 2 or less, and most preferably 1.

Examples of alkyl groups having 1 to 6 carbon atoms in which one or more hydrogen atoms are substituted with a cyano group include a 2-cyanoethyl group, 3-cyanopropyl group, 4-cyanobutyl group, 5-cyanopentyl group, 6-cyanohexyl group, 2-cyano-1-methyl ethyl group, and 2,2'-dicyanoisopropyl group.

The organic group having at least one double bond or triple bond is preferably any of an aromatic hydrocarbon-containing organic group having 6 to 12 carbon atoms, an aromatic heterocycle-containing organic group having 3 to 10 carbon atoms, an alkenyl group having 2 to 8 carbon atoms, and an alkynyl group having 3 to 8 carbon atoms. The organic group having at least one double bond or triple bond may be linear or branched.

Examples of aromatic hydrocarbon-containing organic groups having 6 to 12 carbon atoms include a phenyl group, methoxyphenyl group, dimethoxyphenyl group, cyanophenyl group, dicyanophenyl group, phenyl fluoride group, naphthyl group, methoxynaphthyl group, benzyl group, methoxybenzyl group, phenethyl group, methoxyphenethyl group, fluorinated phenethyl group, naphthylmethyl group, and naphthylethyl group. If the aromatic hydrocarbon has a substituent, the position at which the substituent is bonded may be arbitrary.

Examples of aromatic heterocycle-containing organic groups having 3 to 10 carbon atoms include a pyrrolyl group, pyrazolyl group, methylpyrazolylmethyl group, imidazolyl group, furyl group, furfuryl group, oxazolyl group, isooxazolyl group, thienyl group, thienylmethyl group, thienylethyl group, thiazolyl group, methylthiazolylethylgroup, isothiazolyl group, pyridyl group, pyrimidinyl group, pyridazinyl group, pyrazinyl group, indolinyl group, benzofuranyl group, benzothienyl group, benzoimidazolyl group, benzooxazolyl group, benzothiazolyl group, benzopyrazolyl group, benzoisooxazolyl group, benzoisothiazolyl group, quinolyl group, isoquinolyl group, quinazolinyl group, quinoxalinyl group, phthalazinyl group, and cinnolinyl group.

Examples of alkenyl groups having 2 to 8 carbon atoms include a vinyl group, allyl group, 1-propenyl group, isopropenyl group, 3-butenyl group and its structural isomers, 4-pentenyl group and its structural isomers, 5-hexenyl group and its structural isomers, 6-heptenyl group and its structural isomers, and 7-octenyl group and its structural isomers.

Examples of alkynyl groups having 3 to 8 carbon atoms include a 1-propynyl group, propargyl group, 3-butynyl group and its structural isomers, 4-pentynyl group and its structural isomers, 5-hexynyl group and its structural isomers, 6-heptynyl group and its structural isomers, and 7-octynyl group and its structural isomers.

In consideration of the availability and/or ease of synthesis, $R^4$ in Formula (7) is preferably one group selected from the group consisting of a hydrogen atom, methyl group, ethyl group, n-propyl group, isopropyl group, 2,2,2-trifluoroethyl group, 2,2,3,3,3-pentafluoropropyl group, 2,2,2,2,2,2-hexafluoroisopropyl group, 2-cyanoethyl group, 3-cyanopropyl group, 4-cyanobutyl group, phenyl group, methoxyphenyl group, cyanophenyl group, phenethyl group, thienylethyl group, N-methylpyrazolylmethyl group, allyl group, 3-butenyl group, 4-pentenyl group, propargyl group, 3-butynyl group, and 4-pentynyl group. Among them, one group selected from the group consisting of a hydrogen atom, methyl group, ethyl group, n-propyl group, 2,2,2-trifluoroethyl group, 2,2,3,3,3-pentafluoropropyl group, 3-cyanopropyl group, 4-cyanobutyl group, methoxyphenyl group, cyanophenyl group, allyl group, and 3-butenyl group is more preferable.

Specifically, the fluorine-containing ether compound represented by Formula (1) is preferably a compound represented by Formula (AA1) or (BA1) shown below.

The repeating numbers represented by ma1, na1, pa1, and qa1 in Formulae (AA1) and (BA1) are all values indicating the average degree of polymerization, and thus are not necessarily integers.

(AA1)

(BA1)

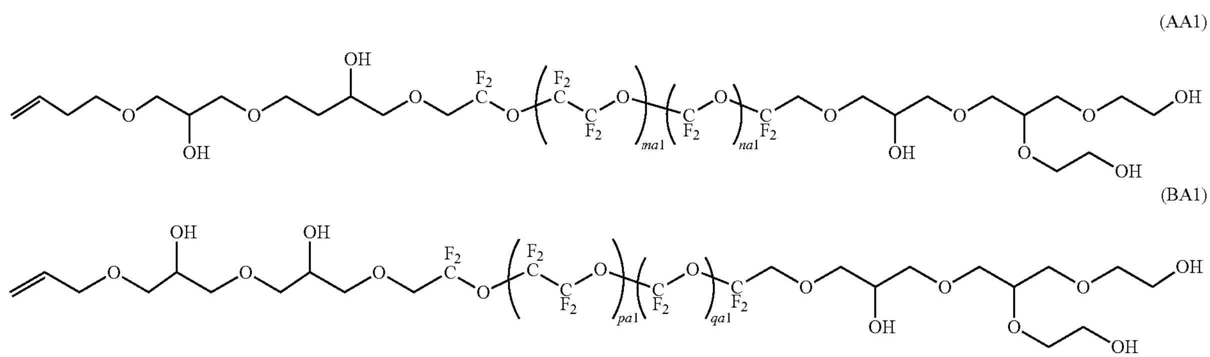

(in Formula (AA1), ma1 and na1 indicate the average degree of polymerization, ma1 is 0.1 to 30, and na1 is 0.1 to 30)

(in Formula (BA1), pa1 and qa1 indicate the average degree of polymerization, pa1 is 0.1 to 30, and qa1 is 0.1 to 30)

The compounds represented by Formulae (AA1) and (BA1) both have a structure in which -[C]-[D]-$R^3$ in Formula (1) shown above is represented by Formula (9-1).

The compounds represented by Formulae (AA1) and (BA1) both have a structure in which $R^2$ is represented by Formula (8-1).

The compound represented by Formula (AA1) is one in which a in Formula (2-1) that is [A] in Formula (1) is 1, b in Formula (2-2) that is [B] is 1, and c is 2, and they are arranged in the order of $R^1$-[A]-[B]-. In the compound represented by Formula (AA1), $R^1$ is represented by Formula (7), v in Formula (7) is 0, and $R^4$ is a 3-butenyl group.

The compound represented by Formula (BA1) is one in which a in Formula (2-1) that is [A] in Formula (1) is 2 and b in Formula (2-2) that is [B] is 0. In the compound represented by Formula (BA1), $R^1$ is represented by Formula (7), v in Formula (7) is 0, and $R^4$ is an allyl group.

The above ma1, na1, pa1, and qa1 may be, as necessary, 0.1 to 1, 1 to 3, 3 to 5, 5 to 10, 10 to 15, 15 to 20, or 20 to 30.

When the fluorine-containing ether compound represented by Formula (1) is a compound represented by Formula (AA1) or (BA1) shown above, this is preferable because it is possible to form a lubricating layer which has favorable adhesion to the protective layer and can prevent the occurrence of pickup and spin-off.

The fluorine-containing ether compound represented by Formula (1) may be a compound represented by Formulae (AA2) to (AV1), (BA2) to (BR1), (CA1) to (CT1), or (DA1) to (DG1) shown below.

The repeating numbers represented by na2 to na4, nm2 to nm4, mb1 to mv1, and nb1 to nv1 in Formulae (AA2) to (AV1), qa2 to qa4, pb1 to pr1, and qb1 to qr1 in Formulae (BA2) to (BR1), va2 to va3, vb2 to vb3, vg2 to vg3, vh2 to vh3, ua1 to ut1, and va1 to vt1 in Formulae (CA1) to (CT1), and xa1 to xg1, and ya1 to yg1 in Formulae (DA1) to (DG1) are all values indicating the average degree of polymerization and thus are not necessarily integers.

(AA2)

(AA3)

(AA4)

(AB1)

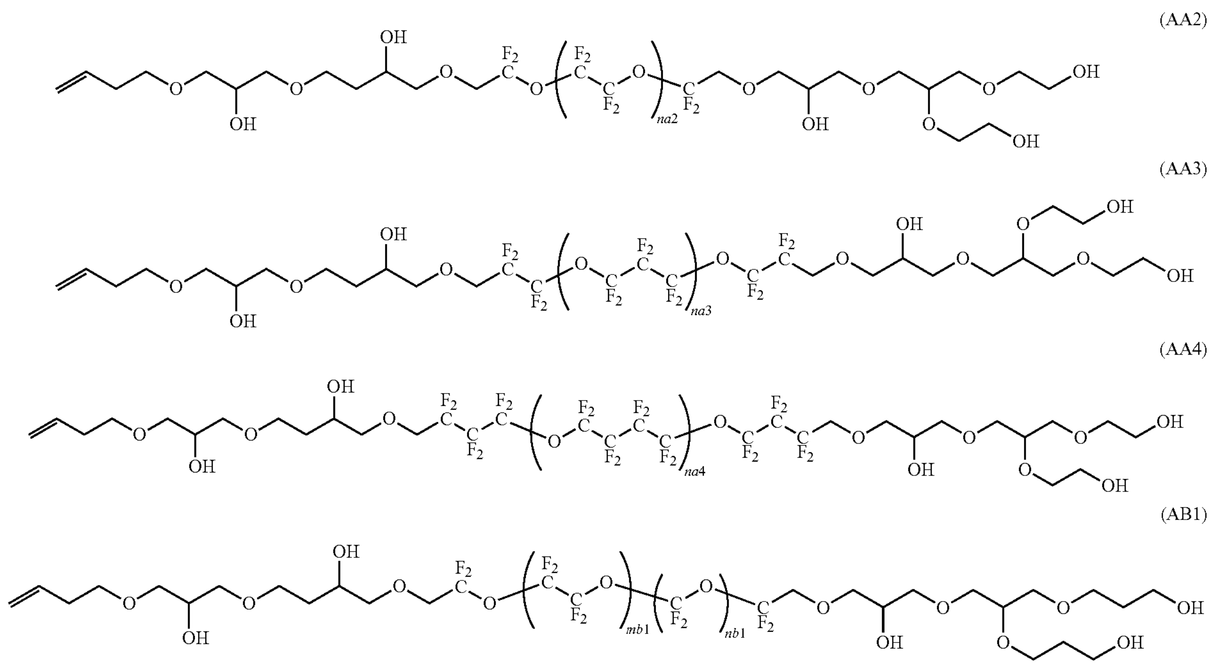

(in Formula (AA2), na2 indicates the average degree of polymerization, and na2 is 0.1 to 30)

(in Formula (AA3), na3 indicates the average degree of polymerization, and na3 is 0.1 to 30)

(in Formula (AA4), na4 indicates the average degree of polymerization, and na4 is 0.1 to 30)

(in Formula (AB1), mb1 and nb1 indicate the average degree of polymerization, mb1 is 0.1 to 30, and nb1 is 0.1 to 30)

(AC1)

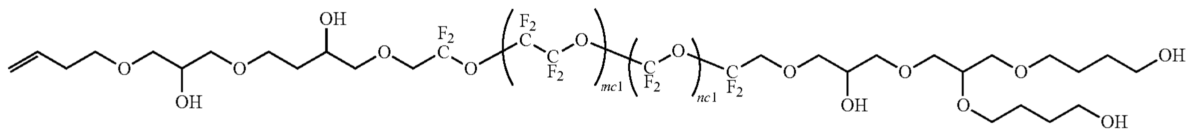

(AD1)

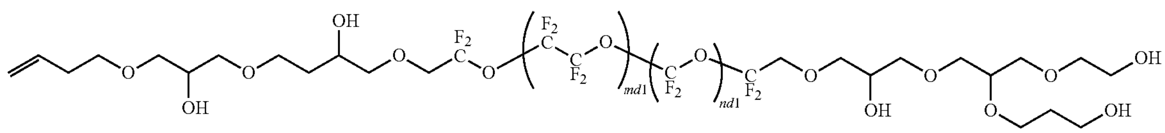

(AE1)

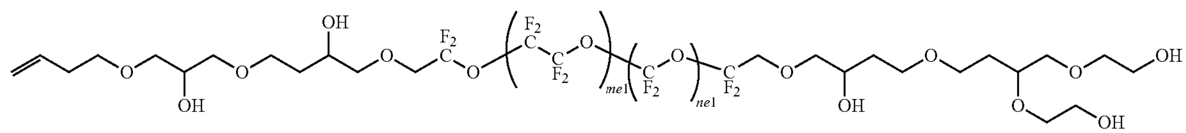

(AF1)

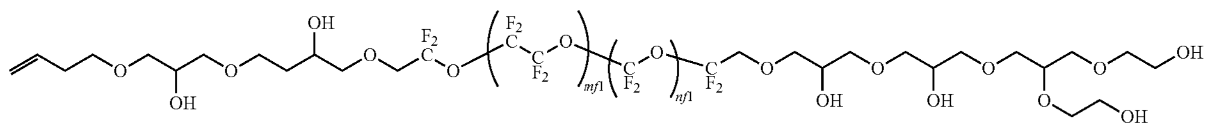

(in Formula (AC1), mc1 and nc1 indicate the average degree of polymerization, mc1 is 0.1 to 30, and ne1 is 0.1 to 30)

(in Formula (AD1), md1 and nd1 indicate the average degree of polymerization, md1 is 0.1 to 30, and nd1 is 0.1 to 30)

(in Formula (AE1), me1 and ne1 indicate the average degree of polymerization, me1 is 0.1 to 30, and ne1 is 0.1 to 30)

(in Formula (AF1), mf1 and nf1 indicate the average degree of polymerization, mf1 is 0.1 to 30, and nf1 is 0.1 to 30)

(AG1)

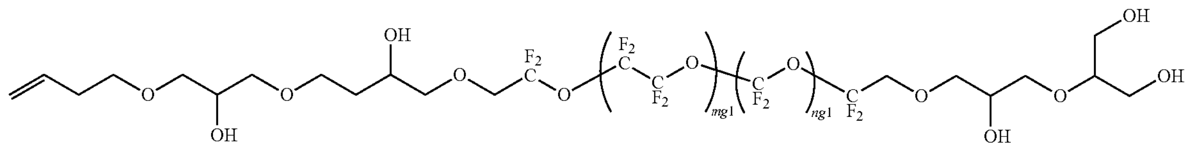

(AH1)

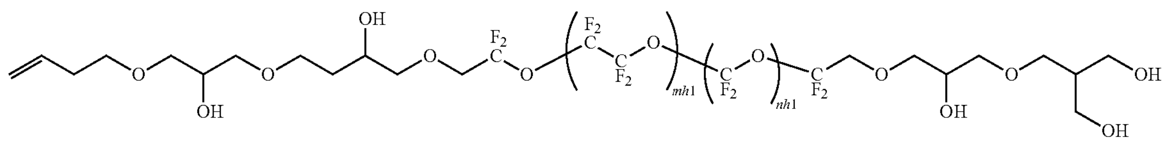

-continued (AI1)

(AJ1)

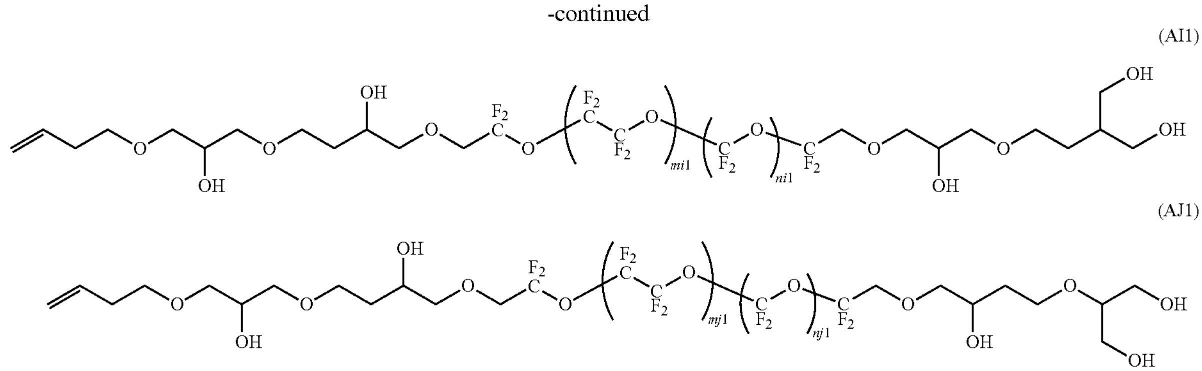

(in Formula (AG1), mg1 and ng1 indicate the average degree of polymerization, mg1 is 0.1 to 30, and ng1 is 0.1 to 30)

(in Formula (AH1), mh1 and nh1 indicate the average degree of polymerization, mh1 is 0.1 to 30, and nh1 is 0.1 to 30)

(in Formula (AI1), mi1 and ni1 indicate the average degree of polymerization, mi1 is 0.1 to 30, and ni1 is 0.1 to 30)

(in Formula (AJ1), mj1 and nj1 indicate the average degree of polymerization, mj1 is 0.1 to 30, and nj1 is 0.1 to 30)

(AK1)

(AL1)

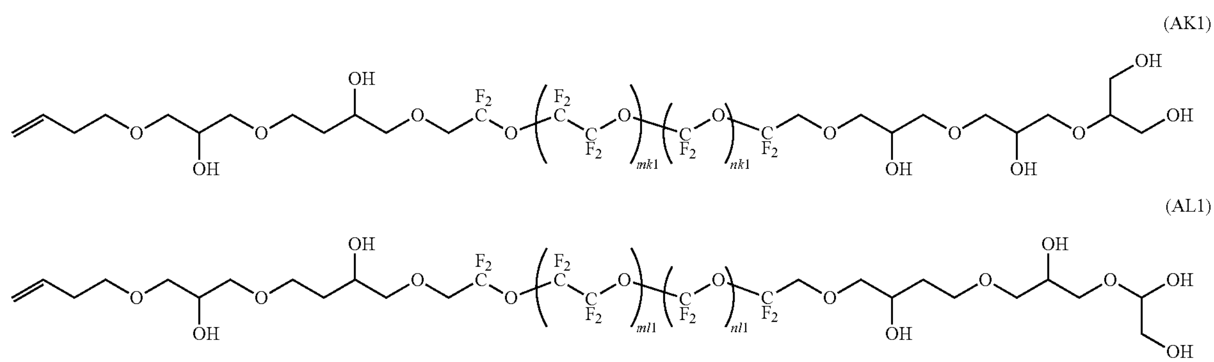

(AM1)

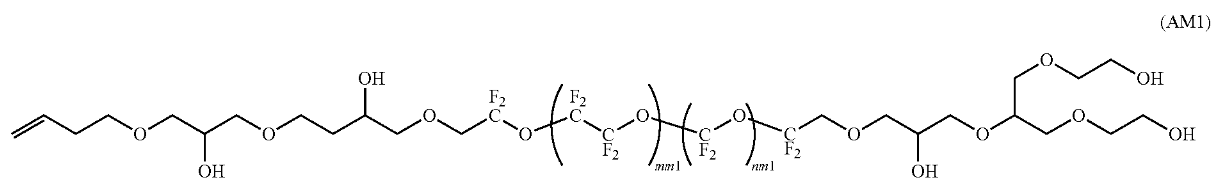

(AM2)

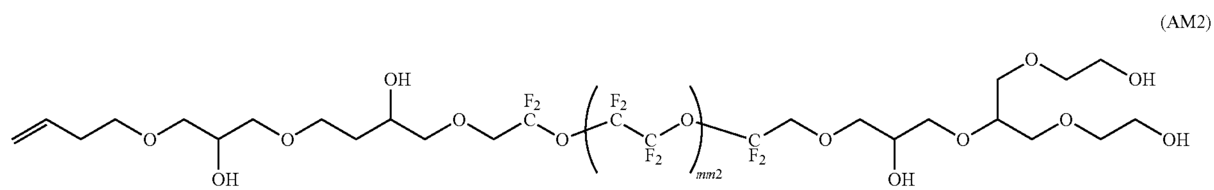

(in Formula (AK1), mk1 and nk1 indicate the average degree of polymerization, mk1 is 0.1 to 30, and nk1 is 0.1 to 30)

(in Formula (AL1), ml1 and nl1 indicate the average degree of polymerization, ml1 is 0.1 to 30, and nl1 is 0.1 to 30)

(in Formula (AM1), mm1 and nm1 indicate the average degree of polymerization, mm1 is 0.1 to 30, and nm1 is 0.1 to 30)

(in Formula (AM2), nm2 indicates the average degree of polymerization, and nm2 is 0.1 to 30)

(AM3)

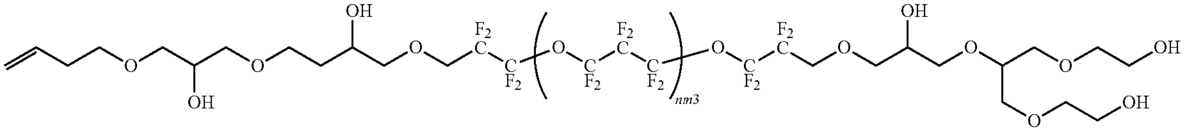

(AM4)

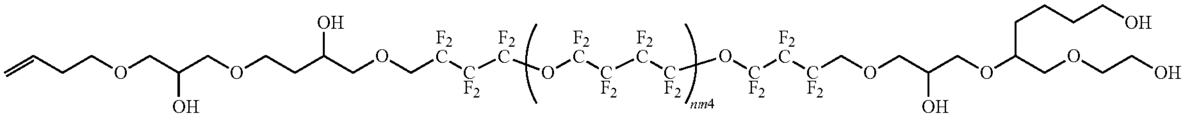

(AN1)

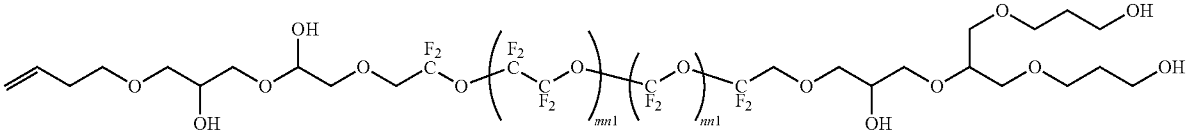

(AO1)

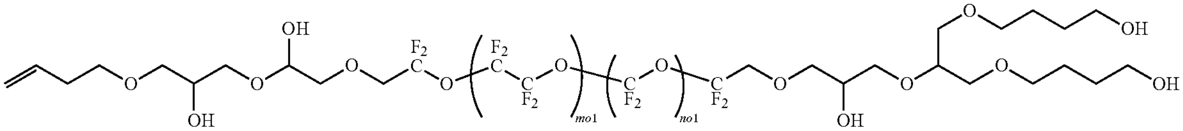

(in Formula (AM3), nm3 indicates the average degree of polymerization, and nm3 is 0.1 to 30)

(in Formula (AM4), nm4 indicates the average degree of polymerization, and nm4 is 0.1 to 30)

(in Formula (AN1), mn1 and nn1 indicate the average degree of polymerization, mn1 is 0.1 to 30, and nn1 is 0.1 to 30)

(in Formula (AO1), mo1 and no1 indicate the average degree of polymerization, mo1 is 0.1 to 30, and no1 is 0.1 to 30)

(AP1)

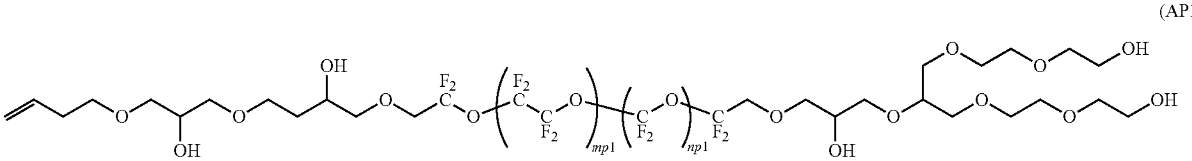

(AQ1)

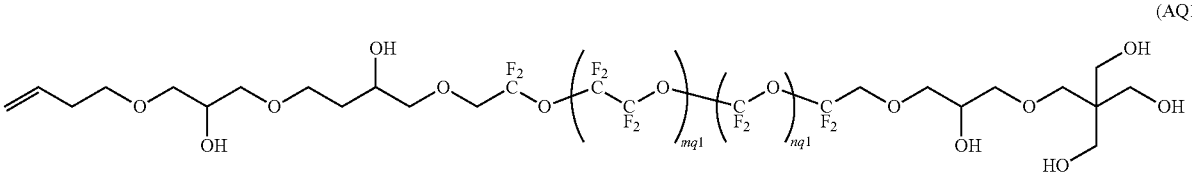

(AR1)

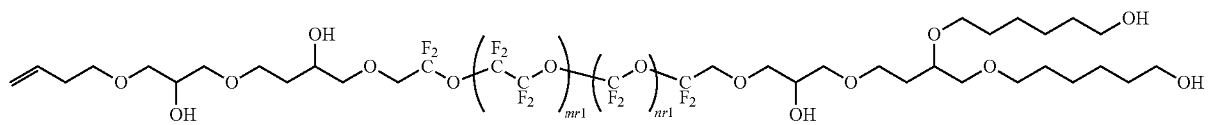

-continued (AS1)

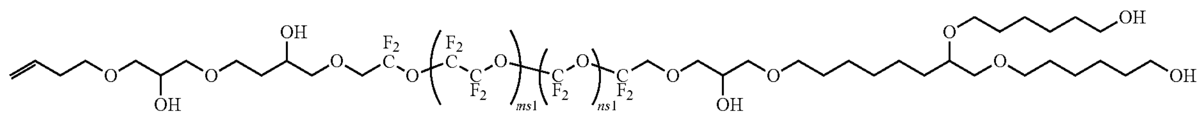

(in Formula (AP1), mp1 and np1 indicate the average degree of polymerization, mp1 is 0.1 to 30, and np1 is 0.1 to 30)

(in Formula (AQ1), mq1 and nq1 indicate the average degree of polymerization, mq1 is 0.1 to 30, and nq1 is 0.1 to 30)

(in Formula (AR1), ir1 and nr1 indicate the average degree of polymerization, mr1 is 0.1 to 30, and nr1 is 0.1 to 30)

(in Formula (AS1), ms1 and ns1 indicate the average degree of polymerization, ms1 is 0.1 to 30, and ns1 is 0.1 to 30)

(AT1)

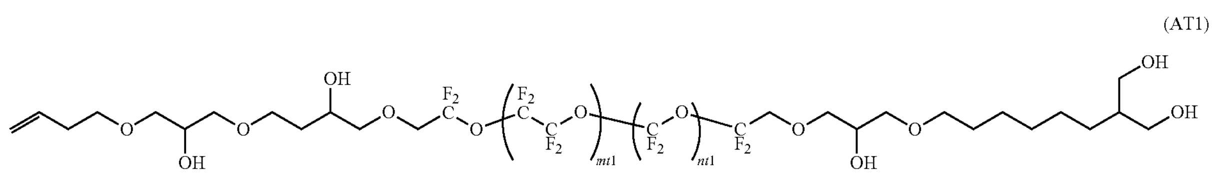

(AU1)

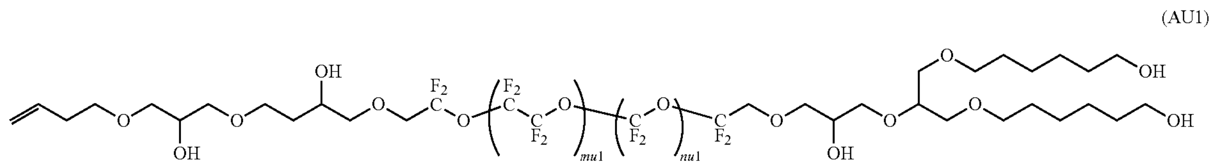

(AV1)

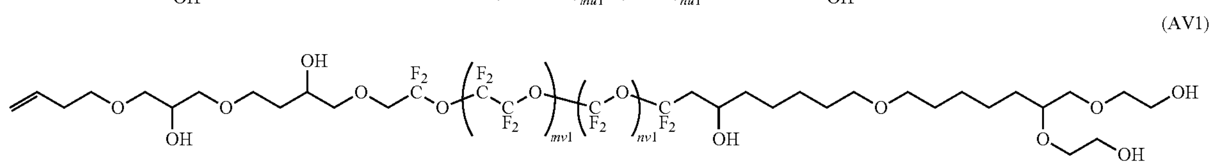

(BA2)

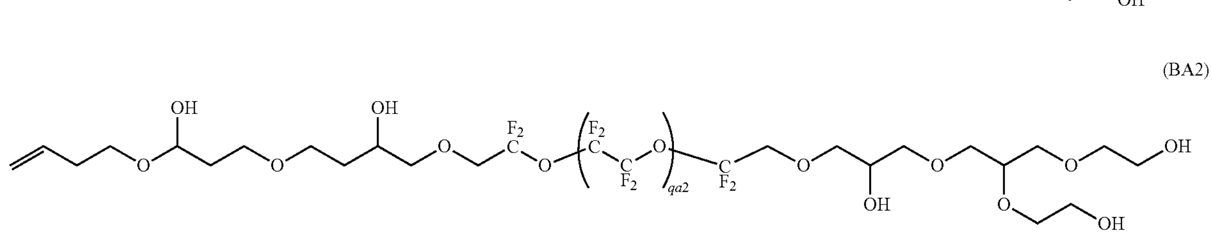

(in Formula (AT1), mt1 and nt1 indicate the average degree of polymerization, mt1 is 0.1 to 30, and nt1 is 0.1 to 30)

(in Formula (AU1), mu1 and nu1 indicate the average degree of polymerization, mu1 is 0.1 to 30, and nu1 is 0.1 to 30)

(in Formula (AV1), mv1 and nv1 indicate the average degree of polymerization, mv1 is 0.1 to 30, and nv1 is 0.1 to 30)

(in Formula (BA2), qa2 indicates the average degree of polymerization, and qa2 is 0.1 to 30)

(BA3)

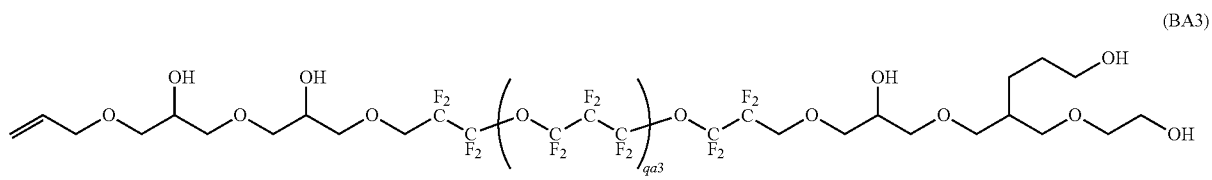

-continued
(BA4)
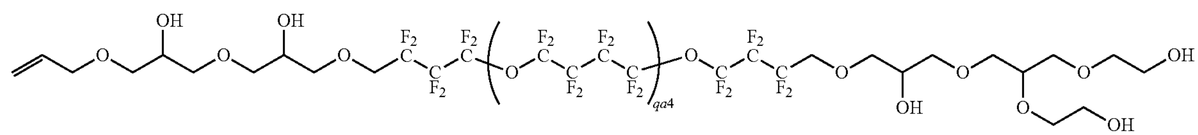
(BB1)
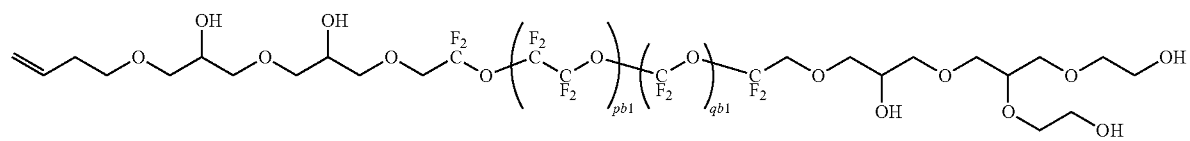
(BC1)
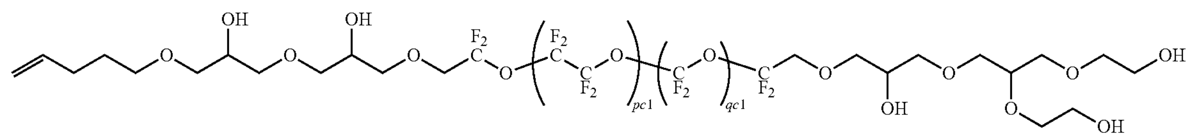
(in Formula (BA3), qa3 indicates the average degree of polymerization, and qa3 is 0.1 to 30)
(in Formula (BA4), qa4 indicates the average degree of polymerization, and qa4 is 0.1 to 30)
(in Formula (BB1), pb1 and qb1 indicate the average degree of polymerization, pb1 is 0.1 to 30, and qb1 is 0.1 to 30)
(in Formula (BC1), pc1 and qc1 indicate the average degree of polymerization, pc1 is 0.1 to 30, and qc1 is 0.1 to 30)
(BD1)
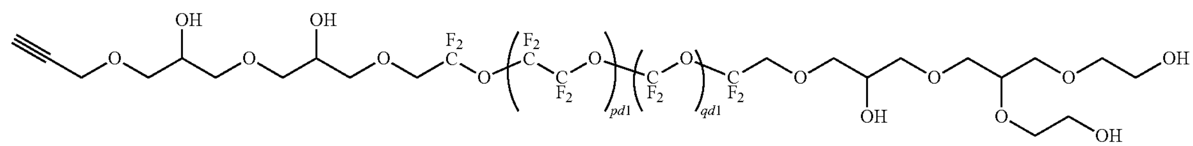
(BE1)
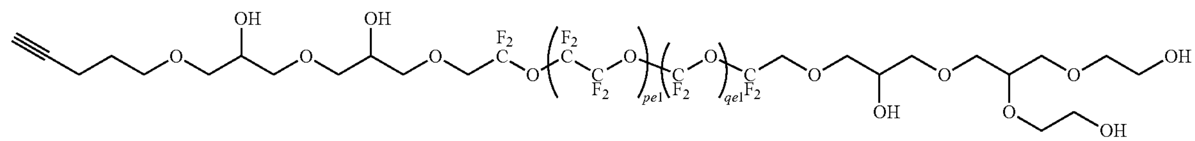
(BF1)
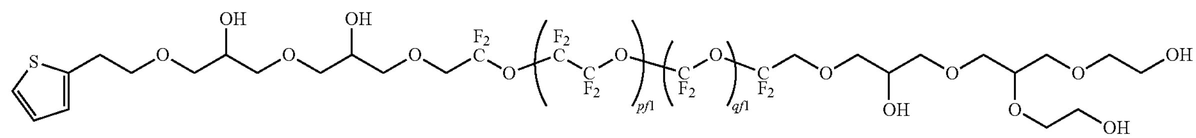
(BG1)
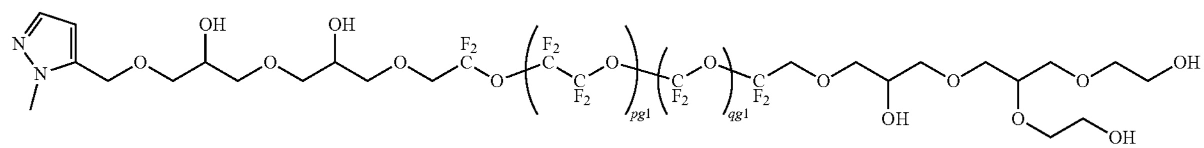

(in Formula (BD1), pd1 and qd1 indicate the average degree of polymerization, pd1 is 0.1 to 30, and qd1 is 0.1 to 30)

(in Formula (BE1), pe1 and qe1 indicate the average degree of polymerization, pe1 is 0.1 to 30, and qe1 is 0.1 to 30)

(in Formula (BF1), pf1 and qf1 indicate the average degree of polymerization, pf1 is 0.1 to 30, and qf1 is 0.1 to 30)

(in Formula (BG1), pg1 and qg1 indicate the average degree of polymerization, pg1 is 0.1 to 30, and qg1 is 0.1 to 30)

(BH1)

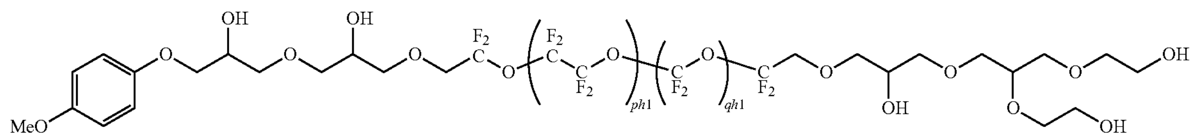

(BI1)

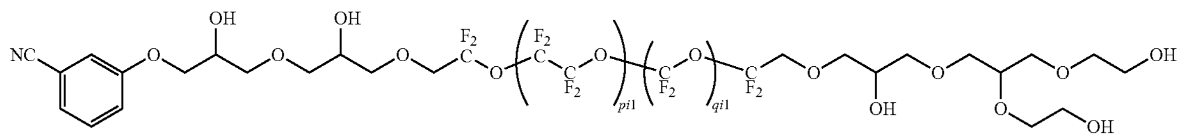

(BJ1)

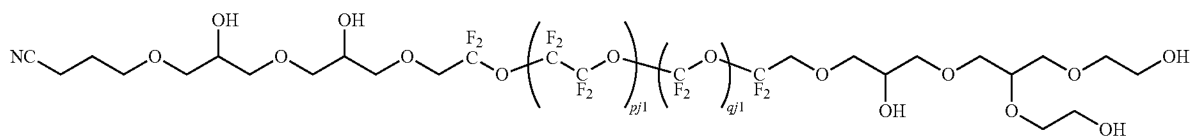

(BK1)

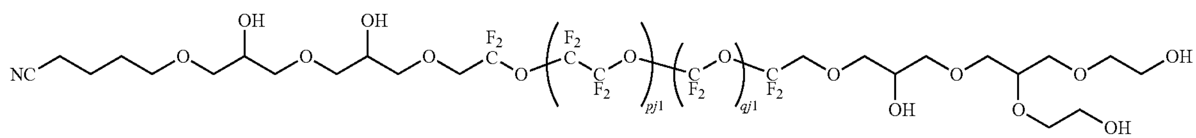

(in Formula (BH1), ph1 and qh1 indicate the average degree of polymerization, ph1 is 0.1 to 30, and qh1 is 0.1 to 30)

(in Formula (BI1), pi1 and qi1 indicate the average degree of polymerization, pi1 is 0.1 to 30, and qi1 is 0.1 to 30)

(in Formula (BJ1), pj1 and qj1 indicate the average degree of polymerization, pj1 is 0.1 to 30, and qj1 is 0.1 to 30)

(in Formula (BK1), pk1 and qk1 indicate the average degree of polymerization, pk1 is 0.1 to 30, and qk1 is 0.1 to 30)

(BL1)

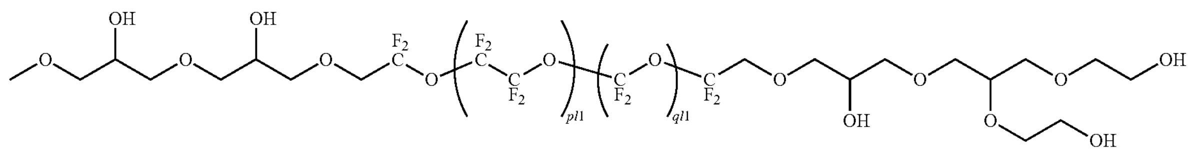

(BM1)

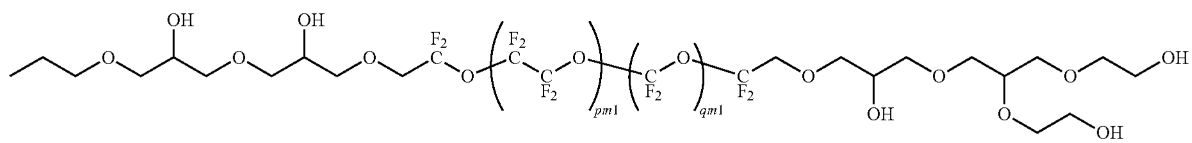

-continued (BN1)

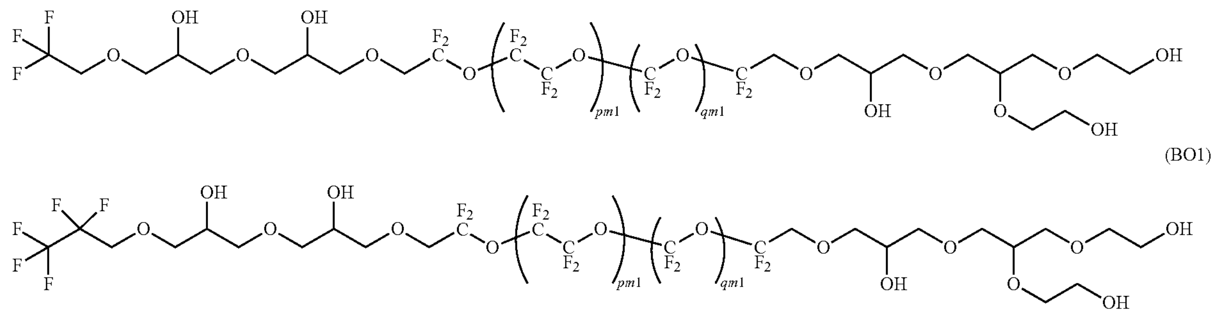

(BO1)

(in Formula (BL1), pl1 and ql1 indicate the average degree of polymerization, pl1 is 0.1 to 30, and ql1 is 0.1 to 30)

(in Formula (BM1), pm1 and qm1 indicate the average degree of polymerization, pm1 is 0.1 to 30, and qm1 is 0.1 to 30)

(in Formula (BN1), pn1 and qn1 indicate the average degree of polymerization, pn1 is 0.1 to 30, and qn1 is 0.1 to 30)

(in Formula (BO1), po1 and qo1 indicate the average degree of polymerization, po1 is 0.1 to 30, and qo1 is 0.1 to 30)

(in Formula (BP1), pp1 and qp1 indicate the average degree of polymerization, pp1 is 0.1 to 30, and qp1 is 0.1 to 30)

(in Formula (BQ1), pq1 and qq1 indicate the average degree of polymerization, pq1 is 0.1 to 30, and qq1 is 0.1 to 30)

(in Formula (BR1), pr1 and qr1 indicate the average degree of polymerization, pr1 is 0.1 to 30, and qr1 is 0.1 to 30)

(in Formula (CA1), ua1 and va1 indicate the average degree of polymerization, ua1 is 0.1 to 30, and va1 is 0.1 to 30)

(BP1)

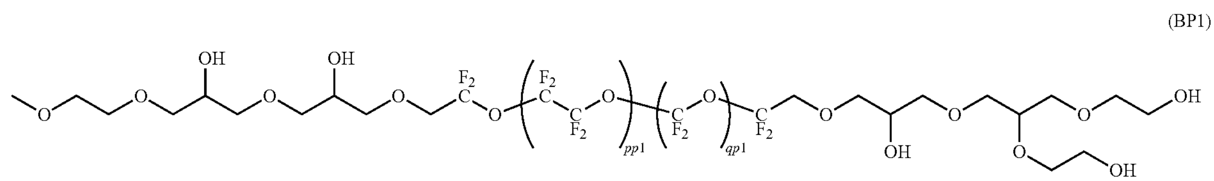

(BQ1)

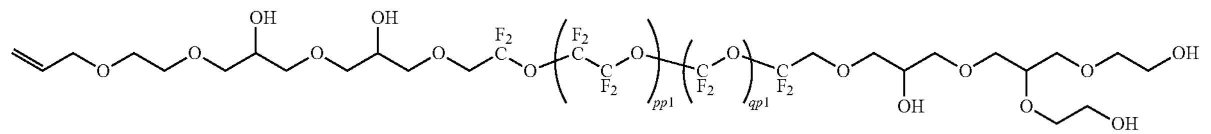

(BR1)

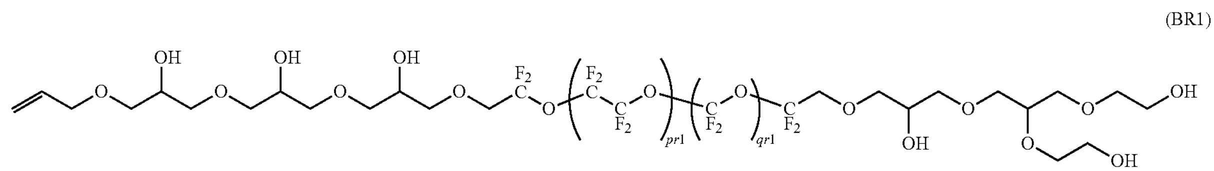

(CA1)

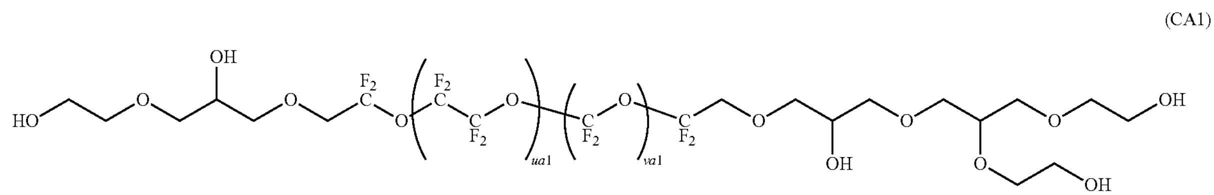

(CA2)
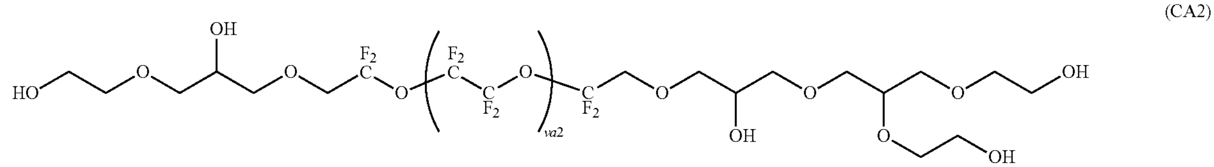
(CA3)
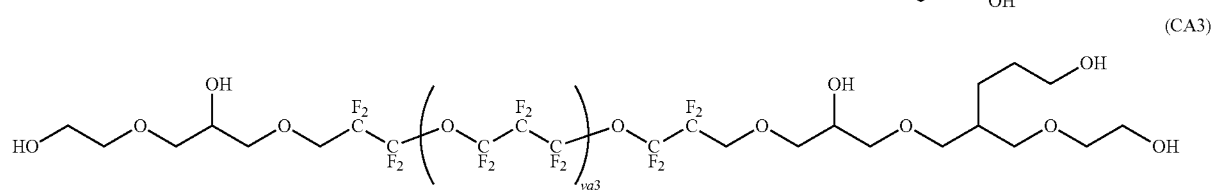
(CB1)
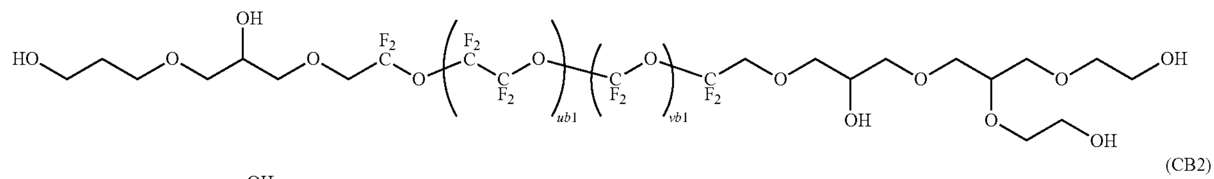
(CB2)
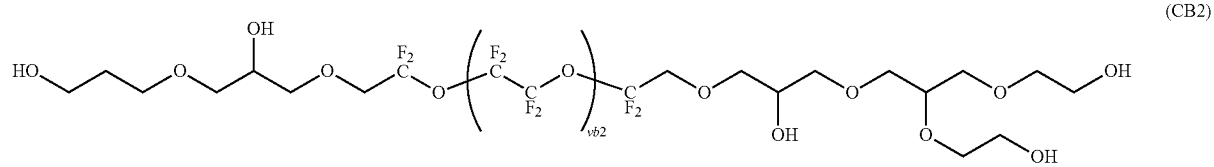
(in Formula (CA2), va2 indicates the average degree of polymerization, and va2 is 0.1 to 30)
(in Formula (CA3), va3 indicates the average degree of polymerization, and va3 is 0.1 to 30)
(in Formula (CB1), ub1 and vb1 indicate the average degree of polymerization, ub1 is 0.1 to 30, and vb1 is 0.1 to 30)
(in Formula (CB2), vb2 indicates the average degree of polymerization, and vb2 is 0.1 to 30)
(CB3)
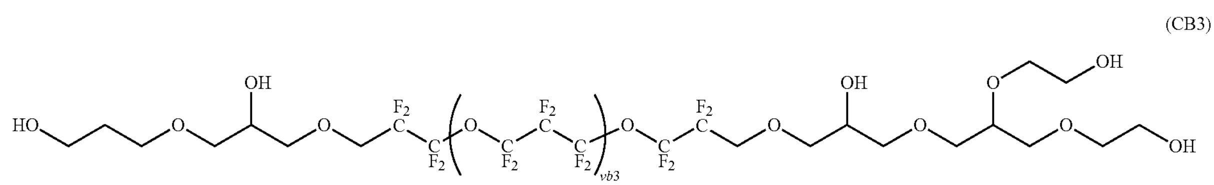
(CC1)
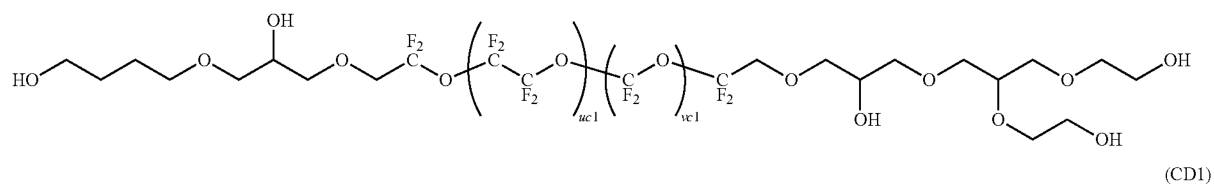
(CD1)
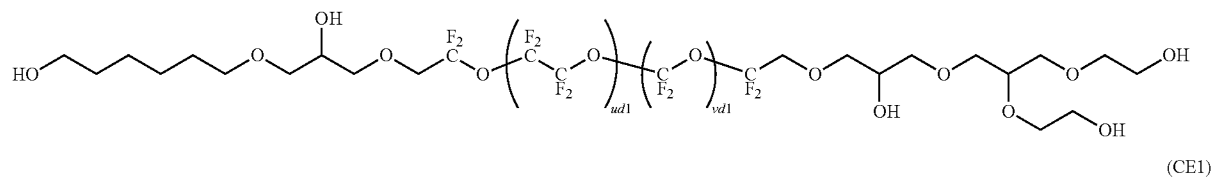
(CE1)
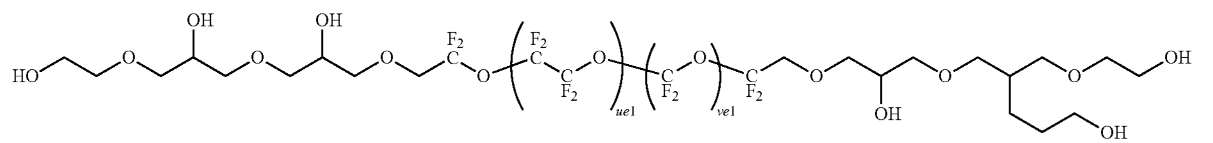

(in Formula (CB3), vb3 indicates the average degree of polymerization, and vb3 is 0.1 to 30)

(in Formula (CC1), uc1 and vc1 indicate the average degree of polymerization, uc1 is 0.1 to 30, and vc1 is 0.1 to 30)

(in Formula (CD1), ud1 and vd1 indicate the average degree of polymerization, ud1 is 0.1 to 30, and vd1 is 0.1 to 30)

(in Formula (CE1), ue1 and ve1 indicate the average degree of polymerization, ue1 is 0.1 to 30, and ve1 is 0.1 to 30)

(CF1)

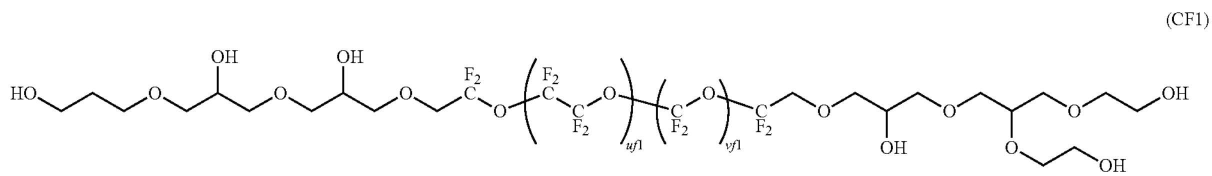

(CG1)

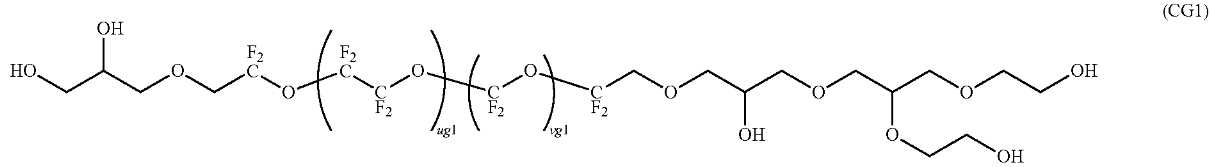

(CG2)

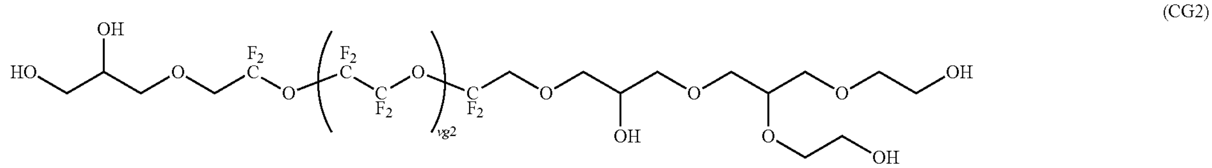

(CG3)

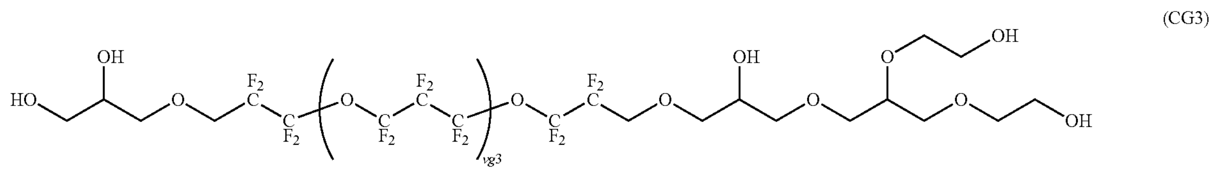

(in Formula (CF1), uf1 and vf1 indicate the average degree of polymerization, uf1 is 0.1 to 30, and vf1 is 0.1 to 30)

(in Formula (CG1), ug1 and vg1 indicate the average degree of polymerization, ug1 is 0.1 to 30, and vg1 is 0.1 to 30)

(in Formula (CG2), vg2 indicates the average degree of polymerization, and vg2 is 0.1 to 30)

(in Formula (CG3), vg3 indicates the average degree of polymerization, and vg3 is 0.1 to 30)

(CH1)

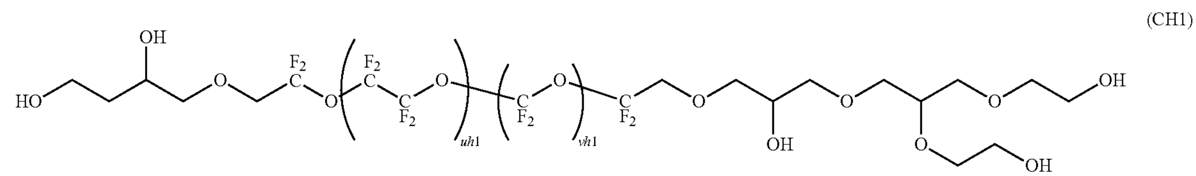

(CH2)

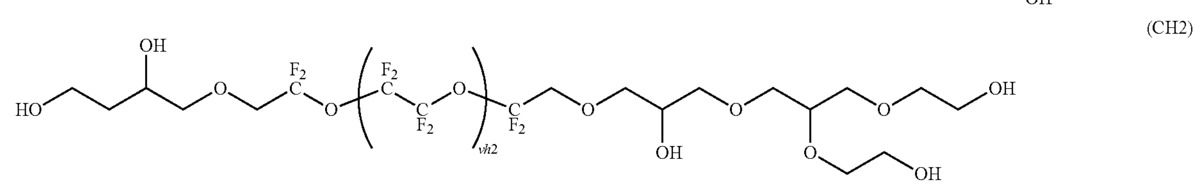

(CH3)

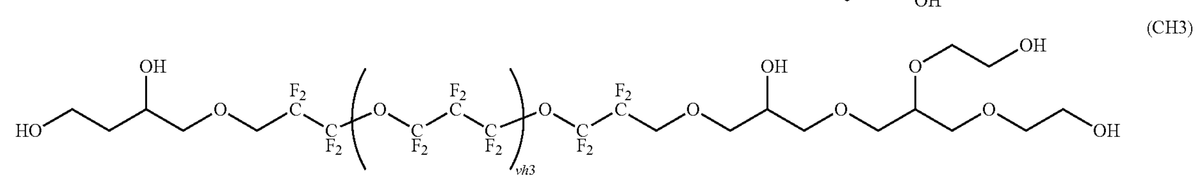

-continued (CI1)

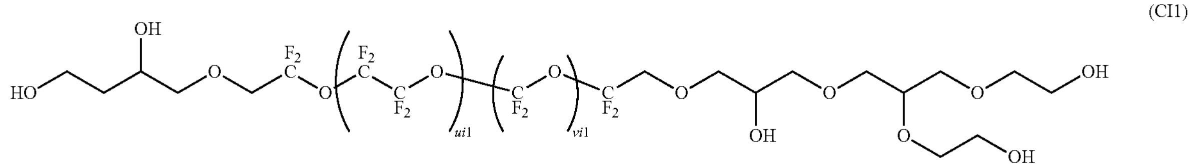

(in Formula (CH1), uh1 and vh1 indicate the average degree of polymerization, uh1 is 0.1 to 30, and vh1 is 0.1 to 30)

(in Formula (CH2), vh2 indicates the average degree of polymerization, and vh2 is 0.1 to 30)

(in Formula (CH3), vh3 indicates the average degree of polymerization, and vh3 is 0.1 to 30)

(in Formula (CI1), ui1 and vi1 indicate the average degree of polymerization, ui1 is 0.1 to 30, and vi1 is 0.1 to 30)

(CJ1)

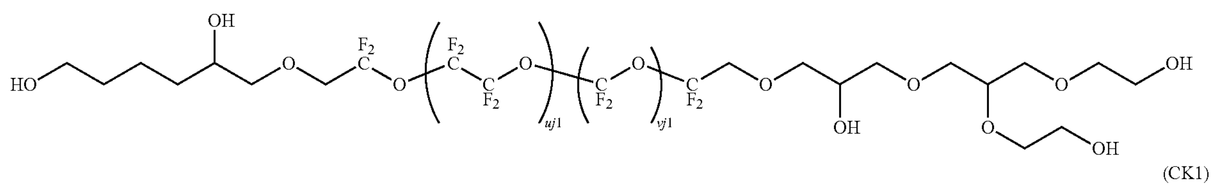

(CK1)

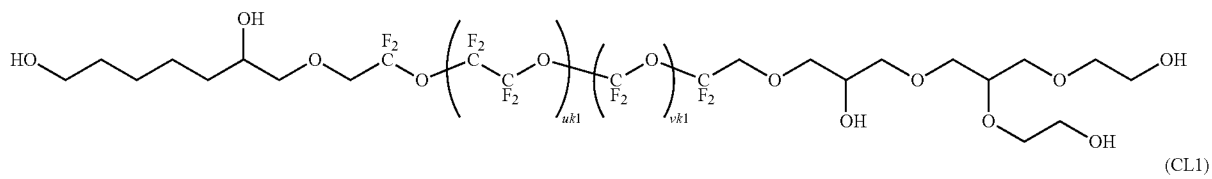

(CL1)

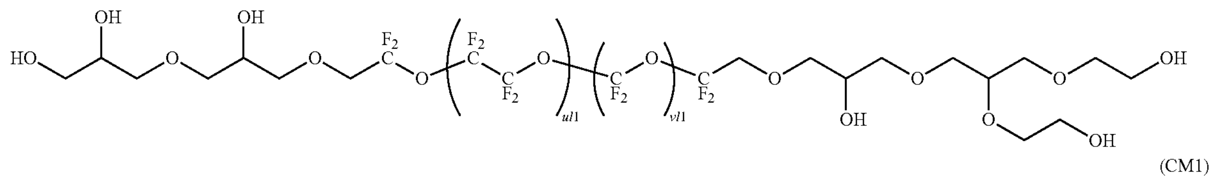

(CM1)

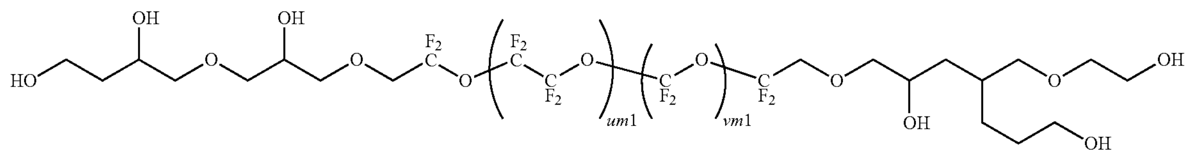

(in Formula (CJ1), uj1 and vj1 indicate the average degree of polymerization, uj1 is 0.1 to 30, and vj1 is 0.1 to 30)

(in Formula (CK1), uk1 and vk1 indicate the average degree of polymerization, uk1 is 0.1 to 30, and vk1 is 0.1 to 30)

(in Formula (CL1), ul1 and vl1 indicate the average degree of polymerization, ul1 is 0.1 to 30, and vl1 is 0.1 to 30)

(in Formula (CM1), um1 and vm1 indicate the average degree of polymerization, um1 is 0.1 to 30, and vm1 is 0.1 to 30)

(CN1)

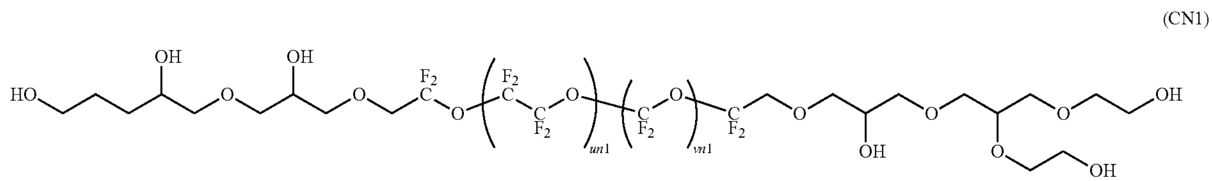

-continued (CO1)

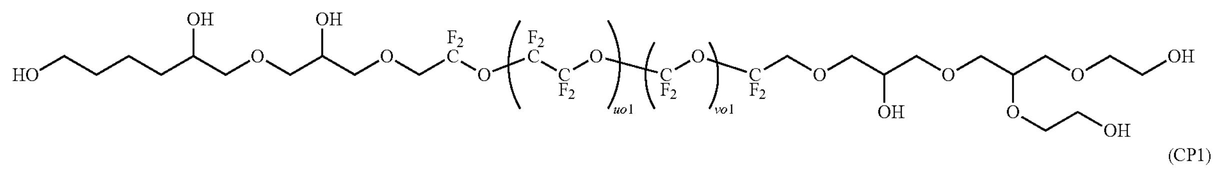

(CP1)

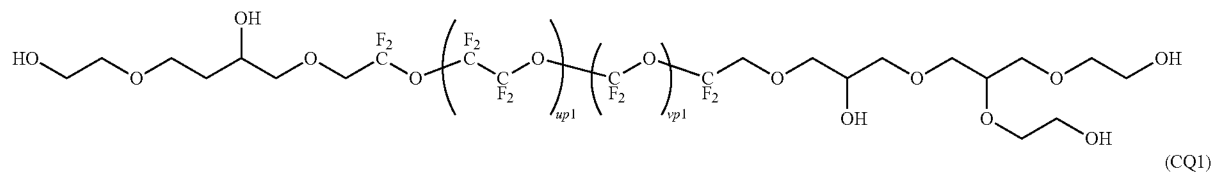

(CQ1)

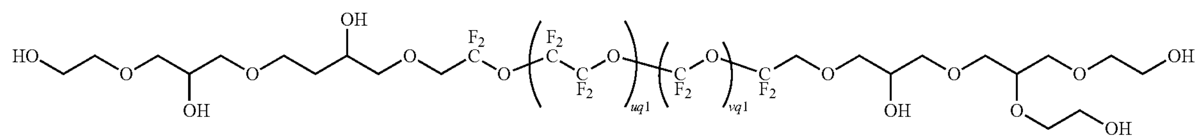

(in Formula (CN1), un1 and vn1 indicate the average degree of polymerization, un1 is 0.1 to 30, and vn1 is 0.1 to 30)

(in Formula (CO1), uo1 and vo1 indicate the average degree of polymerization, uo1 is 0.1 to 30, and vo1 is 0.1 to 30)

(in Formula (CP1), up1 and vp1 indicate the average degree of polymerization, up1 is 0.1 to 30, and vp1 is 0.1 to 30)

(in Formula (CQ1), uq1 and vq1 indicate the average degree of polymerization, uq1 is 0.1 to 30, and vq1 is 0.1 to 30)

(CR1)

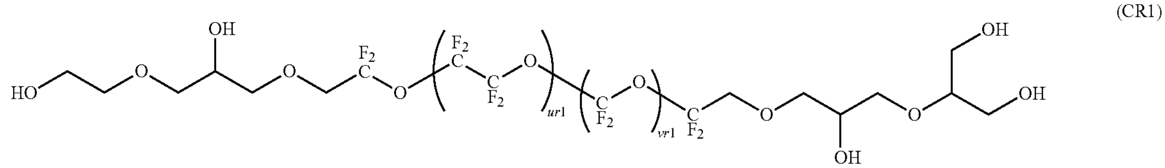

(CS1)

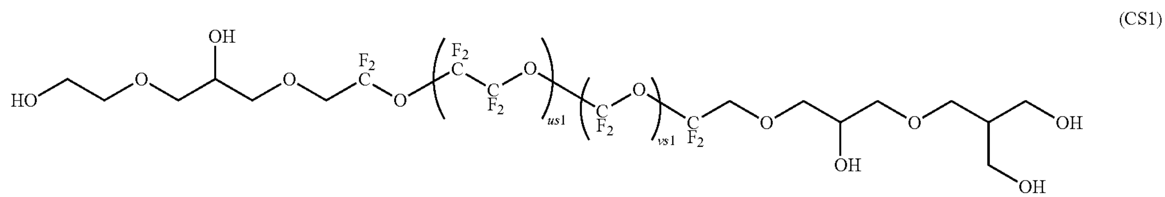

(CT1)

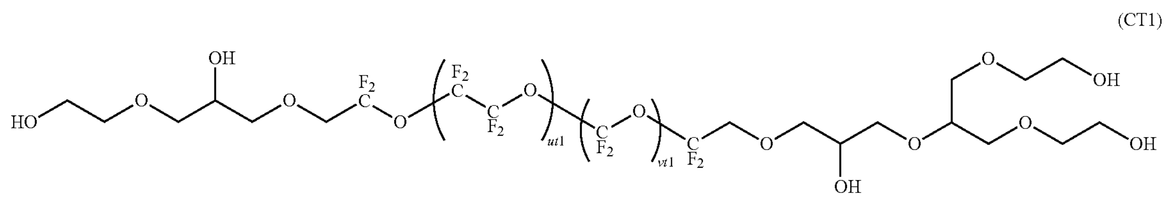

(DA1)

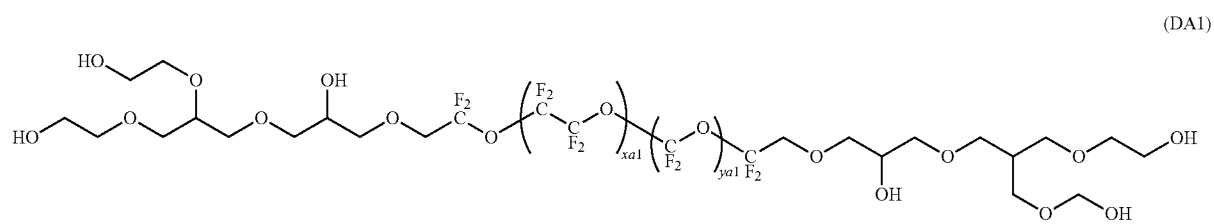

(in Formula (CR1), ur1 and vr1 indicate the average degree of polymerization, ur1 is 0.1 to 30, and vr1 is 0.1 to 30)

(in Formula (CS1), us1 and vs1 indicate the average degree of polymerization, us1 is 0.1 to 30, and vs1 is 0.1 to 30)

(in Formula (CT1), ut1 and vt1 indicate the average degree of polymerization, ut1 is 0.1 to 30, and vt1 is 0.1 to 30)

(in Formula (DA1), xa1 and ya1 indicate the average degree of polymerization, xa1 is 0.1 to 30, and ya1 is 0.1 to 30)

(DB1)

(DC1)

(DD1)

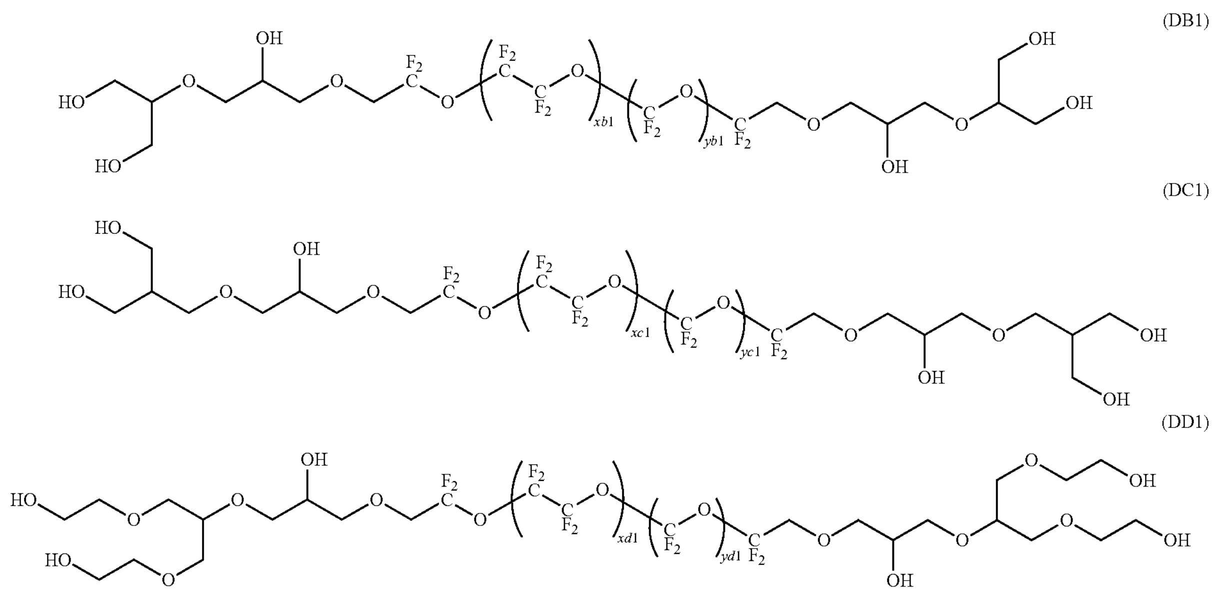

(in Formula (DB1), xb1 and yb1 indicate the average degree of polymerization, xb1 is 0.1 to 30, and yb1 is 0.1 to 30)

(in Formula (DC1), xc1 and yc1 indicate the average degree of polymerization, xc1 is 0.1 to 30, and yc1 is 0.1 to 30)

(in Formula (DD1), xd1 and yd1 indicate the average degree of polymerization, xd1 is 0.1 to 30, and yd1 is 0.1 to 30)

(DE1)

(DF1)

(DG1)

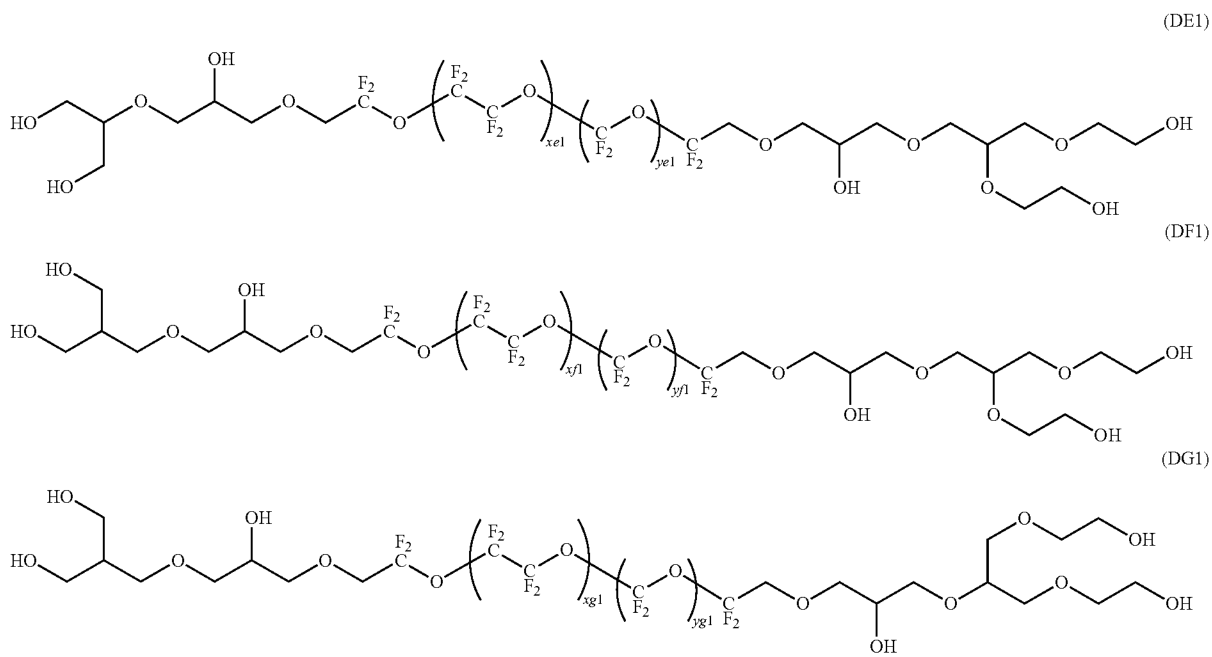

(in Formula (DE1), xe1 and ye1 indicate the average degree of polymerization, xe1 is 0.1 to 30, and ye1 is 0.1 to 30)

(in Formula (DF1), xf1 and yf1 indicate the average degree of polymerization, xf1 is 0.1 to 30, and yf1 is 0.1 to 30)

(in Formula (DG1), xg1 and yg1 indicate the average degree of polymerization, xg1 is 0.1 to 30, and yg1 is 0.1 to 30)

All the compounds represented by Formulae (AA2) to (AV1) are ones in which a in Formula (2-1) that is [A] in Formula (1) shown above is 1, b in Formula (2-2) that is [B] is 1, and c is 2, which are arranged in the order of $R^1$-[A]-[B]-. In all of the compounds represented by Formulae (AA2) to (AV1), $R^1$ is represented by Formula (7), v in Formula (7) is 0, and $R^4$ is a 3-butenyl group.

All the compounds represented by Formulae (AA2) to (AF1), (AR1), (AS1), and (AV1) have a structure in which —$R^3$ in Formula (1) shown above is represented by Formula (5-1). All the compounds represented by Formulae (AG1) to (AP1), (AT1), and (AU1) have a structure in which —$R^3$ in Formula (1) shown above is represented by Formula (5-2). The compound represented by Formula (AQ1) has a structure in which —$R^3$ in Formula (1) shown above is represented by Formula (5-3).

All the compounds represented by Formulae (BA2) to (BR1) have a structure in which -[C]-[D]-$R^3$ in Formula (1) shown above is represented by Formula (9-1).

In all the compounds represented by Formulae (BA2) to (BQ1), a in Formula (2-1) that is [A] in Formula (1) shown above is 2, and b in Formula (2-2) that is [B] is 0. In the compound represented by (BR1), a in Formula (2-1) that is [A] in Formula (1) shown above is 3, and b in Formula (2-2) that is [B] is 0.

In all the compounds represented by Formulae (BA2) to (BR1), $R^1$ is represented by Formula (7), and v in Formula (7) is 0 or 1. In all the compounds represented by Formulae (BA2) to (BI1), (BQ1), and (BR1), $R^4$ is an organic group having at least one double bond or triple bond. In all the compounds represented by Formulae (BJ1) to (BP1), $R^4$ is an alkyl group which may have a substituent containing no hydroxyl group.

All the compounds represented by Formulae (CA1) to (CQ1) have a structure in which -[C]-[D]-$R^3$ in Formula (1) shown above is represented by Formula (9-1).

In all the compounds represented by Formulae (CA1) to (CF1), (CP1), and (CQ1), $R^1$ is represented by Formula (7), u in Formula (7) is 2 to 6, v is 1, and $R^4$ is a hydrogen atom.

In all the compounds represented by Formulae (CG1) to (CO1), $R^1$ is a hydroxyl group ($R^1$ is represented by Formula (7), v in Formula (7) is 0, and $R^4$ is a hydrogen atom).

The compound represented by Formula (CR1) has a structure in which -[C]-[D]-$R^3$ in Formula (1) shown above is represented by Formula (9-10). The compound represented by Formula (CS1) has a structure in which -[C]-[D]-$R^3$ in Formula (1) shown above is represented by Formula (9-11). The compound represented by Formula (CT1) has a structure in which -[C]-[D]-$R^3$ in Formula (1) shown above is represented by Formula (9-17).

In all the compounds represented by Formulae (CR1) to (CT1), $R^1$ is represented by Formula (7), u in Formula (7) is 2, v is 1, and $R^4$ is a hydrogen atom.

In all the compounds represented by Formulae (DA1) to (DG1), both $R^1$ and $R^3$ in Formula (1) shown above are a branched terminal group shown by Formula (5-1) or a branched terminal group shown by Formula (5-2). In all the compounds represented by Formulae (DA1) to (DD1), $R^1$-[B]-[A]- and -[C]-[D]-$R^3$ in Formula (1) shown above are the same.

If the fluorine-containing ether compound represented by Formula (1) is any one of compounds represented by Formulae (AA2) to (AV1), (BA2) to (BR1), (CA1) to (CT1), and (DA1) to (DG1) shown above, this is preferable because it is possible to form a lubricating layer which has favorable adhesion to the protective layer and can prevent the occurrence of pickup and spin-off.

If the fluorine-containing ether compound represented by Formula (1) is any one of compounds represented by Formulae (AA1) to (AQ1), (BA1) to (BR1), (CA1) to (CT1), and (DA1) to (DG1) shown above, this is particularly preferable because the adhesion to the protective layer becomes better.

The number-average molecular weight (Mn) of the fluorine-containing ether compound of the present embodiment is preferably in a range of 500 to 10,000, more preferably in a range of 700 to 7,000, and particularly preferably in a range of 800 to 4,000.

If the number-average molecular weight is 500 or more, a lubricant containing the fluorine-containing ether compound of the present embodiment is less likely to evaporate. Therefore, if the number-average molecular weight is 500 or more, it is possible to form a lubricating layer that can prevent the occurrence of pickup and spin-off. In addition, if the number-average molecular weight is 10,000 or less, the viscosity of the fluorine-containing ether compound does not become too high and becomes a suitable viscosity for a lubricant. The number-average molecular weight of the fluorine-containing ether compound is more preferably 4,000 or less because the viscosity becomes such that the lubricant is easy to handle. The molecular weight may be, as necessary, 500 to 9,000, 600 to 7,000, 700 to 5,000, 800 to 3,000, 900 to 2,000, 1,000 to 1,800, 1,100 to 1,600, or 1,200 to 1,400.

In consideration of ease of obtainability of raw materials for the PFPE chain, the number-average molecular weight of the fluorine-containing ether compound of the present embodiment is more preferably in a range of 1,000 to 3,000. If the number-average molecular weight is in a range of 1,000 to 3,000, the coverage does not deteriorate even if the film thickness of the lubricating layer is reduced, and it is possible to maintain chemical substance resistance and wear resistance. In addition, if the number-average molecular weight is in a range of 1,000 to 3,000, the performance balance is most excellent in consideration of preventing the occurrence of pickup and spin-off and thinning the lubricating layer.

In the fluorine-containing ether compound of the present embodiment, the ratio of the number-average molecular weight of the PFPE chain represented by $R^2$ to that of the whole molecule (PFPE chain/whole molecule) is preferably 0.45 to 0.90 and more preferably 0.55 to 0.85. The ratio may be 0.48 to 0.80, 0.50 to 0.75, 0.53 to 0.70, or 0.57 to 0.65. If the ratio of the number-average molecular weights of the PFPE chain represented by $R^2$ to the whole molecule is 0.45 or more, it is possible to prevent an increase in the surface free energy of the whole molecule which occurs when the proportion of fluorine atoms in the fluorine-containing ether compound molecule decreases. In addition, if the ratio is 0.90 or less, the number of hydroxyl groups included in $R^1$-[B]-[A]- and -[C]-[D]-$R^3$ arranged at both terminals of the PFPE chain with respect to the length of the PFPE chain is appropriate. Therefore, it is possible to form a lubricating layer having better adhesion to the protective layer.

Here, the reason why it is possible to form a lubricating layer which has favorable adhesion to a protective layer and can prevent the occurrence of pickup and spin-off when the lubricating layer is formed on the protective layer of the magnetic recording medium using the lubricant containing the fluorine-containing ether compound of the present embodiment will be described.

In the fluorine-containing ether compound represented by Formula (1) of the present embodiment, [A], [B], [C] and [D] are each a divalent linking group having a secondary hydroxyl group. Here, in the fluorine-containing ether compound of the present embodiment, a -[B]-[A]-structure including 1 to 3 secondary hydroxyl groups (hereinafter abbreviated as a "BA structure" in some cases) and a -[C]-[D]-structure including 1 to 2 secondary hydroxyl groups (hereinafter abbreviated as a "CD structure" in some cases) are arranged in a well-balanced manner at both ends of $R^2$ (PFPE chain) via a methylene group ($—CH_2—$). Moreover, etheric oxygen atoms of the BA structure and the CD structure impart appropriate flexibility to the molecular structure of the fluorine-containing ether compound represented by Formula (1).

In addition, when the BA structure and/or the CD structure includes a plurality of secondary hydroxyl groups, carbon atoms to which the secondary hydroxyl groups are bonded are bonded via a linking group composed of a methylene group ($—CH_2—$) and an ether bond (—O—). Therefore, even when the BA structure and/or the CD structure include a plurality of secondary hydroxyl groups, the distance between adjacent secondary hydroxyl groups is appropriate, and the secondary hydroxyl groups are respectively arranged to be easily adsorbed to the protective layer.

Accordingly, when a lubricating layer containing the fluorine-containing ether compound of the present embodiment is formed on the protective layer, the secondary hydroxyl groups included in the BA structure and the secondary hydroxyl groups included in the CD structure are effectively involved in bonding with active sites on the protective layer.

In addition, $R^3$ in Formula (1) is a branched terminal group including two or three primary hydroxyl groups. Since the primary hydroxyl group has less steric hindrance than a secondary hydroxyl group and a tertiary hydroxyl group, it is effectively involved in the formation of the intermolecular hydrogen bonds between fluorine-containing ether compounds.

In this manner, in the fluorine-containing ether compound represented by Formula (1) of the present embodiment, <1> the secondary hydroxyl group included in the BA structure and the secondary hydroxyl group included in the CD structure are effectively involved in bonding with active sites on the protective layer, and <2> the plurality of primary hydroxyl groups included in $R^3$ are involved in the formation of intermolecular hydrogen bonds between fluorine-containing ether compounds.

That is, in the lubricating layer containing the fluorine-containing ether compound of the present embodiment, an excellent adsorption force for the protective layer exhibited by the secondary hydroxyl groups arranged at both ends of the PFPE chain and an excellent intermolecular force exhibited by the primary hydroxyl group of the branched terminal group act effectively in a well-balanced manner.

Accordingly, the lubricating layer containing the fluorine-containing ether compound of the present embodiment has excellent adhesion to the protective layer. As a result, it is possible to prevent the fluorine-containing ether compound that is present without adhering (adsorbing) to the protective layer from adhering to a magnetic head as foreign matter (smear), and to prevent the occurrence of pickup. In addition, the occurrence of spin-off, in which the lubricant scatters and evaporates and the film thickness of the lubricating layer is reduced due to a centrifugal force and/or heat generated according to rotation of the magnetic recording medium at a high speed, is prevented.

"Production Method"

A method of producing a fluorine-containing ether compound of the present embodiment is not particularly limited, and a conventionally known production method can be used for production. For example, the fluorine-containing ether compound of the present embodiment can be produced using the following production method.

First, a fluorine-based compound having a PFPE chain corresponding to $R^2$ in Formula (1) and having hydroxymethyl groups ($—CH_2OH$) arranged at both molecular terminals is prepared.

Next, a hydroxyl group of a hydroxymethyl group arranged at one terminal of the fluorine-based compound is substituted with a group composed of $R^1$-[B]-[A]- in Formula (1) (first reaction). Then, a hydroxyl group of a hydroxymethyl group arranged at the other terminal is substituted with a terminal group composed of -[C]-[D]-$R^3$ in Formula (1) (second reaction).

The first reaction and the second reaction can be performed using a conventionally known method, and can be appropriately determined according to the type of the terminal group in Formula (1). In addition, between the first reaction and the second reaction, either reaction may be performed first.

The fluorine-containing ether compound represented by Formula (1) is obtained by the above-described method.

[Lubricant for Magnetic Recording Medium]

A lubricant for a magnetic recording medium of the present embodiment contains the fluorine-containing ether compound represented by Formula (1).

In the lubricant of the present embodiment, a known material which is used as a lubricant material can be used by mixing as necessary, within a range that does not impair characteristics which are obtained due to the inclusion of the fluorine-containing ether compound represented by Formula (1).

Specific examples of the known material include FOMBLIN (registered trademark) ZDIAC, FOMBLIN ZDEAL, FOMBLIN AM-2001 (all commercially available from Solvay Solexis), and Moresco A20H (commercially available from Moresco). The known material which can be used by mixing with the lubricant of the present embodiment preferably has a number-average molecular weight of 1,000 to 10,000.

When the lubricant of the present embodiment contains a material other than the fluorine-containing ether compound represented by Formula (1), the content of the fluorine-containing ether compound represented by Formula (1) in the lubricant of the present embodiment is preferably 50 mass % or more and more preferably 70 mass % or more. The content of the fluorine-containing ether compound represented by Formula (1) may be 80 mass % or more or 90 mass % or more.

Since the lubricant of the present embodiment contains the fluorine-containing ether compound represented by Formula (1), a lubricating layer which has favorable adhesion to the protective layer and can prevent the occurrence of pickup and spin-off is obtained.

[Magnetic Recording Medium]

The magnetic recording medium of the present embodiment includes at least a magnetic layer, a protective layer and a lubricating layer which are sequentially provided on a substrate.

In the magnetic recording medium of the present embodiment, as necessary, one, two or more underlayers can be provided between the substrate and the magnetic layer. In addition, an adhesive layer and/or a soft magnetic layer can be provided between the underlayer and the substrate.

The FIGURE is a schematic cross-sectional view showing one embodiment of the magnetic recording medium of the present invention.

A magnetic recording medium 10 of the present embodiment has structure in which an adhesive layer 12, a soft magnetic layer 13, a first underlayer 14, a second underlayer 15, a magnetic layer 16, a protective layer 17, and a lubricating layer 18 are sequentially provided on a substrate 11.

"Substrate"

As the substrate 11, for example, a non-magnetic substrate and the like in which a NiP or NiP alloy film is formed on a base made of a metal or alloy material such as Al or an Al alloy can be used.

In addition, as the substrate 11, a non-magnetic substrate made of a non-metal material such as glass, ceramic, silicon, silicon carbide, carbon, or a resin may be used, and a non-magnetic substrate in which a NiP or NiP alloy film is formed on a base made of this non-metal material may be used.

A glass substrate is rigid and has excellent smoothness and thus it is suitable for increasing the recording density. Examples of glass substrates include an aluminosilicate glass substrate. As the glass substrate, a chemically strengthened aluminosilicate glass substrate is particularly suitable.

The roughness of the main surface of the substrate 11 is preferably ultra-smooth with an Rmax of 6 nm or less and an Ra of 0.6 nm or less. The surface roughnesses Rmax and Ra referred to here are based on the provision of JIS B0601.

"Adhesive Layer"

The adhesive layer 12 prevents the progress of corrosion of the substrate 11 which may occur when the substrate 11 and the soft magnetic layer 13 provided on the adhesive layer 12 are arranged in contact with each other.

The material of the adhesive layer 12 can be appropriately selected from among, for example, Cr, Cr alloys, Ti, Ti alloys, CrTi, NiAl, and AlRu alloys. The adhesive layer 12 can be formed by, for example, a sputtering method.

"Soft Magnetic Layer"

The soft magnetic layer 13 preferably has a structure in which a first soft magnetic film, an intermediate layer made of a Ru film, and a second soft magnetic film are sequentially laminated. That is, the soft magnetic layer 13 preferably has a structure in which the intermediate layer made of a Ru film is interposed between two soft magnetic film layers, and thus the soft magnetic films above and below the intermediate layer are antiferromagnetically coupled (AFC).

Examples of materials of the first soft magnetic film and the second soft magnetic film include CoZrTa alloys and CoFe alloys.

To the CoFe alloy that is used for the first soft magnetic film and the second soft magnetic film, any of Zr, Ta, and Nb is preferably added. This accelerates the amorphization of the first soft magnetic film and the second soft magnetic film, and thus it is possible to improve the orientation of the first underlayer (seed layer). Further, it is possible to decrease the flying height of the magnetic head.

The soft magnetic layer 13 can be formed by, for example, a sputtering method.

"First Underlayer"

The first underlayer 14 is a layer that controls the orientations and crystal sizes of the second underlayer 15 and the magnetic layer 16 provided thereon.

Examples of the first underlayer 14 include a Cr layer, a Ta layer, a Ru layer, a CrMo alloy layer, a CoW alloy layer, a CrW alloy layer, a CrV alloy layer, and a CrTi alloy layer.

The first underlayer 14 can be formed by, for example, a sputtering method.

"Second Underlayer"

The second underlayer 15 is a layer that controls the orientation of the magnetic layer 16 to be favorable. The second underlayer 15 is preferably a Ru or Ru alloy layer.

The second underlayer 15 may be a single layer or may be composed of a plurality of layers. If the second underlayer 15 is composed of a plurality of layers, all of the layers may be composed of the same material or at least one layer may be composed of a different material.

The second underlayer 15 can be formed by, for example, a sputtering method.

"Magnetic Layer"

The magnetic layer 16 is made of a magnetic film in which the easy magnetization axis is directed in a perpendicular or horizontal direction with respect to the substrate surface. The magnetic layer 16 is a layer containing Co and Pt, and may be a layer further containing an oxide, Cr, B, Cu, Ta, Zr or the like in order to improve signal to noise ratio (SNR) characteristics.

Examples of oxides contained in the magnetic layer 16 include $SiO_2$, SiO, $Cr_2O_3$, CoO, $Ta_2O_3$, and $TiO_2$.

The magnetic layer 16 may be composed of one layer or may be composed of a plurality of magnetic layers made of materials with different compositions.

For example, when the magnetic layer 16 is composed of three layers: a first magnetic layer, a second magnetic layer and a third magnetic layer sequentially laminated from below, the first magnetic layer preferably has a granular structure made of a material containing Co, Cr, and Pt and further containing an oxide. As the oxide contained in the first magnetic layer, for example, oxides of Cr, Si, Ta, Al, Ti, Mg, Co or the like are preferably used. Among them, in particular, $TiO_2$, $Cr_2O_3$, $SiO_2$ and the like can be suitably used. In addition, the first magnetic layer is preferably made of a composite oxide obtained by adding two or more oxides. Among them, in particular, $Cr_2O_3$—$SiO_2$, $Cr_2O_3$—$TiO_2$, $SiO_2$—$TiO_2$ and the like can be suitably used.

The first magnetic layer may contain, in addition to Co, Cr, Pt, and oxides, one or more elements selected from among B, Ta, Mo, Cu, Nd, W, Nb, Sm, Tb, Ru, and Re.

For the second magnetic layer, the same material as for the first magnetic layer can be used. The second magnetic layer preferably has a granular structure.

The third magnetic layer preferably has a non-granular structure made of a material containing Co, Cr, and Pt but containing no oxide. The third magnetic layer may contain, in addition to Co, Cr, and Pt, one or more elements selected from among B, Ta, Mo, Cu, Nd, W, Nb, Sm, Tb, Ru, Re, and Mn.

When the magnetic layer 16 is formed of a plurality of magnetic layers, a non-magnetic layer is preferably provided between adjacent magnetic layers. When the magnetic layer 16 is composed of three layers: a first magnetic layer, a second magnetic layer and a third magnetic layer, it is preferable to provide a non-magnetic layer between the first magnetic layer and the second magnetic layer and between the second magnetic layer and the third magnetic layer.

For the non-magnetic layer provided between the adjacent magnetic layers of the magnetic layer 16, for example, Ru, a Ru alloy, a CoCr alloy, a CoCrX1 alloy (X1 represents one or two or more elements selected from among Pt, Ta, Zr, Re, Ru, Cu, Nb, Ni, Mn, Ge, Si, O, N, W, Mo, Ti, V, and B) and the like can be suitably used.

For the non-magnetic layer provided between the adjacent magnetic layers of the magnetic layer 16, it is preferable to use an alloy material containing an oxide, metallic nitride, or metallic carbide. Specifically, as the oxide, for example, $SiO_2$, $Al_2O_3$, $Ta_2O_5$, $Cr_2O_3$, MgO, $Y_2O_3$, $TiO_2$ and the like can be used. As the metallic nitride, for example, AlN, $Si_3N_4$, TaN, CrN and the like can be used. As the metallic carbide, for example, TaC, BC, SiC and the like can be used.

The non-magnetic layer can be formed by, for example, a sputtering method.

The magnetic layer 16 is preferably a magnetic layer for perpendicular magnetic recording in which easy magnetization axis is directed to a direction perpendicular to the substrate surface in order to realize a higher recording density. The magnetic layer 16 may be a magnetic layer for in-plane magnetic recording.

The magnetic layer 16 may be formed by any well-known conventional method such as a deposition method, an ion beam sputtering method, or a magnetron sputtering method. The magnetic layer 16 is normally formed by a sputtering method.

"Protective Layer"

The protective layer 17 protects the magnetic layer 16. The protective layer 17 may be composed of one layer or may be composed of a plurality of layers. Examples of materials of the protective layer 17 include carbon, nitrogen-containing carbon, and silicon carbide.

As the protective layer 17, a carbon-based protective layer can be preferably used, and in particular, an amorphous carbon protective layer is preferable. When the protective layer 17 is a carbon-based protective layer, this is preferable because the interaction with a polar group (particularly a hydroxyl group) contained in the fluorine-containing ether compound in the lubricating layer 18 is further enhanced.

The adhesive force between the carbon-based protective layer and the lubricating layer 18 can be controlled by forming the carbon-based protective layer with hydrogenated carbon and/or nitrogenated carbon and adjusting the hydrogen content and/or nitrogen content in the carbon-based protective layer.

The hydrogen content in the carbon-based protective layer that is measured by a hydrogen forward scattering method (HFS) is preferably 3 to 20 atom %. In addition, the nitrogen content in the carbon-based protective layer that is measured through X-ray photoelectron spectroscopy (XPS) is preferably 4 to 15 atom %.

Hydrogen and/or nitrogen contained in the carbon-based protective layer do not need to be uniformly contained throughout the entire carbon-based protective layer. For example, the carbon-based protective layer is suitably formed as a composition gradient layer in which nitrogen is contained in the protective layer 17 on the side of the lubricating layer 18 and hydrogen is contained in the protective layer 17 on the side of the magnetic layer 16. In this case, the adhesive force between the magnetic layer 16 and the carbon-based protective layer and between the lubricating layer 18 and the carbon-based protective layer is further improved. This is because nitrogen in the protective layer 17 acts as an active site and promotes bonding with the lubricating layer. Hydrogen or nitrogen in the carbon-based protective layer acts as an active site.

The film thickness of the protective layer 17 can be arbitrarily selected and may be 1 nm to 7 nm. When the film thickness of the protective layer 17 is 1 nm or more, sufficient performance of the protective layer 17 can be obtained. When the film thickness of the protective layer 17 is 7 nm or less, this is preferable because the thickness of the protective layer 17 is reduced.

As a method of forming the protective layer 17, a sputtering method using a carbon-containing target material, a chemical vapor deposition (CVD) method using a hydrocarbon raw material such as ethylene or toluene, an ion beam deposition (IBD) method or the like can be used.

When a carbon-based protective layer is formed as the protective layer 17, for example, a DC magnetron sputtering method can be used for layer formation. Particularly, when a carbon-based protective layer is formed as the protective layer 17, an amorphous carbon protective layer is preferably formed by a plasma CVD method. The amorphous carbon protective layer formed by the plasma CVD method has a uniform surface with small roughness.

"Lubricating Layer"

The lubricating layer 18 prevents contamination of the magnetic recording medium 10. In addition, the lubricating layer 18 reduces a frictional force of a magnetic head of a magnetic recording and reproducing device which slides on the magnetic recording medium 10, and thereby improves the durability of the magnetic recording medium 10.

As shown in the FIGURE, the lubricating layer 18 is formed on and in contact with the protective layer 17. The lubricating layer 18 contains the above fluorine-containing ether compound.

When the protective layer 17 arranged below the lubricating layer 18 is a carbon-based protective layer, particularly, the lubricating layer 18 is bonded to the protective layer 17 with a high bonding force. As a result, it is easy to obtain the magnetic recording medium 10 in which the surface of the protective layer 17 is covered at a high coverage even if the thickness of the lubricating layer 18 is thin, and it is possible to effectively prevent contamination on the surface of the magnetic recording medium 10.

The average film thickness of the lubricating layer 18 is preferably 0.5 nm (5 Å) to 2.0 nm (20 Å) and more preferably 0.5 nm (5 Å) to 1.0 nm (10 Å). When the average film thickness of the lubricating layer 18 is 0.5 nm or more, the lubricating layer 18 is formed with a uniform film thickness without forming an island shape or a mesh shape. Therefore, the surface of the protective layer 17 can be covered with the lubricating layer 18 at a high coverage. In addition, when the average film thickness of the lubricating layer 18 is 2.0 nm or less, it is possible to sufficiently reduce the thickness of the lubricating layer 18, and to sufficiently decrease the flying height of a magnetic head.

When the surface of the protective layer 17 is not sufficiently covered with the lubricating layer 18 at a high coverage, an environmental substance adsorbed to the surface of the magnetic recording medium 10 passes through voids in the lubricating layer 18 and intrudes under the lubricating layer 18. The environmental substance that has intruded under the lubricating layer 18 is adsorbed and bonded to the protective layer 17 and generates a contamination substance. Then, during magnetic recording and reproducing, the contamination substance (aggregated component) adheres (transfers) to a magnetic head as a smear to break the magnetic head or degrade the magnetic recording and reproducing characteristics of magnetic recording and reproducing devices.

Examples of environmental substances that generate contamination substances include siloxane compounds (cyclic siloxane and linear siloxane), ionic impurities, hydrocarbons having a relatively high molecular weight such as octacosane, and plasticizers such as dioctyl phthalate. Examples of metal ions that are contained in ionic impurities include sodium ions and potassium ions. Examples of inorganic ions contained in ionic impurities include chloride ions, bromide ions, nitrate ions, sulfate ions, and ammonium ions. Examples of organic ions contained in ionic impurities include oxalate ions and formate ions.

"Method of Forming Lubricating Layer"

Examples of methods of forming the lubricating layer 18 include a method in which a magnetic recording medium during production in which respective layers up to the protective layer 17 are formed on the substrate 11 is prepared, and a solution for forming a lubricating layer is applied onto the protective layer 17 and dried.

The solution for forming a lubricating layer can be obtained, for example, by dispersing and dissolving the above-described lubricant for a magnetic recording medium of the embodiment in a solvent as necessary and setting the viscosity and concentration to be suitable for application methods. Examples of solvents used for the solution for forming a lubricating layer include a fluorine solvent such as VERTREL (registered trademark) XF (product name, commercially available from Du Pont-Mitsui Fluorochemicals Co., Ltd.).

A method of applying a solution for forming a lubricating layer is not particularly limited, and examples thereof include a spin coating method, a spraying method, a paper coating method, and a dipping method.

When a dipping method is used, for example, the following method can be used. First, the substrate 11 on which respective layers up to the protective layer 17 are formed is immersed in a solution for forming a lubricating layer that is put into an immersion vessel of a dip coater. Next, the substrate 11 is lifted from the immersion vessel at a predetermined speed. In this way, the solution for forming a lubricating layer is applied to the surface on the protective layer 17 of the substrate 11.

When a dipping method is used, the solution for forming a lubricating layer can be uniformly applied to the surface of the protective layer 17, and the lubricating layer 18 with a uniform film thickness can be formed on the protective layer 17.

In the present embodiment, a thermal treatment is preferably performed on the substrate 11 on which the lubricating layer 18 is formed. When the thermal treatment is performed, the adhesion between the lubricating layer 18 and the protective layer 17 is improved, and the adhesive force between the lubricating layer 18 and the protective layer 17 is improved.

The thermal treatment temperature is preferably set to 100 to 180° C. When the thermal treatment temperature is 100° C. or higher, an effect of improving the adhesion between the lubricating layer 18 and the protective layer 17 can be sufficiently obtained. In addition, when the thermal treatment temperature is set to 180° C. or lower, it is possible to prevent thermal decomposition of the lubricating layer 18. The thermal treatment time is preferably set to 10 to 120 minutes.

In the present embodiment, in order to further improve the adhesive force of the lubricating layer 18 to the protective layer 17, a treatment of emitting ultraviolet rays (UV) to the lubricating layer 18 of the substrate 11 before the thermal treatment or after the thermal treatment may be performed.

The magnetic recording medium 10 of the present embodiment includes at least the magnetic layer 16, the protective layer 17, and the lubricating layer 18 which are sequentially provided on the substrate 11. In the magnetic recording medium 10 of the present embodiment, the lubricating layer 18 containing the above-described fluorine-containing ether compound is formed on and in contact with the protective layer 17. Therefore, the magnetic recording medium 10 of the present embodiment has the lubricating layer 18 which has favorable adhesion to the protective layer 17 and in which pickup and spin-off are less likely to occur, and has excellent reliability and durability.

Since the magnetic recording medium 10 of the present embodiment has the lubricating layer 18 in which pickup is less likely to occur, it is possible to further reduce the magnetic spacing. In addition, since the magnetic recording medium 10 of the present embodiment has the lubricating layer 18 in which spin-off is less likely to occur, it is possible to increase the rotational speed of the magnetic recording medium. Accordingly, the magnetic recording medium 10 of the present embodiment can contribute to increasing the capacity of the magnetic recording medium. Therefore, the magnetic recording medium 10 of the present embodiment is particularly suitable as a magnetic disk mounted in a Load Unload type (LUL type) magnetic disk device.

On the other hand, conventional magnetic recording media have problems that, since the adhesion of the lubricant to the protective layer is insufficient, if the magnetic spacing is reduced, pickup is likely to occur, and if the rotational speed of the magnetic recording medium increases, spin-off is more likely to occur. Therefore, in conventional magnetic recording media, it is difficult to reduce the magnetic spacing and increase the rotational speed of the magnetic recording medium while maintaining the reliability and durability.

EXAMPLES

Hereinafter, the present invention will be described in more detail with reference to examples and comparative examples. In addition, the present invention is not limited only to the following examples.

[NMR Measurement Method]

The structure of the compounds obtained in the following examples was identified by performing $^1$H-NMR measurement and $^{19}$F-NMR measurement using AVANCE 111-400 (commercially available from Bruker BioSpin). For NMR measurement, about 10 mg of a sample that was weighed and dissolved in about 0.5 mL of deuterated acetone (hexafluorobenzene was added as a reference substance), was used. The $^1$H-NMR chemical shift reference was 2.05 ppm for the acetone peak. The $^{19}$F-NMR chemical shift reference was −164.7 ppm for the hexafluorobenzene peak.

The number-average molecular weight (Mn) of each compound was calculated from the $^{19}$F-NMR measurement results. Specifically, the number of repeating units of the PFPE chain was calculated from the integrated fluorine atom intensity measured through $^{19}$F-NMR, the number-average molecular weight of the PFPE chain and the number-average molecular weight of the whole molecule for each compound were obtained, and the ratio thereof (PFPE ratio=PFPE chain/whole molecule) was calculated. The results are shown in Table 1 to Table 5.

Example 1

A compound (AA1) represented by Formula (AA1) shown above (in Formula (AA1), ma1 indicating the average degree of polymerization is 3.4, and na1 indicating the average degree of polymerization is 3.4) was obtained by the following method.

First, a compound represented by Formula (11-2) shown below was synthesized by the following method. 2 equivalents of 3-buten-1-ol and 1 equivalent of epichlorohydrin were reacted to synthesize a compound represented by Formula (11-1) shown below. The obtained compound represented by Formula (11-1) and 3,4-dihydro-2H-pyran were reacted to protect the hydroxyl group with a tetrahydropyranyl group, the double bond on one side was then oxidized with m-chloroperbenzoic acid, and thus the compound represented by Formula (11-2) shown below was synthesized.

(11-1)

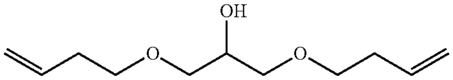

(11-2)

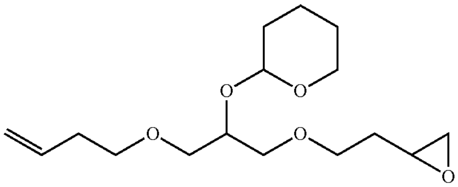

In addition, a compound represented by Formula (11-4) shown below was synthesized by the following method. 1 equivalent of 3-allyloxy-1,2-propanediol and 2 equivalents of 2-(2-bromoethoxy)tetrahydro-2H-pyran were reacted to synthesize a compound represented by Formula (11-3) shown below. The double bond of the obtained compound represented by Formula (11-3) was oxidized with m-chloroperbenzoic acid, and thus the compound represented by Formula (11-4) shown below was synthesized.

(11-3)

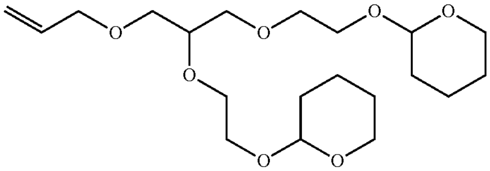

-continued (11-4)

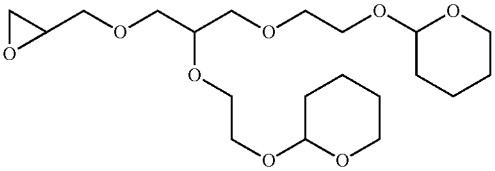

A fluoropolyether (a number-average molecular weight of 800 and a molecular weight distribution of 1.1) (40.0 g) represented by $HOCH_2CF_2O(CF_2CF_2O)_m(CF_2O)_nCF_2CH_2OH$ (in the formula, m indicating the average degree of polymerization is 3.4, and n indicating the average degree of polymerization is 3.4), a compound represented by Formula (11-2) (9.01 g), and t-BuOH (tertiary butyl alcohol) (40.0 mL) were charged into a 200 mL eggplant flask under a nitrogen gas atmosphere and stirred until the mixture became uniform at room temperature. In addition, t-BuOK (potassium tert-butoxide) (1.68 g) was put into the eggplant flask, and the mixture was heated to 70° C., and stirred for 12 hours to perform a reaction.

Then, the obtained reaction product was cooled to 25° C., water was added, VERTREL (registered trademark, commercially available from Du Pont-Mitsui Fluorochemicals Co., Ltd.) XF (hereinafter sometimes referred to as "VERTREL XF") as a solvent was additionally added, the organic layer was extracted, and washing with water was performed. Anhydrous sodium sulfate was added to the organic layer for dehydration, the drying agent was filtered and the filtrate was then concentrated. The residue was purified by silica gel column chromatography, and thereby a compound (22.0 g) represented by Formula (11-5) shown below was obtained.

(11-5)

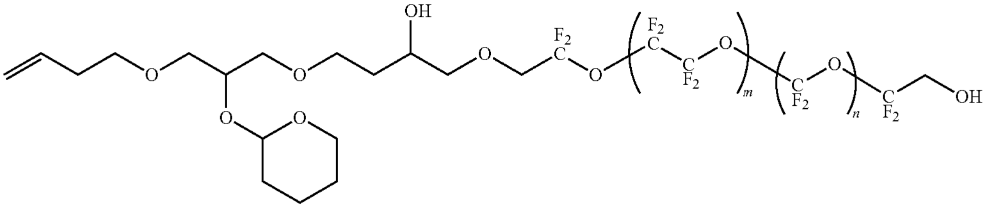

(in Formula (11-5), m indicating the average degree of polymerization is 3.4, and n indicating the average degree of polymerization is 3.4)

A compound represented by Formula (11-5) (22.0 g), a compound represented by Formula (11-4) (8.90 g), and t-BuOH (tertiary butyl alcohol) (65.0 mL) were charged into a 200 mL eggplant flask under a nitrogen gas atmosphere and stirred until the mixture became uniform at room temperature. In addition, t-BuOK (potassium tert-butoxide) (0.67 g) was put into the eggplant flask, and the mixture was heated to 70° C., and stirred for 16 hours to perform a reaction.

Then, the obtained reaction product was cooled to 25° C., a 7% hydrogen chloride/methanol reagent (104.2 g) was added, and the mixture was stirred at room temperature for 3 hours to perform a deprotection reaction.

The obtained reaction product was added to 7% sodium bicarbonate water (250 mL) for neutralization, VERTREL XF was then added, the organic layer was extracted, and washing with water was performed. Anhydrous sodium sulfate was added to the organic layer for dehydration, the drying agent was filtered and the filtrate was then concentrated. The residue was purified by silica gel column chromatography, and thereby 17.5 g of the compound (AA1) was obtained.

$^{1}$H-NMR measurement and $^{19}$F-NMR measurement of the obtained compound (AA1) were performed, and the structure was identified from the following results.

$^{1}$H-NMR (acetone-$d_6$): δ [ppm]=1.58-1.82(2H), 2.34 (2H), 3.40-4.20(39H), 4.98(1H), 5.05(1H), 5.82(1H)

$^{19}$F-NMR (acetone-$d_6$): δ [ppm]=−51.99 to −55.72(6.8F), −78.48(2F), −80.66(2F), −89.16 to −91.14(13.6F)

Example 2

A compound (AA2) represented by Formula (AA2) shown above (in Formula (AA2), na2 indicating the average degree of polymerization is 5.4) was obtained by the following method.

The same operation as in Example 1 was carried out except that, a fluoropolyether (a number-average molecular weight of 800 and a molecular weight distribution of 1.1) (40.0 g) represented by $HOCH_2CF_2O(CF_2CF_2O)_zCF_2CH_2OH$ (in the formula, z indicating the average degree of polymerization is 5.4) was used instead of a fluoropolyether (a number-average molecular weight of 800 and a molecular weight distribution of 1.1) represented by $HOCH_2CF_2O(CF_2CF_2O)_m(CF_2O)_nCF_2CH_2OH$ (in the formula, m indicating the average degree of polymerization is 3.4, and n indicating the average degree of polymerization is 3.4) used in Example 1, thereby obtaining 17.3 g of the compound (AA2).

$^{1}$H-NMR measurement and $^{19}$F-NMR measurement of the obtained compound (AA2) were performed, and the structure was identified from the following results.

$^{1}$H-NMR (acetone-$d_6$): δ [ppm]=1.58-1.82(2H), 2.34 (2H), 3.40-4.20(39H), 4.98(1H), 5.05(1H), 5.82(1H)

$^{19}$F-NMR (acetone-$d_6$): δ [ppm]=−78.57(4F), −88.92 to −89.57(21.6F)

Example 3

A compound (AA3) represented by Formula (AA3) shown above (in Formula (AA3), na3 indicating the average degree of polymerization is 3.1) was obtained by the following method.

The same operation as in Example 1 was carried out except that, a fluoropolyether (a number-average molecular weight of 800 and a molecular weight distribution of 1.1) (40.0 g) represented by $HOCH_2CF_2CF_2O(CF_2CF_2CF_2O)_xCF_2CF_2CH_2OH$ (in the formula, x indicating the average degree of polymerization is 3.1) was used instead of a fluoropolyether (a number-average molecular weight of 800 and a molecular weight distribution of 1.1) represented by $HOCH_2CF_2O(CF_2CF_2O)_m(CF_2O)$ $CF_2CH_2OH$ (in the formula, m indicating the average degree of polymerization is 3.4, and n indicating the average degree of polymerization is 3.4) used in Example 1, thereby obtaining 17.4 g of the compound (AA3).

$^{1}$H-NMR measurement and $^{19}$F-NMR measurement of the obtained compound (AA3) were performed, and the structure was identified from the following results.

$^{1}$H-NMR (acetone-$d_6$): δ [ppm]=1.58-1.82(2H), 2.34 (2H), 3.40-4.20(39H), 4.98(1H), 5.05(1H), 5.82(1H)

$^{19}$F-NMR (acetone-$d_6$): δ [ppm]=−84.22(12.4F), −86.40 (4F), −124.30(4F), −130.08(6.2F)

Example 4

A compound (AA4) represented by Formula (AA4) shown above (in Formula (AA4), na4 indicating the average degree of polymerization is 2.0) was obtained by the following method.

The same operation as in Example 1 was carried out except that, a fluoropolyether (a number-average molecular weight of 800 and a molecular weight distribution of 1.1) (40.0 g) represented by $HOCH_2CF_2CF_2CF_2O(CF_2CF_2CF_2CF_2O)_yCF_2CF_2CF_2CH_2OH$ (in the formula, y indicating the average degree of polymerization is 2.0) was used instead of a fluoropolyether (a number-average molecular weight of 800 and a molecular weight distribution of 1.1) represented by $HOCH_2CF_2O(CF_2CF_2O)_m(CF_2O)_nCF_2CH_2OH$ (in the formula, m indicating the average degree of polymerization is 3.4, and n indicating the average degree of polymerization is 3.4) used in Example 1, thereby obtaining 17.6 g of the compound (AA4).

$^{1}$H-NMR measurement and $^{19}$F-NMR measurement of the obtained compound (AA4) were performed, and the structure was identified from the following results.

$^{1}$H-NMR (acetone-$d_6$): δ [ppm]=1.58-1.82(2H), 2.34 (2H), 3.40-4.20(39H), 4.98(1H), 5.05(1H), 5.82(1H)

$^{19}$F-NMR (acetone-$d_6$): δ [ppm]=−83.70(12F), −123.32 (4F), −125.85(8F), −127.63(4F)

Example 5

A compound (AB1) represented by Formula (AB1) shown above (in Formula (AB1), mb1 indicating the average degree of polymerization is 3.4, and nb1 indicating the average degree of polymerization is 3.4) was obtained by the following method.

First, a compound represented by Formula (11-6) shown below was synthesized by the following method. 1 equivalent of 3-allyloxy-1,2-propanediol and 2 equivalents of 2-(3-bromopropoxy)tetrahydro-2H-pyran were reacted, the double bond of the obtained compound was then oxidized with m-chloroperbenzoic acid, and thus the compound represented by Formula (11-6) shown below was synthesized.

(11-6)

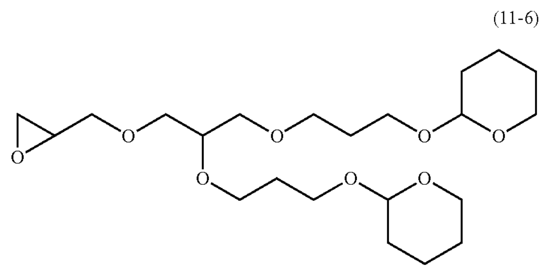 [SMILES: C1CCC(OCCCOCC(COCC2CO2)OCCCOC2CCCCO2)OC1]

The same operation as in Example 1 was carried out except that the compound (9.21 g) represented by Formula (11-6) was used instead of the compound represented by Formula (11-4) used in Example 1, thereby obtaining 17.9 g of the compound (AB1).

$^{1}$H-NMR measurement and $^{19}$F-NMR measurement of the obtained compound (AB1) were performed, and the structure was identified from the following results.

$^{1}$H-NMR (acetone-$d_6$): δ [ppm]=1.58-1.82(6H), 2.34 (2H), 3.40-4.20(39H), 4.98(1H), 5.05(1H), 5.82(1H)

$^{19}$F-NMR (acetone-$d_6$): δ [ppm]=−51.99 to −55.72(6.8F), −78.48(2F), −80.66(2F), −89.16 to −91.14(13.6F)

Example 6

A compound (AC1) represented by Formula (AC1) shown above (in Formula (AC1), mc1 indicating the average degree of polymerization is 3.4, and nc1 indicating the average degree of polymerization is 3.4) was obtained by the following method.

First, a compound represented by Formula (11-7) shown below was synthesized by the following method. 1 equivalent of 3-allyloxy-1,2-propanediol and 2 equivalents of 2-(4-bromobutoxy)tetrahydro-2H-pyran were reacted, the double bond of the obtained compound was then oxidized with m-chloroperbenzoic acid, and thus the compound represented by Formula (11-7) shown below was synthesized.

(11-7)

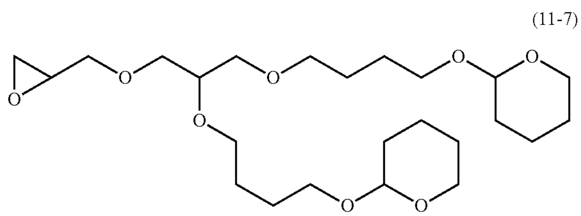 [SMILES: C(CCOC1CCCCO1)COCC(COCC1CO1)OCCCCOC1CCCCO1]

The same operation as in Example 1 was carried out except that the compound (9.82 g) represented by Formula (11-7) was used instead of the compound represented by Formula (11-4) used in Example 1, thereby obtaining 18.3 g of the compound (AC1).

$^1$H-NMR measurement and $^{19}$F-NMR measurement of the obtained compound (AC1) were performed, and the structure was identified from the following results.

$^1$H-NMR (acetone-$d_6$): δ [ppm]=1.58-1.82(10H), 2.34 (2H), 3.40-4.20(39H), 4.98(1H), 5.05(1H), 5.82(1H)

$^{19}$F-NMR (acetone-$d_6$): δ [ppm]=−51.99 to −55.72(6.8F), −78.48(2F), −80.66(2F), −89.16 to −91.14(13.6F)

Example 7

A compound (AD1) represented by Formula (AD1) shown above (in Formula (AD1), md1 indicating the average degree of polymerization is 3.4, and nd1 indicating the average degree of polymerization is 3.4) was obtained by the following method.

First, a compound represented by Formula (11-8) shown below was synthesized by the following method. Allyl glycidyl ether was reacted with tetrahydropyranylethyleneglycol, and furthermore 2-(3-bromopropoxy)tetrahydro-2H-pyran was then reacted. The double bond of the obtained compound was oxidized with m-chloroperbenzoic acid and thus the compound represented by Formula (11-8) shown below was synthesized.

(11-8)

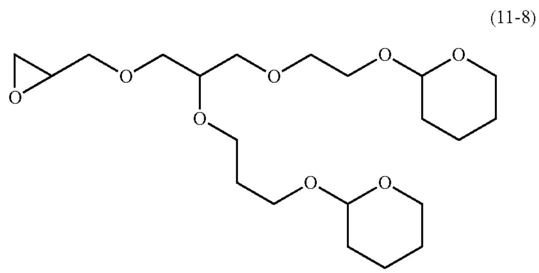 [SMILES: C1CCC(OCCCOC(COCCOC2CCCCO2)COCC2CO2)OC1]

The same operation as in Example 1 was carried out except that the compound (9.70 g) represented by Formula (11-8) was used instead of the compound represented by Formula (11-4) used in Example 1, thereby obtaining 17.9 g of the compound (AD1).

$^1$H-NMR measurement and $^{19}$F-NMR measurement of the obtained compound (AD1) were performed, and the structure was identified from the following results.

$^1$H-NMR (acetone-$d_6$): δ [ppm]=1.58-1.82(4H), 2.34 (2H), 3.40-4.20(39H), 4.98(1H), 5.05(1H), 5.82(1H)

$^{19}$F-NMR (acetone-$d_6$): δ [ppm]=−51.99 to −55.72(6.8F), −78.48(2F), −80.66(2F), −89.16 to −91.14(13.6F)

Example 8

A compound (AE1) represented by Formula (AE1) shown above (in Formula (AE1), me1 indicating the average degree of polymerization is 3.4, and ne1 indicating the average degree of polymerization is 3.4) was obtained by the following method.

First, a compound represented by Formula (11-10) shown below was synthesized by the following method. The double bond on one side of di(3-butenyl)ether was oxidized with 1 equivalent of m-chloroperbenzoic acid, an epoxy was then ring-opened using concentrated sulfuric acid, and thus the compound represented by Formula (11-9) shown below was synthesized. The obtained compound represented by Formula (11-9) was reacted with 2 equivalents of 2-(2-bromoethoxy)tetrahydro-2H-pyran and then oxidized with m-chloroperbenzoic acid, and thus the compound represented by Formula (11-10) shown below was synthesized.

(11-9)

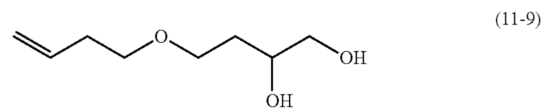

(11-10)

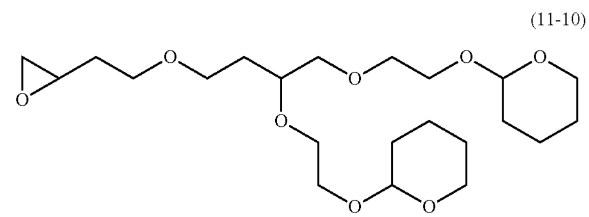

The same operation as in Example 1 was carried out except that the compound (10.01 g) represented by Formula (11-10) was used instead of the compound represented by Formula (11-4) used in Example 1, thereby obtaining 18.2 g of the compound (AE1).

$^1$H-NMR measurement and $^{19}$F-NMR measurement of the obtained compound (AE1) were performed, and the structure was identified from the following results.

$^1$H-NMR (acetone-$d_6$): δ [ppm]=1.58-1.82(6H), 2.34 (2H), 3.40-4.20(39H), 4.98(1H), 5.05(1H), 5.82(1H)

$^{19}$F-NMR (acetone-$d_6$): δ [ppm]=−51.99 to −55.72(6.8F), −78.48(2F), −80.66(2F), −89.16 to −91.14(13.6F)

Example 9

A compound (AF1) represented by Formula (AF1) shown above (in Formula (AF1), mf1 indicating the average degree of polymerization is 3.4, and nf1 indicating the average degree of polymerization is 3.4) was obtained by the following method.

First, a compound represented by Formula (11-11) shown below was synthesized by the following method. The compound represented by Formula (11-4) shown above was reacted with allyl alcohol, the double bond of the obtained compound was then oxidized with m-chloroperbenzoic acid, and thus the compound represented by Formula (11-11) shown below was synthesized.

(11-11)

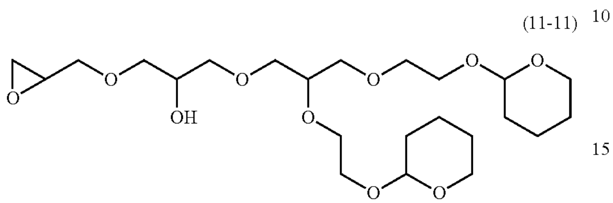

The same operation as in Example 1 was carried out except that the compound (10.21 g) represented by Formula (11-11) was used instead of the compound represented by Formula (11-4) used in Example 1, thereby obtaining 19.1 g of the compound (AF1).

$^1$H-NMR measurement and $^{19}$F-NMR measurement of the obtained compound (AF1) were performed, and the structure was identified from the following results.

$^1$H-NMR (acetone-$d_6$): δ [ppm]=1.58-1.82(2H), 2.34 (2H), 3.40-4.20(45H), 4.98(1H), 5.05(1H), 5.82(1H)

$^{19}$F-NMR (acetone-$d_6$): δ [ppm]=−51.99 to −55.72(6.8F), −78.48(2F), −80.66(2F), −89.16 to −91.14(13.6F)

Example 10

A compound (AG1) represented by Formula (AG1) shown above (in Formula (AG1), mg1 indicating the average degree of polymerization is 3.4, and ng1 indicating the average degree of polymerization is 3.4) was obtained by the following method.

First, a compound represented by Formula (11-13) shown below was synthesized by the following method. A carbonyl moiety of 2,2-dimethyl-1,3-dioxan-5-one was reduced with lithium aluminum hydride, and thus the compound represented by Formula (11-12) shown below was synthesized. The obtained compound represented by Formula (11-12) was reacted with epibromohydrin, and thus the compound represented by Formula (11-13) shown below was synthesized.

(11-12)

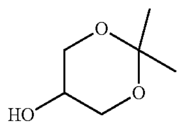

(11-13)

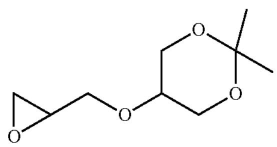

The same operation as in Example 1 was carried out except that the compound (7.80 g) represented by Formula (11-13) was used instead of the compound represented by Formula (11-4) used in Example 1, thereby obtaining 15.2 g of the compound (AG1).

$^1$H-NMR measurement and $^{19}$F-NMR measurement of the obtained compound (AG1) were performed, and the structure was identified from the following results.

$^1$H-NMR (acetone-$d_6$): δ [ppm]=1.58-1.82(2H), 2.34 (2H), 3.40-4.20(31H), 4.98(1H), 5.05(1H), 5.82(1H)

$^{19}$F-NMR (acetone-$d_6$): δ [ppm]=−51.99 to −55.72(6.8F), −78.48(2F), −80.66(2F), −89.16 to −91.14(13.6F)

Example 11

A compound (AH1) represented by Formula (AH1) shown above (in Formula (AH1), mh1 indicating the average degree of polymerization is 3.4, and nh1 indicating the average degree of polymerization is 3.4) was obtained by the following method.

First, a compound represented by Formula (11-14) shown below was synthesized by the following method. 5-hydroxymethyl-2,2-dimethyl-1,3-dioxane was reacted with epibromohydrin, and thus the compound represented by Formula (11-14) shown below was synthesized.

(11-14)

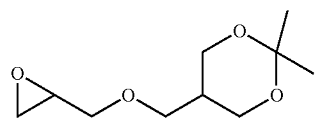

The same operation as in Example 1 was carried out except that the compound (7.87 g) represented by Formula (11-14) was used instead of the compound represented by Formula (11-4) used in Example 1, thereby obtaining 15.5 g of the compound (AH1).

$^1$H-NMR measurement and $^{19}$F-NMR measurement of the obtained compound (AH1) were performed, and the structure was identified from the following results.

$^1$H-NMR (acetone-$d_6$): δ [ppm]=1.58-1.82(2H), 2.10 (1H), 2.34(2H), 3.40-4.20(32H), 4.98(1H), 5.05(1H), 5.82 (1H)

$^{19}$F-NMR (acetone-$d_6$): δ [ppm]=−51.99 to −55.72(6.8F), −78.48(2F), −80.66(2F), −89.16 to −91.14(13.6F)

Example 12

A compound (AI1) represented by Formula (AI1) shown above (in Formula (AI1), mi1 indicating the average degree of polymerization is 3.4, and ni1 indicating the average degree of polymerization is 3.4) was obtained by the following method.

First, a compound represented by Formula (11-15) shown below was synthesized by the following method. 5-hydroxyethyl-2,2-dimethyl-1,3-dioxane was reacted with epibromohydrin, and thus the compound represented by Formula (11-15) shown below was synthesized.

(11-15)

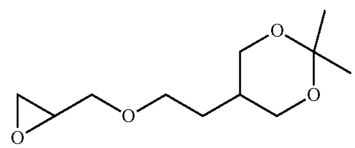

The same operation as in Example 1 was carried out except that the compound (7.95 g) represented by Formula (11-15) was used instead of the compound represented by Formula (11-4) used in Example 1, thereby obtaining 16.1 g of the compound (AI1).

$^1$H-NMR measurement and $^{19}$F-NMR measurement of the obtained compound (AI1) were performed, and the structure was identified from the following results.

$^1$H-NMR (acetone-$d_6$): δ [ppm]=1.58-1.82(4H), 2.10 (1H), 2.34(2H), 3.40-4.20(32H), 4.98(1H), 5.05(1H), 5.82 (1H)

$^{19}$F-NMR (acetone-$d_6$): δ [ppm]=−51.99 to −55.72(6.8F), −78.48(2F), −80.66(2F), −89.16 to −91.14(13.6F)

Example 13

A compound (AJ1) represented by Formula (AJ1) shown above (in Formula (AJ1), mj1 indicating the average degree of polymerization is 3.4 and nj1 indicating the average degree of polymerization is 3.4) was obtained by the following method.

First, a compound represented by Formula (11-16) shown below was synthesized by the following method. The compound represented by Formula (11-12) shown above was reacted with 3-butenyl bromide, and then oxidized with m-chloroperbenzoic acid, and thus the compound represented by Formula (11-16) shown below was synthesized.

(11-16)

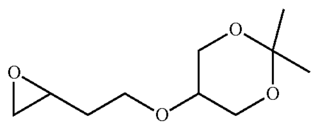

The same operation as in Example 1 was carried out except that the compound (7.14 g) represented by Formula (11-16) was used instead of the compound represented by Formula (11-4) used in Example 1, thereby obtaining 14.8 g of the compound (AJ1).

$^1$H-NMR measurement and $^{19}$F-NMR measurement of the obtained compound (AJ1) were performed, and the structure was identified from the following results.

$^1$H-NMR (acetone-$d_6$): δ [ppm]=1.58-1.82(4H), 2.34 (2H), 3.40-4.20(31H), 4.98(1H), 5.05(1H), 5.82(1H)

$^{19}$F-NMR (acetone-$d_6$): δ [ppm]=−51.99 to −55.72(6.8F), −78.48(2F), −80.66(2F), −89.16 to −91.14(13.6F)

Example 14

A compound (AK1) represented by Formula (AK1) shown above (in Formula (AK1), mk1 indicating the average degree of polymerization is 3.4 and nk1 indicating the average degree of polymerization is 3.4) was obtained by the following method.

First, a compound represented by Formula (11-17) shown below was synthesized by the following method. The compound represented by Formula (11-13) shown above was reacted with allyl alcohol, the double bond of the obtained compound was then oxidized with m-chloroperbenzoic acid, and thus the compound represented by Formula (11-17) shown below was synthesized.

(11-17)

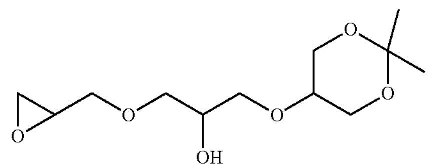

The same operation as in Example 1 was carried out except that the compound (8.23 g) represented by Formula (11-17) was used instead of the compound represented by Formula (11-4) used in Example 1, thereby obtaining 16.6 g of the compound (AK1).

$^1$H-NMR measurement and $^{19}$F-NMR measurement of the obtained compound (AK1) were performed, and the structure was identified from the following results.

$^1$H-NMR (acetone-$d_6$): δ [ppm]=1.58-1.82(2H), 2.34 (2H), 3.40-4.20(37H), 4.98(1H), 5.05(1H), 5.82(1H)

$^{19}$F-NMR (acetone-$d_6$): δ [ppm]=−51.99 to −55.72(6.8F), −78.48(2F), −80.66(2F), −89.16 to −91.14(13.6F)

Example 15

A compound (AL1) represented by Formula (AL1) shown above (in Formula (AL1), ml1 indicating the average degree of polymerization is 3.4 and nl1 indicating the average degree of polymerization is 3.4) was obtained by the following method.

First, a compound represented by Formula (11-18) shown below was synthesized by the following method. The compound represented by Formula (11-13) shown above was reacted with 3-buten-1-ol, the double bond of the obtained compound was then oxidized with m-chloroperbenzoic acid, and thus the compound represented by Formula (11-18) shown below was synthesized.

(11-18)

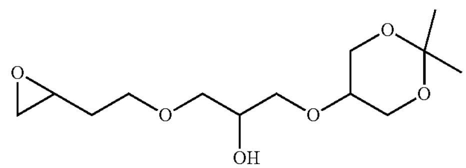

The same operation as in Example 1 was carried out except that the compound (8.31 g) represented by Formula (11-18) was used instead of the compound represented by Formula (11-4) used in Example 1, thereby obtaining 15.6 g of the compound (AL1).

$^1$H-NMR measurement and $^{19}$F-NMR measurement of the obtained compound (AL1) were performed, and the structure was identified from the following results.

$^1$H-NMR (acetone-$d_6$): δ [ppm]=1.58-1.82(4H), 2.34 (2H), 3.40-4.20(37H), 4.98(1H), 5.05(1H), 5.82(1H)

$^{19}$F-NMR (acetone-$d_6$): δ [ppm]=−51.99 to −55.72(6.8F), −78.48(2F), −80.66(2F), −89.16 to −91.14(13.6F)

Example 16

A compound (AM1) represented by Formula (AM1) shown above (in Formula (AM1), mm1 indicating the average degree of polymerization is 3.4 and nm1 indicating the average degree of polymerization is 3.4) was obtained by the following method.

First, a compound represented by Formula (11-20) shown below was synthesized by the following method. 2 equivalents of tetrahydropyranylethyleneglycol and 1 equivalent of epichlorohydrin were reacted to synthesize a compound represented by Formula (11-19) shown below. The obtained compound represented by Formula (11-19) was reacted with epibromohydrin, and thus the compound represented by Formula (11-20) shown below was synthesized.

(11-19)

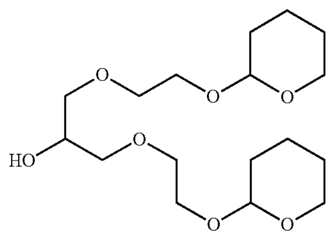

(11-20)

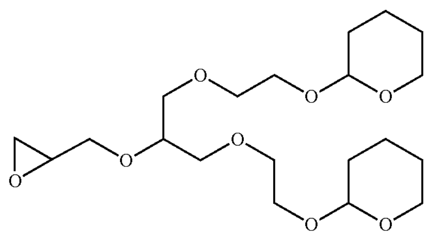

The same operation as in Example 1 was carried out except that the compound (8.90 g) represented by Formula (11-20) was used instead of the compound represented by Formula (11-4) used in Example 1, thereby obtaining 16.3 g of the compound (AM1).

$^1$H-NMR measurement and $^{19}$F-NMR measurement of the obtained compound (AM1) were performed, and the structure was identified from the following results.

$^1$H-NMR (acetone-$d_6$): δ [ppm]=1.58-1.82(2H), 2.34 (2H), 3.40-4.20(39H), 4.98(1H), 5.05(1H), 5.82(1H)

$^{19}$F-NMR (acetone-$d_6$): δ [ppm]=−51.99 to −55.72(6.8F), −78.48(2F), −80.66(2F), −89.16 to −91.14(13.6F)

Example 17

A compound (AM2) represented by Formula (AM2) shown above (in Formula (AM2), nm2 indicating the average degree of polymerization is 5.4) was obtained by the following method.

The same operation as in Example 16 was carried out except that, a fluoropolyether (a number-average molecular weight of 800 and a molecular weight distribution of 1.1) (40.0 g) represented by $HOCH_2CF_2O(CF_2CF_2O)_zCF_2CH_2OH$ (in the formula, z indicating the average degree of polymerization is 5.4) was used instead of a fluoropolyether (a number-average molecular weight of 800 and a molecular weight distribution of 1.1) represented by $HOCH_2CF_2O(CF_2CF_2O)_m(CF_2O)CF_2CH_2OH$ (in the formula, m indicating the average degree of polymerization is 3.4, and n indicating the average degree of polymerization is 3.4) used in Example 16, thereby obtaining 17.6 g of the compound (AM2).

$^1$H-NMR measurement and $^{19}$F-NMR measurement of the obtained compound (AM2) were performed, and the structure was identified from the following results.

$^1$H-NMR (acetone-$d_6$): δ [ppm]=1.58-1.82(2H), 2.34 (2H), 3.40-4.20(39H), 4.98(1H), 5.05(1H), 5.82(1H)

$^{19}$F-NMR (acetone-$d_6$): δ [ppm]=−78.57(4F), −88.92 to −89.57(21.6F)

Example 18

A compound (AM3) represented by Formula (AM3) shown above (in Formula (AM3), nm3 indicating the average degree of polymerization is 3.1) was obtained by the following method.

The same operation as in Example 16 was carried out except that, a fluoropolyether (a number-average molecular weight of 800 and a molecular weight distribution of 1.1) (40.0 g) represented by $HOCH_2CF_2CF_2O(CF_2CF_2CF_2O)_xCF_2CF_2CH_2OH$ (in the formula, x indicating the average degree of polymerization is 3.1) was used instead of a fluoropolyether (a number-average molecular weight of 800 and a molecular weight distribution of 1.1) represented by $HOCH_2CF_2O(CF_2CF_2O)_m(CF_2O)CF_2CH_2OH$ (in the formula, m indicating the average degree of polymerization is 3.4, and n indicating the average degree of polymerization is 3.4) used in Example 16, thereby obtaining 17.1 g of the compound (AM3).

$^1$H-NMR measurement and $^{19}$F-NMR measurement of the obtained compound (AM3) were performed, and the structure was identified from the following results.

$^1$H-NMR (acetone-$d_6$): δ [ppm]=1.58-1.82(2H), 2.34 (2H), 3.40-4.20(39H), 4.98(1H), 5.05(1H), 5.82(1H)

$^{19}$F-NMR (acetone-$d_6$): δ [ppm]=−84.22(12.4F), −86.40 (4F), −124.30(4F), −130.08(6.2F)

Example 19

A compound (AM4) represented by Formula (AM4) shown above (in Formula (AM4), nm4 indicating the average degree of polymerization is 2.0) was obtained by the following method.

The same operation as in Example 16 was carried out except that, a fluoropolyether (a number-average molecular weight of 800 and a molecular weight distribution of 1.1) (40.0 g) represented by $HOCH_2CF_2CF_2CF_2O(CF_2CF_2CF_2CF_2O)_yCF_2CF_2CF_2CH_2OH$ (in the formula, y indicating the average degree of polymerization is 2.0) was used instead of a fluoropolyether (a number-average molecular weight of 800 and a molecular weight distribution of 1.1) represented by $HOCH_2CF_2O(CF_2CF_2O)_m(CF_2O)_nCF_2CH_2OH$ (in the formula, m indicating the average degree of polymerization is 3.4, and n indicating the average degree of polymerization is 3.4) used in Example 16, thereby obtaining 17.0 g of the compound (AM4).

$^1$H-NMR measurement and $^{19}$F-NMR measurement of the obtained compound (AM4) were performed, and the structure was identified from the following results.

$^1$H-NMR (acetone-$d_6$): δ [ppm]=1.58-1.82(2H), 2.34 (2H), 3.40-4.20(39H), 4.98(1H), 5.05(1H), 5.82(1H)

$^{19}$F-NMR (acetone-$d_6$): δ [ppm]=−83.70(12F), −123.32 (4F), −125.85(8F), −127.63(4F)

Example 20

A compound (AN1) represented by Formula (AN1) shown above (in Formula (AN1), mn1 indicating the average degree of polymerization is 3.4 and nn1 indicating the average degree of polymerization is 3.4) was obtained by the following method.

First, a compound represented by Formula (11-22) shown below was synthesized by the following method. 2 equivalents of tetrahydropyranyltrimethyleneglycol and 1 equivalent of epichlorohydrin were reacted to synthesize a compound represented by Formula (11-21) shown below. The obtained compound represented by Formula (11-21) was reacted with epibromohydrin, and thus the compound represented by Formula (11-22) shown below was synthesized.

(11-21)

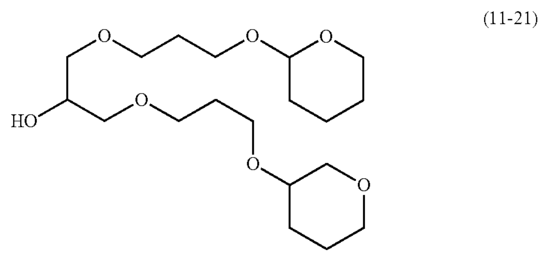

(11-22)

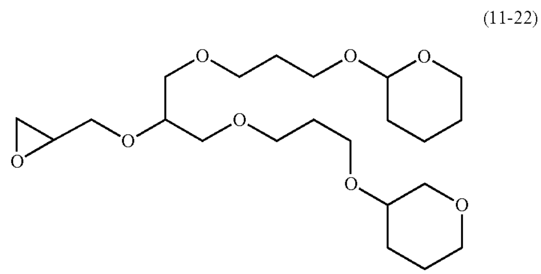

The same operation as in Example 1 was carried out except that the compound (9.11 g) represented by Formula (11-22) was used instead of the compound represented by Formula (11-4) used in Example 1, thereby obtaining 16.8 g of the compound (AN1).

$^{1}$H-NMR measurement and $^{19}$F-NMR measurement of the obtained compound (AN1) were performed, and the structure was identified from the following results.

$^{1}$H-NMR (acetone-$d_6$): δ [ppm]=1.58-1.82(6H), 2.34 (2H), 3.40-4.20(39H), 4.98(1H), 5.05(1H), 5.82(1H)

$^{19}$F-NMR (acetone-$d_6$): δ [ppm]=−51.99 to −55.72(6.8F), −78.48(2F), −80.66(2F), −89.16 to −91.14(13.6F)

Example 21

A compound (AG1) represented by Formula (AG1) shown above (in Formula (AO1), mo1 indicating the average degree of polymerization is 3.4 and no1 indicating the average degree of polymerization is 3.4) was obtained by the following method.

First, a compound represented by Formula (11-24) shown below was synthesized by the following method. 2 equivalents of tetrahydropyranyl tetramethylene glycol and 1 equivalent of epichlorohydrin were reacted to synthesize a compound represented by Formula (11-23) shown below. The obtained compound represented by Formula (11-23) was reacted with epibromohydrin, and thus the compound represented by Formula (11-24) shown below was synthesized.

(11-23)

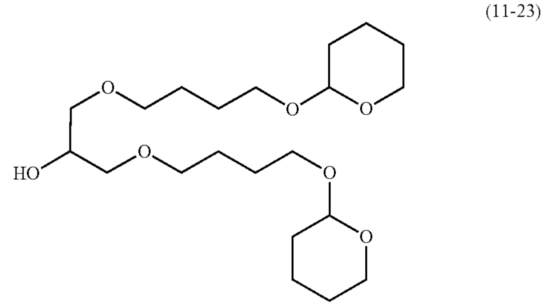

(11-24)

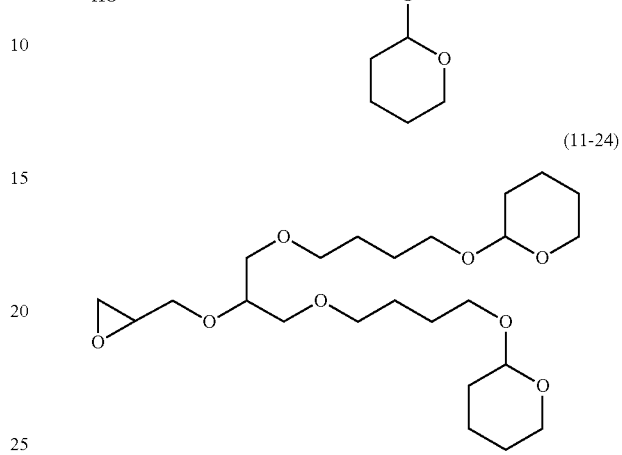

The same operation as in Example 1 was carried out except that the compound (9.31 g) represented by Formula (11-24) was used instead of the compound represented by Formula (11-4) used in Example 1, thereby obtaining 16.4 g of the compound (AO1).

$^{1}$H-NMR measurement and $^{19}$F-NMR measurement of the obtained compound (AO1) were performed, and the structure was identified from the following results.

$^{1}$H-NMR (acetone-$d_6$): δ [ppm]=1.58-1.82(10H), 2.34 (2H), 3.40-4.20(39H), 4.98(1H), 5.05(1H), 5.82(1H)

$^{19}$F-NMR (acetone-$d_6$): δ [ppm]=−51.99 to −55.72(6.8F), −78.48(2F), −80.66(2F), −89.16 to −91.14(13.6F)

Example 22

A compound (AP1) represented by Formula (AP1) shown above (in Formula (AP1), mp1 indicating the average degree of polymerization is 3.4 and np1 indicating the average degree of polymerization is 3.4) was obtained by the following method.

First, a compound represented by Formula (11-26) shown below was synthesized by the following method. 2 equivalents of tetrahydropyranyl diethylene glycol and 1 equivalent of epichlorohydrin were reacted to synthesize a compound represented by Formula (11-25) shown below. The obtained compound represented by Formula (11-25) was reacted with epibromohydrin, and thus the compound represented by Formula (11-26) shown below was synthesized.

(11-25)

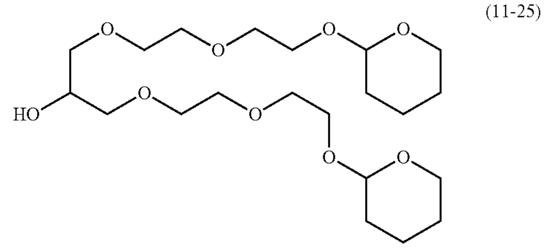

-continued (11-26)

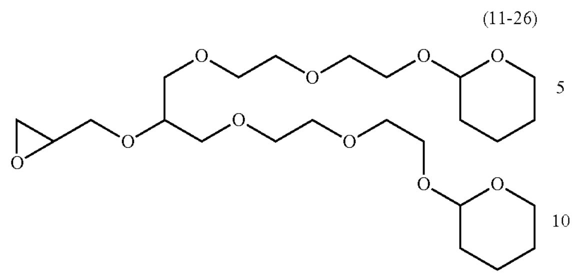

The same operation as in Example 1 was carried out except that the compound (9.10 g) represented by Formula (11-26) was used instead of the compound represented by Formula (11-4) used in Example 1, thereby obtaining 16.9 g of the compound (AP1).

$^1$H-NMR measurement and $^{19}$F-NMR measurement of the obtained compound (AP1) were performed, and the structure was identified from the following results.

$^1$H-NMR (acetone-$d_6$): δ [ppm]=1.58-1.82(2H), 2.34 (2H), 3.40-4.20(47H), 4.98(1H), 5.05(1H), 5.82(1H)

$^{19}$F-NMR (acetone-$d_6$): δ [ppm]=−51.99 to −55.72(6.8F), −78.48(2F), −80.66(2F), −89.16 to −91.14(13.6F)

Example 23

A compound (AQ1) represented by Formula (AQ1) shown above (in Formula (AQ1), mq1 indicating the average degree of polymerization is 3.4 and nq1 indicating the average degree of polymerization is 3.4) was obtained by the following method.

First, a compound represented by Formula (11-28) shown below was synthesized by the following method. 2-(bromomethyl)-2-(hydroxymethyl)-1,3-propanediol was reacted with 3,4-dihydro-2H-pyran, the hydroxyl group was protected with a tetrahydropyranyl group, and thus the compound represented by Formula (11-27) shown below was synthesized. The obtained compound represented by Formula (11-27) was reacted with allyl alcohol, the double bond of the obtained compound was then oxidized with m-chloroperbenzoic acid, and thus the compound represented by Formula (11-28) shown below was synthesized.

(11-27)

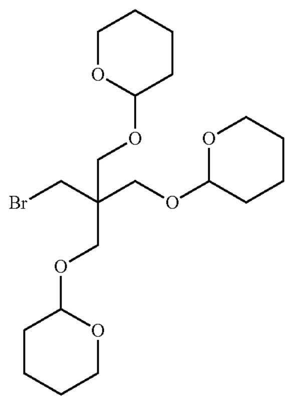

-continued (11-28)

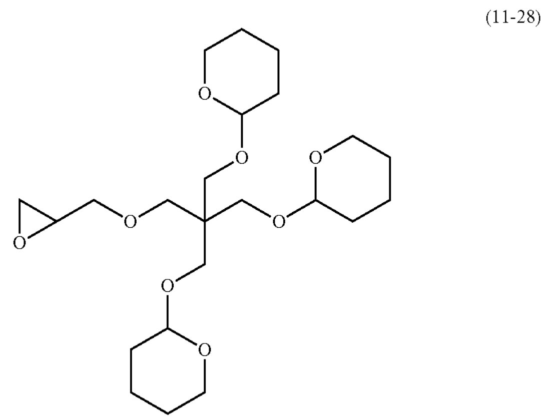

The same operation as in Example 1 was carried out except that the compound (7.91 g) represented by Formula (11-28) was used instead of the compound represented by Formula (11-4) used in Example 1, thereby obtaining 15.9 g of the compound (AQ1).

$^1$H-NMR measurement and $^{19}$F-NMR measurement of the obtained compound (AQ1) were performed, and the structure was identified from the following results.

$^1$H-NMR (acetone-$d_6$): δ [ppm]=1.58-1.82(2H), 2.34 (2H), 3.40-4.20(35H), 4.98(1H), 5.05(1H), 5.82(1H)

$^{19}$F-NMR (acetone-$d_6$): δ [ppm]=−51.99 to −55.72(6.8F), −78.48(2F), −80.66(2F), −89.16 to −91.14(13.6F)

Example 24

A compound (AR1) represented by Formula (AR1) shown above (in Formula (AR1), mr1 indicating the average degree of polymerization is 3.4 and nr1 indicating the average degree of polymerization is 3.4) was obtained by the following method.

First, a compound represented by Formula (11-30) shown below was synthesized by the following method. 1 equivalent of 4-allyloxy-1,2-butanediol and 2 equivalents of 2-(6-bromohexyloxy)tetrahydro-2H-pyran were reacted to synthesize a compound represented by Formula (11-29) shown below. The double bond of the obtained compound represented by Formula (11-29) was oxidized with m-chloroperbenzoic acid, and thus the compound represented by Formula (11-30) shown below was synthesized.

(11-29)

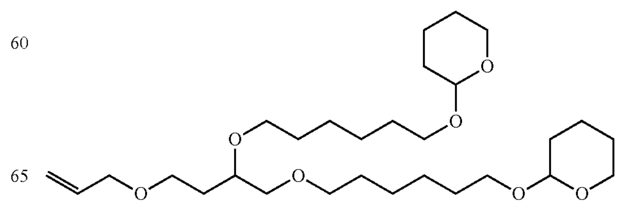

-continued (11-30)

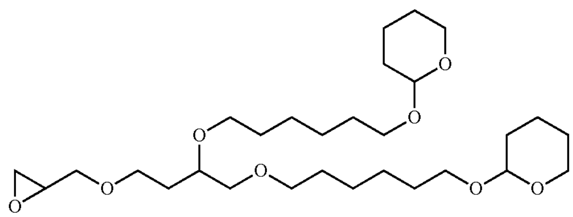

The same operation as in Example 1 was carried out except that the compound (10.61 g) represented by Formula (11-30) was used instead of the compound represented by Formula (11-4) used in Example 1, thereby obtaining 18.1 g of the compound (AR1).

$^1$H-NMR measurement and $^{19}$F-NMR measurement of the obtained compound (AR1) were performed, and the structure was identified from the following results.

$^1$H-NMR (acetone-$d_6$): δ [ppm]=1.58-1.82(20H), 2.34 (2H), 3.40-4.20(39H), 4.98(1H), 5.05(1H), 5.82(1H)

$^{19}$F-NMR (acetone-$d_6$): δ [ppm]=−51.99 to −55.72(6.8F), −78.48(2F), −80.66(2F), −89.16 to −91.14(13.6F)

Example 25

A compound (AS1) represented by Formula (AS1) shown above (in Formula (AS1), ms1 indicating the average degree of polymerization is 3.4 and ns1 indicating the average degree of polymerization is 3.4) was obtained by the following method.

First, a compound represented by Formula (11-32) shown below was synthesized by the following method. 1 equivalent of 8-allyloxy-1,2-octanediol and 2 equivalents of 2-(6-bromohexyloxy)tetrahydro-2H-pyran were reacted to synthesize a compound represented by Formula (11-31) shown below. The double bond of the obtained compound represented by Formula (11-31) was oxidized with m-chloroperbenzoic acid, and thus the compound represented by Formula (11-32) shown below was synthesized.

(11-31)

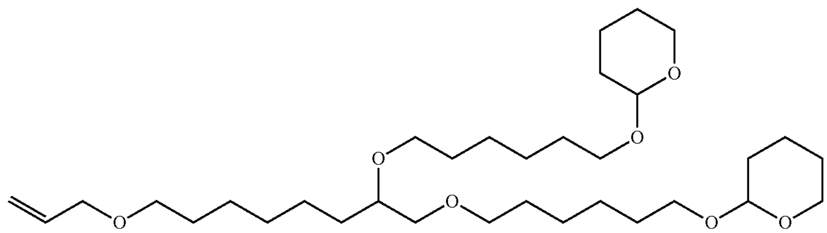

(11-32)

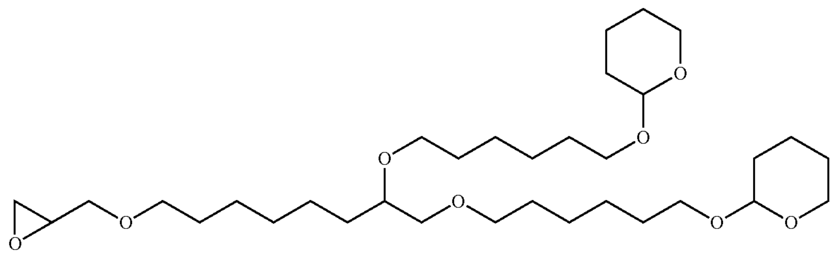

The same operation as in Example 1 was carried out except that the compound (10.98 g) represented by Formula (11-32) was used instead of the compound represented by Formula (11-4) used in Example 1, thereby obtaining 17.7 g of the compound (AS1).

$^1$H-NMR measurement and $^{19}$F-NMR measurement of the obtained compound (AS1) were performed, and the structure was identified from the following results.

$^1$H-NMR (acetone-$d_6$): δ [ppm]=1.58-1.82(28H), 2.34 (2H), 3.40-4.20(39H), 4.98(1H), 5.05(1H), 5.82(1H)

$^{19}$F-NMR (acetone-$d_6$): δ [ppm]=−51.99 to −55.72(6.8F), −78.48(2F), −80.66(2F), −89.16 to −91.14(13.6F)

Example 26

A compound (AT1) represented by Formula (AT1) shown above (in Formula (AT1), mt1 indicating the average degree of polymerization is 3.4 and nt1 indicating the average degree of polymerization is 3.4) was obtained by the following method.

First, a compound represented by Formula (11-33) shown below was synthesized by the following method. 5-hydroxyhexyl-2,2-dimethyl-1,3-dioxane was reacted with epibromohydrin, and thus the compound represented by Formula (11-33) shown below was synthesized.

(11-33)

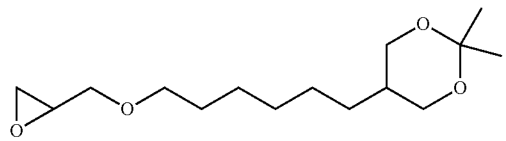

The same operation as in Example 1 was carried out except that the compound (7.21 g) represented by Formula (11-33) was used instead of the compound represented by Formula (11-4) used in Example 1, thereby obtaining 15.2 g of the compound (AT1).

$^{1}$H-NMR measurement and $^{19}$F-NMR measurement of the obtained compound (AT1) were performed, and the structure was identified from the following results.

$^{1}$H-NMR (acetone-$d_6$): δ [ppm]=1.58-1.82(12H), 2.10 (1H), 2.34(2H), 3.40-4.20(32H), 4.98(1H), 5.05(1H), 5.82 (1H)

$^{19}$F-NMR (acetone-$d_6$): δ [ppm]=−51.99 to −55.72(6.8F), −78.48(2F), −80.66(2F), −89.16 to −91.14(13.6F)

Example 27

A compound (AU1) represented by Formula (AU1) shown above (in Formula (AU1), mu1 indicating the average degree of polymerization is 3.4 and nu1 indicating the average degree of polymerization is 3.4) was obtained by the following method.

First, a compound represented by Formula (11-35) shown below was synthesized by the following method. 2 equivalents of tetrahydropyranyl hexamethylene glycol and 1 equivalent of epichlorohydrin were reacted to synthesize a compound represented by Formula (11-34) shown below. The obtained compound represented by Formula (11-34) was reacted with epibromohydrin, and thus the compound represented by Formula (11-35) shown below was synthesized.

(11-34)

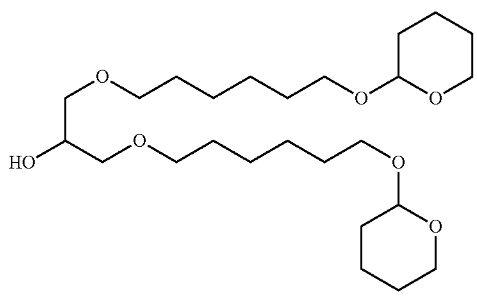

-continued (11-35)

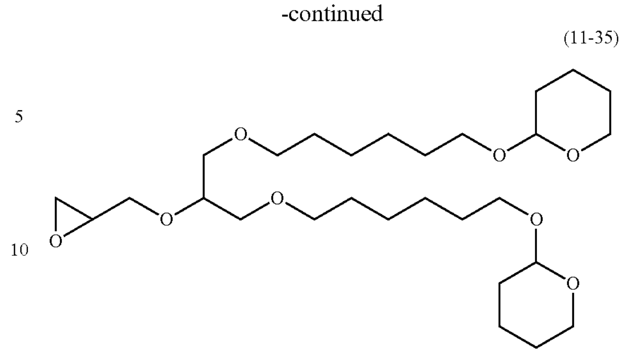

The same operation as in Example 1 was carried out except that the compound (9.41 g) represented by Formula (11-35) was used instead of the compound represented by Formula (11-4) used in Example 1, thereby obtaining 16.2 g of the compound (AU1).

$^{1}$H-NMR measurement and $^{19}$F-NMR measurement of the obtained compound (AU1) were performed, and the structure was identified from the following results.

$^{1}$H-NMR (acetone-$d_6$): δ [ppm]=1.58-1.82(18H), 2.34 (2H), 3.40-4.20(39H), 4.98(1H), 5.05(1H), 5.82(1H)

$^{19}$F-NMR (acetone-$d_6$): δ [ppm]=−51.99 to −55.72(6.8F), −78.48(2F), −80.66(2F), −89.16 to −91.14(13.6F)

Example 28

A compound (AV1) represented by Formula (AV1) shown above (in Formula (AV1), mv1 indicating the average degree of polymerization is 3.4 and nv1 indicating the average degree of polymerization is 3.4) was obtained by the following method.

First, a compound represented by Formula (11-37) shown below was synthesized by the following method. The double bond on one side of di(6-heptenyl)ether was oxidized with 1 equivalent of m-chloroperbenzoic acid, an epoxy thereof was then ring-opened using concentrated sulfuric acid, and thus the compound represented by Formula (11-36) shown below was synthesized. The obtained compound represented by Formula (11-36) was reacted with 2 equivalents of 2-(2-bromoethoxy)tetrahydro-2H-pyran, and then oxidized with m-chloroperbenzoic acid, and thus the compound represented by Formula (11-37) shown below was synthesized.

(11-36)

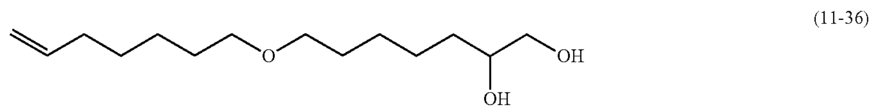

(11-37)

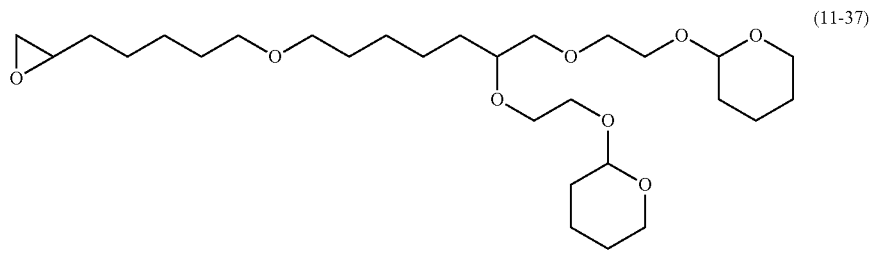

The same operation as in Example 1 was carried out except that the compound (10.11 g) represented by Formula (11-37) was used instead of the compound represented by Formula (11-4) used in Example 1, thereby obtaining 18.6 g of the compound (AV1).

$^1$H-NMR measurement and $^{19}$F-NMR measurement of the obtained compound (AV1) were performed, and the structure was identified from the following results.

$^1$H-NMR (acetone-$d_6$): δ [ppm]=1.58-1.82(18H), 2.34 (2H), 3.40-4.20(39H), 4.98(1H), 5.05(1H), 5.82(1H)

$^{19}$F-NMR (acetone-$d_6$): δ [ppm]=−51.99 to −55.72(6.8F), −78.48(2F), −80.66(2F), −89.16 to −91.14(13.6F)

Example 291

A compound (BA1) represented by Formula (BA1) shown above (in Formula (BA1), pa1 indicating the average degree of polymerization is 3.4 and qa1 indicating the average degree of polymerization is 3.4) was obtained by the following method.

First, a compound represented by Formula (12-2) shown below was synthesized by the following method. 1,3-diallyloxy-2-propanol and 3,4-dihydro-2H-pyran were reacted to synthesize a compound represented by Formula (12-1) shown below. The double bond on one side of the obtained compound represented by Formula (12-1) was oxidized with m-chloroperbenzoic acid, and thus the compound represented by Formula (12-2) was synthesized.

(12-1)

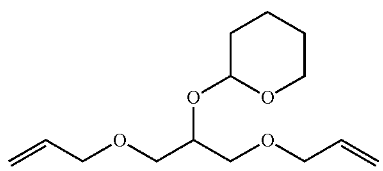

(12-2)

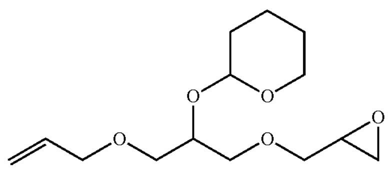

The same operation as in Example 1 was carried out except that the compound (8.17 g) represented by Formula (12-2) was used instead of the compound represented by Formula (11-2) used in Example 1, thereby obtaining 16.7 g of the compound (BA1).

$^1$H-NMR measurement and $^{19}$F-NMR measurement of the obtained compound (BA1) were performed, and the structure was identified from the following results.

$^1$H-NMR (acetone-$d_6$): δ [ppm]=3.40-4.20(39H), 5.10 (1H), 5.25(1H), 5.91(1H)

$^{19}$F-NMR (acetone-$d_6$): δ [ppm]=−51.99 to −55.72(6.8F), −78.48(2F), −80.66(2F), −89.16 to −91.14(13.6F)

Example 30

A compound (BA2) represented by Formula (BA2) shown above (in Formula (BA2), qa2 indicating the average degree of polymerization is 5.4) was obtained by the following method.

The same operation as in Example 29 was carried out except that, a fluoropolyether (a number-average molecular weight of 800 and a molecular weight distribution of 1.1) (40.0 g) represented by $HOCH_2CF_2O(CF_2CF_2O)_zCF_2CH_2OH$ (in the formula, z indicating the average degree of polymerization is 5.4) was used instead of a fluoropolyether (a number-average molecular weight of 800 and a molecular weight distribution of 1.1) represented by $HOCH_2CF_2O(CF_2CF_2O)_m(CF_2O)_nCF_2CH_2OH$ (in the formula, m indicating the average degree of polymerization is 3.4, and n indicating the average degree of polymerization is 3.4) used in Example 29, thereby obtaining 17.5 g of the compound (BA2).

$^1$H-NMR measurement and $^{19}$F-NMR measurement of the obtained compound (BA2) were performed, and the structure was identified from the following results.

$^1$H-NMR (acetone-$d_6$): δ [ppm]=3.40-4.20(39H), 5.10 (1H), 5.25(1H), 5.91(1H)

$^{19}$F-NMR (acetone-$d_6$): δ [ppm]=−78.57(4F), −88.92 to −89.57(21.6F)

Example 31

A compound (BA3) represented by Formula (BA3) shown above (in Formula (BA3), qa3 indicating the average degree of polymerization is 3.1) was obtained by the following method.

The same operation as in Example 29 was carried out except that, a fluoropolyether (a number-average molecular weight of 800 and a molecular weight distribution of 1.1) (40.0 g) represented by $HOCH_2CF_2CF_2O(CF_2CF_2CF_2O)_xCF_2CF_2CH_2OH$ (in the formula, x indicating the average degree of polymerization is 3.1) was used instead of a fluoropolyether (a number-average molecular weight of 800 and a molecular weight distribution of 1.1) represented by $HOCH_2CF_2O(CF_2CF_2O)_m(CF_2O)_nCF_2CH_2OH$ (in the formula, m indicating the average degree of polymerization is 3.4, and n indicating the average degree of polymerization is 3.4) used in Example 29, thereby obtaining 16.8 g of the compound (BA3).

$^1$H-NMR measurement and $^{19}$F-NMR measurement of the obtained compound (BA3) were performed, and the structure was identified from the following results.

$^1$H-NMR (acetone-$d_6$): δ [ppm]=3.40-4.20(39H), 5.10 (1H), 5.25(1H), 5.91(1H)

$^{19}$F-NMR (acetone-$d_6$): δ [ppm]=−84.22(12.4F), −86.40 (4F), −124.30(4F), −130.08(6.2F)

Example 32

A compound (BA4) represented by Formula (BA4) shown above (in Formula (BA4), qa4 indicating the average degree of polymerization is 2.0) was obtained by the following method.

The same operation as in Example 29 was carried out except that, a fluoropolyether (a number-average molecular weight of 800 and a molecular weight distribution of 1.1) (40.0 g) represented by $HOCH_2CF_2CF_2CF_2O(CF_2CF_2CF_2CF_2O)_yCF_2CF_2CF_2CH_2OH$ (in the formula, y indicating the average degree of polymerization is 2.0) was used instead of a fluoropolyether (a number-average molecular weight of 800 and a molecular weight distribution of 1.1) represented by $HOCH_2CF_2O(CF_2CF_2O)_m(CF_2O)_nCF_2CH_2OH$ (in the formula, m indicating the average degree of polymerization is 3.4, and n indicating the average degree of polymerization is 3.4) used in Example 29, thereby obtaining 16.5 g of the compound (BA4).

$^1$H-NMR measurement and $^{19}$F-NMR measurement of the obtained compound (BA4) were performed, and the structure was identified from the following results.

$^1$H-NMR (acetone-$d_6$): δ [ppm]=3.40-4.20(39H), 5.10 (1H), 5.25(1H), 5.91(1H)

$^{19}$F-NMR (acetone-$d_6$): δ [ppm]=−83.70(12F), −123.32 (4F), −125.85(8F), −127.63(4F)

Example 33

A compound (BB1) represented by Formula (BB1) shown above (in Formula (BB1), pb1 indicating the average degree of polymerization is 3.4 and qb1 indicating the average degree of polymerization is 3.4) was obtained by the following method.

First, a compound represented by Formula (12-4) shown below was synthesized by the following method. 3-buten-1-ol was reacted with epibromohydrin, an epoxy thereof was then hydrolyzed under acidic conditions, and thus the compound represented by Formula (12-3) shown below was synthesized. A primary hydroxyl group of the obtained compound represented by Formula (12-3) was protected with a t-butyldimethylsilyl group, the secondary hydroxyl group was then protected with a methoxymethyl group, and the t-butyldimethylsilyl group was removed from the obtained compound. Finally, the produced primary hydroxyl group was reacted with epibromohydrin, and thus the compound represented by Formula (12-4) shown below was synthesized.

(12-3)

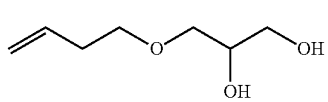

(12-4)

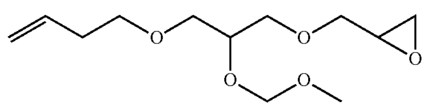

The same operation as in Example 1 was carried out except that the compound (8.27 g) represented by Formula (12-4) was used instead of the compound represented by Formula (11-2) used in Example 1, thereby obtaining 15.1 g of the compound (BB1).

$^1$H-NMR measurement and $^{19}$F-NMR measurement of the obtained compound (BB1) were performed, and the structure was identified from the following results.

$^1$H-NMR (acetone-$d_6$): δ [ppm]=2.34(2H), 3.40-4.20 (39H), 4.98(1H), 5.05(1H), 5.82(1H)

$^{19}$F-NMR (acetone-$d_6$): δ [ppm]=−51.99 to −55.72(6.8F), −78.48(2F), −80.66(2F), −89.16 to −91.14(13.6F)

Example 34

A compound (BC1) represented by Formula (BC1) shown above (in Formula (BC1), pc1 indicating the average degree of polymerization is 3.4 and qc1 indicating the average degree of polymerization is 3.4) was obtained by the following method.

First, a compound represented by Formula (12-6) shown below was synthesized by the following method. 4-penten-1-ol was reacted with epibromohydrin, an epoxy thereof was then hydrolyzed under acidic conditions, and thus the compound represented by Formula (12-5) shown below was synthesized. A primary hydroxyl group of the obtained compound represented by Formula (12-5) was protected with a t-butyldimethylsilyl group, the secondary hydroxyl group was then protected with a methoxymethyl group, and the t-butyldimethylsilyl group was removed from the obtained compound. Finally, the produced primary hydroxyl group was reacted with epibromohydrin, and thus the compound represented by Formula (12-6) shown below was synthesized.

(12-5)

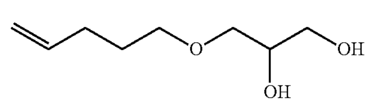

(12-6)

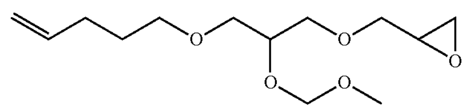

The same operation as in Example 1 was carried out except that the compound (8.54 g) represented by Formula (12-6) was used instead of the compound represented by Formula (11-2) used in Example 1, thereby obtaining 15.3 g of the compound (BC1).

$^1$H-NMR measurement and $^{19}$F-NMR measurement of the obtained compound (BC1) were performed, and the structure was identified from the following results.

$^1$H-NMR (acetone-$d_6$): δ [ppm]=1.67(2H), 2.15(2H), 3.40-4.20(39H), 4.98(1H), 5.05(1H), 5.82(1H)

$^{19}$F-NMR (acetone-$d_6$): δ [ppm]=−51.99 to −55.72(6.8F), −78.48(2F), −80.66(2F), −89.16 to −91.14(13.6F)

Example 35

A compound (BD1) represented by Formula (BD1) shown above (in Formula (BD1), pd1 indicating the average degree of polymerization is 3.4 and qd1 indicating the average degree of polymerization is 3.4) was obtained by the following method.

First, a compound represented by Formula (12-8) shown below was synthesized by the following method. Propargyl alcohol was reacted with epibromohydrin, an epoxy thereof was then hydrolyzed under acidic conditions, and thus the compound represented by Formula (12-7) shown below was synthesized. A primary hydroxyl group of the obtained compound represented by Formula (12-7) was protected with a t-butyldimethylsilyl group, the secondary hydroxyl group was then protected with a methoxymethyl group, and the t-butyldimethylsilyl group was removed from the obtained compound. Finally, the produced primary hydroxyl group was reacted with epibromohydrin, and the compound represented by Formula (12-8) shown below was synthesized.

(12-7)

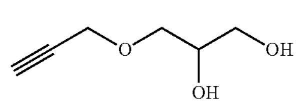

(12-8)

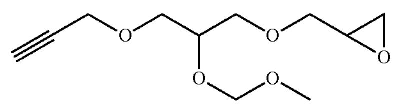

The same operation as in Example 1 was carried out except that the compound (8.21 g) represented by Formula (12-8) was used instead of the compound represented by Formula (11-2) used in Example 1, thereby obtaining 16.5 g of the compound (BD1).

$^1$H-NMR measurement and $^{19}$F-NMR measurement of the obtained compound (BD1) were performed, and the structure was identified from the following results.

$^1$H-NMR (acetone-$d_6$): δ [ppm]=2.48(1H), 3.40-4.20 (39H)

$^{19}$F-NMR (acetone-$d_6$): δ [ppm]=−51.99 to −55.72(6.8F), −78.48(2F), −80.66(2F), −89.16 to −91.14(13.6F)

Example 36

A compound (BE1) represented by Formula (BE1) shown above (in Formula (BE1), pe1 indicating the average degree of polymerization is 3.4 and qe1 indicating the average degree of polymerization is 3.4) was obtained by the following method.

First, a compound represented by Formula (12-10) shown below was synthesized by the following method. After 4-pentyn-1-ol was reacted with epibromohydrin, an epoxy was then hydrolyzed under acidic conditions, and thus the compound represented by Formula (12-9) shown below was synthesized. A primary hydroxyl group of the obtained compound represented by Formula (12-9) was protected with a t-butyldimethylsilyl group, the secondary hydroxyl group was protected with a methoxymethyl group, and the t-butyldimethylsilyl group was removed from the obtained compound. Finally, the produced primary hydroxyl group was reacted with epibromohydrin, and the compound represented by Formula (12-10) shown below was synthesized.

(12-9)

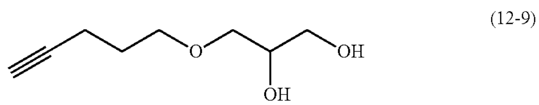

(12-10)

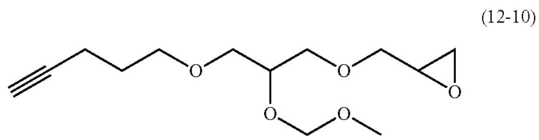

The same operation as in Example 1 was carried out except that the compound (8.41 g) represented by Formula (12-10) was used instead of the compound represented by Formula (11-2) used in Example 1, thereby obtaining 16.4 g of the compound (BE1).

$^1$H-NMR measurement and $^{19}$F-NMR measurement of the obtained compound (BE1) were performed, and the structure was identified from the following results.

$^1$H-NMR (acetone-$d_6$): δ [ppm]=1.78(2H), 2.00(1H), 2.30 (2H), 3.40-4.20(39H)

$^{19}$F-NMR (acetone-$d_6$): δ [ppm]=−51.99 to −55.72(6.8F), −78.48(2F), −80.66(2F), −89.16 to −91.14(13.6F)

Example 37

A compound (BF1) represented by Formula (BF1) shown above (in Formula (BF1), pf1 indicating the average degree of polymerization is 3.4 and qf1 indicating the average degree of polymerization is 3.4) was obtained by the following method.

First, a compound represented by Formula (12-12) shown below was synthesized by the following method. 2-thiopheneethanol was reacted with epibromohydrin, an epoxy was then hydrolyzed under acidic conditions, and thus the compound represented by Formula (12-11) shown below was synthesized. A primary hydroxyl group of the obtained compound represented by Formula (12-11) was protected with a t-butyldimethylsilyl group, the secondary hydroxyl group was then protected with a methoxymethyl group, and the t-butyldimethylsilyl group was removed from the obtained compound. Finally, the produced primary hydroxyl group was reacted with epibromohydrin, and the compound represented by Formula (12-12) shown below was synthesized.

(12-11)

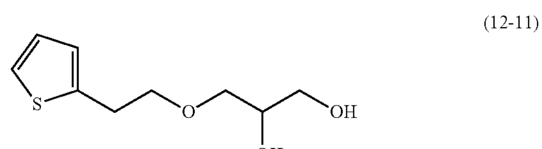

(12-12)

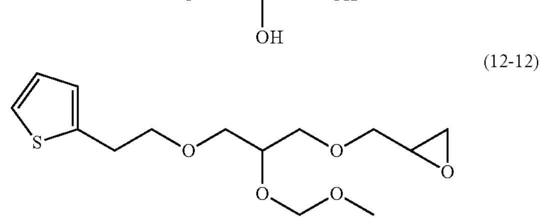

The same operation as in Example 1 was carried out except that the compound (8.21 g) represented by Formula (12-12) was used instead of the compound represented by Formula (11-2) used in Example 1, thereby obtaining 16.9 g of the compound (BF1).

$^1$H-NMR measurement and $^{19}$F-NMR measurement of the obtained compound (BF1) were performed, and the structure was identified from the following results.

$^1$H-NMR (acetone-$d_6$): δ [ppm]=3.07(2H), 3.40-4.20 (39H), 6.90(2H), 7.23(1H)

$^{19}$F-NMR (acetone-$d_6$): δ [ppm]=−51.99 to −55.72(6.8F), −78.48(2F), −80.66(2F), −89.16 to −91.14(13.6F)

Example 381

A compound (BG1) represented by Formula (BG1) shown above (in Formula (BG1), pg1 indicating the average degree of polymerization is 3.4 and qg1 indicating the average degree of polymerization is 3.4) was obtained by the following method.

First, a compound represented by Formula (12-14) shown below was synthesized by the following method. 1-methylpyrazol-5-methanol was reacted with epibromohydrin, an epoxy was then hydrolyzed under acidic conditions, and thus the compound represented by Formula (12-13) shown below was synthesized. A primary hydroxyl group of the obtained compound represented by Formula (12-13) was protected with a t-butyldimethylsilyl group, the secondary hydroxyl group was then protected with a methoxymethyl group, and the t-butyldimethylsilyl group was removed from the obtained compound. Finally, the produced primary hydroxyl group was reacted with epibromohydrin, and thus the compound represented by Formula (12-14) shown below was synthesized.

(12-13)

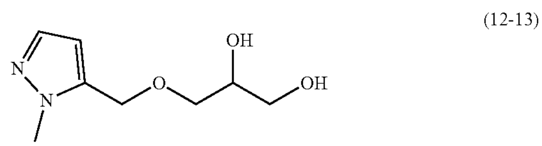

-continued (12-14)

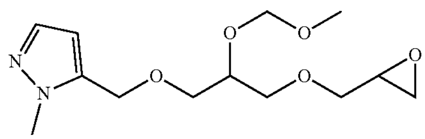

The same operation as in Example 1 was carried out except that the compound (8.31 g) represented by Formula (12-14) was used instead of the compound represented by Formula (11-2) used in Example 1, thereby obtaining 16.7 g of the compound (BG1).

$^1$H-NMR measurement and $^{19}$F-NMR measurement of the obtained compound (BG1) were performed, and the structure was identified from the following results.

$^1$H-NMR (acetone-$d_6$): δ [ppm]=3.40-4.20(42H), 6.20 (1H), 7.31(1H)

$^{19}$F-NMR (acetone-$d_6$): δ [ppm]=−51.99 to −55.72(6.8F), −78.48(2F), −80.66(2F), −89.16 to −91.14(13.6F)

Example 39

A compound (BH1) represented by Formula (BH1) shown above (in Formula (BH1), ph1 indicating the average degree of polymerization is 3.4 and qh1 indicating the average degree of polymerization is 3.4) was obtained by the following method.

First, a compound represented by Formula (12-15) shown below was synthesized by the following method. 4-methoxyphenol and allyl glycidyl ether were reacted, and the double bond was then oxidized with m-chloroperbenzoic acid, and thus the compound represented by Formula (12-15) shown below was synthesized.

(12-15)

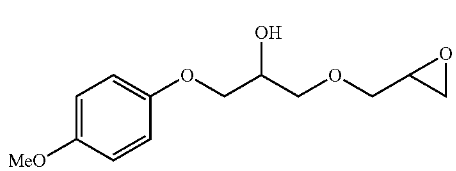

The same operation as in Example 1 was carried out except that the compound (8.51 g) represented by Formula (12-15) was used instead of the compound represented by Formula (11-2) used in Example 1, thereby obtaining 16.9 g of the compound (BH1).

$^1$H-NMR measurement and $^{19}$F-NMR measurement of the obtained compound (BH1) were performed, and the structure was identified from the following results.

$^1$H-NMR (acetone-$d_6$): δ [ppm]=3.40-4.20(40H), 6.85 (4H)

$^{19}$F-NMR (acetone-$d_6$): δ [ppm]=−51.99 to −55.72(6.8F), −78.48(2F), −80.66(2F), −89.16 to −91.14(13.6F)

Example 40

A compound (B11) represented by Formula (B11) shown above (in Formula (BI1), pi1 indicating the average degree of polymerization is 3.4, and qi1 indicating the average degree of polymerization is 3.4) was obtained by the following method.

First, a compound represented by Formula (12-16) shown below was synthesized by the following method. 3-cyanophenol was reacted with allyl glycidyl ether, the double bond was then oxidized with m-chloroperbenzoic acid, and thus the compound represented by Formula (12-16) shown below was synthesized.

(12-16)

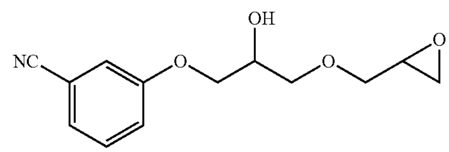

The same operation as in Example 1 was carried out except that the compound (8.11 g) represented by Formula (12-16) was used instead of the compound represented by Formula (11-2) used in Example 1, thereby obtaining 16.1 g of the compound (BI1).

$^1$H-NMR measurement and $^{19}$F-NMR measurement of the obtained compound (BIT) were performed, and the structure was identified from the following results.

$^1$H-NMR (acetone-$d_6$): δ [ppm]=3.40-4.20(37H), 7.28-7.34(3H), 7.50(1H)

$^{19}$F-NMR (acetone-$d_6$): δ [ppm]=−51.99 to −55.72(6.8F), −78.48(2F), −80.66(2F), −89.16 to −91.14(13.6F)

Example 41

A compound (BJ1) represented by Formula (BJ1) shown above (in Formula (BJ1), pj1 indicating the average degree of polymerization is 3.4, and qj1 indicating the average degree of polymerization is 3.4) was obtained by the following method.

First, a compound represented by Formula (12-18) shown below was synthesized by the following method. 3-cyanopropanoyl was reacted with epibromohydrin, an epoxy was then hydrolyzed under acidic conditions, and thus the compound represented by Formula (12-17) shown below was synthesized. A primary hydroxyl group of the obtained compound represented by Formula (12-17) was protected with a t-butyldimethylsilyl group, the secondary hydroxyl group was then protected with a methoxymethyl group, and the t-butyldimethylsilyl group was removed from the obtained compound. Finally, the produced primary hydroxyl group was reacted with epibromohydrin, and thus the compound represented by Formula (12-18) shown below was synthesized.

(12-17)

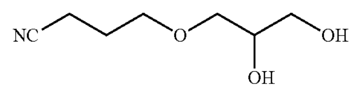

(12-18)

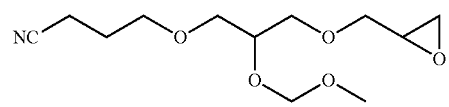

The same operation as in Example 1 was carried out except that the compound (8.26 g) represented by Formula (12-18) was used instead of the compound represented by Formula (11-2) used in Example 1, thereby obtaining 16.9 g of the compound (BJ1).

$^1$H-NMR measurement and $^{19}$F-NMR measurement of the obtained compound (BJ1) were performed, and the structure was identified from the following results.

$^1$H-NMR (acetone-$d_6$): δ [ppm]=1.88(2H), 2.54(2H), 3.40-4.20(39H)

$^{19}$F-NMR (acetone-$d_6$): δ [ppm]=−51.99 to −55.72(6.8F), −78.48(2F), −80.66(2F), −89.16 to −91.14(13.6F)

Example 42

A compound (BK1) represented by Formula (BK1) shown above (in Formula (BK1), pk1 indicating the average degree of polymerization is 3.4, and qk1 indicating the average degree of polymerization is 3.4) was obtained by the following method.

First, a compound represented by Formula (12-20) shown below was synthesized by the following method. 4-cyanobutanol was reacted with epibromohydrin, an epoxy was then hydrolyzed under acidic conditions, and thus the compound represented by Formula (12-19) shown below was synthesized. A primary hydroxyl group of the obtained compound represented by Formula (12-19) was protected with a t-butyldimethylsilyl group, the secondary hydroxyl group was then protected with a methoxymethyl group, and the t-butyldimethylsilyl group was removed from the obtained compound. Finally, the produced primary hydroxyl group was reacted with epibromohydrin, and thus the compound represented by Formula (12-20) shown below was synthesized.

(12-19)

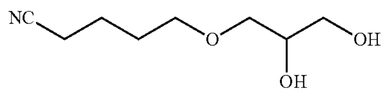

(12-20)

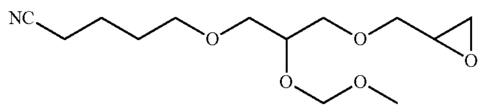

The same operation as in Example 1 was carried out except that the compound (8.41 g) represented by Formula (12-20) was used instead of the compound represented by Formula (11-2) used in Example 1, thereby obtaining 17.2 g of the compound (BK1).

$^1$H-NMR measurement and $^{19}$F-NMR measurement of the obtained compound (BK1) were performed, and the structure was identified from the following results.

$^1$H-NMR (acetone-$d_6$): δ [ppm]=1.75(4H), 2.54(2H), 3.40-4.20(39H)

$^{19}$F-NMR (acetone-$d_6$): δ [ppm]=−51.99 to −55.72(6.8F), −78.48(2F), −80.66(2F), −89.16 to −91.14(13.6F)

Example 43

A compound (BL1) represented by Formula (BL1) shown above (in Formula (BL1), pl1 indicating the average degree of polymerization is 3.4, and ql1 indicating the average degree of polymerization is 3.4) was obtained by the following method.

First, a compound represented by Formula (12-21) shown below was synthesized by the following method. A primary hydroxyl group of 3-methoxy-1,2-propanediol was protected with a t-butyldimethylsilyl group, the secondary hydroxyl group was then protected with a methoxymethyl group, and the t-butyldimethylsilyl group was removed from the obtained compound. Finally, the produced primary hydroxyl group was reacted with epibromohydrin, and the compound represented by Formula (12-21) shown below was synthesized.

(12-21)

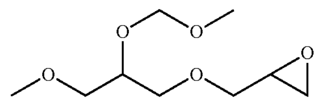

The same operation as in Example 1 was carried out except that the compound (8.51 g) represented by Formula (12-21) was used instead of the compound represented by Formula (11-2) used in Example 1, thereby obtaining 17.0 g of the compound (BL1).

$^1$H-NMR measurement and $^{19}$F-NMR measurement of the obtained compound (BL1) were performed, and the structure was identified from the following results.

$^1$H-NMR (acetone-$d_6$): δ [ppm]=3.40-4.20(40H)

$^{19}$F-NMR (acetone-$d_6$): δ [ppm]=−51.99 to −55.72(6.8F), −78.48(2F), −80.66(2F), −89.16 to −91.14(13.6F)

Example 44

A compound (BM1) represented by Formula (BM1) shown above (in Formula (BM1), pm1 indicating the average degree of polymerization is 3.4, and qm1 indicating the average degree of polymerization is 3.4) was obtained by the following method.

First, a compound represented by Formula (12-22) shown below was synthesized by the following method. A primary hydroxyl group of 3-allyloxy-1,2-propanediol was protected with a t-butyldimethylsilyl group, the secondary hydroxyl group was then protected with a methoxymethyl group, and the t-butyldimethylsilyl group was removed from the obtained compound. Finally, the produced primary hydroxyl group was reacted with propyl bromide, and the double bond was then oxidized with m-chloroperbenzoic acid, and thus the compound represented by Formula (12-22) shown below was synthesized.

(12-22)

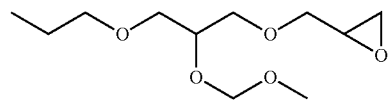

The same operation as in Example 1 was carried out except that the compound (7.80 g) represented by Formula (12-22) was used instead of the compound represented by Formula (11-2) used in Example 1, thereby obtaining 16.9 g of the compound (BM1).

$^1$H-NMR measurement and $^{19}$F-NMR measurement of the obtained compound (BM1) were performed, and the structure was identified from the following results.

$^1$H-NMR (acetone-$d_6$): δ [ppm]=0.84(3H), 1.55(2H), 3.40-4.20(39H)

$^{19}$F-NMR (acetone-$d_6$): δ [ppm]=−51.99 to −55.72(6.8F), −78.48(2F), −80.66(2F), −89.16 to −91.14(13.6F)

Example 45

A compound (BN1) represented by Formula (BN1) shown above (in Formula (BN1), pn1 indicating the average degree of polymerization is 3.4, and qn1 indicating the average degree of polymerization is 3.4) was obtained by the following method.

First, a compound represented by Formula (12-23) shown below was synthesized by the following method. 2,2,2-trifluoroethanol and allyl glycidyl ether were reacted and the double bond was then oxidized with m-chloroperbenzoic acid, and thus the compound represented by Formula (12-23) shown below was synthesized.

(12-23)

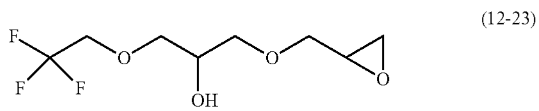 [SMILES: OC(COCC1CO1)COCC(F)(F)F]

The same operation as in Example 1 was carried out except that the compound (6.10 g) represented by Formula (12-23) was used instead of the compound represented by Formula (11-2) used in Example 1, thereby obtaining 15.3 g of the compound (BN1).

$^1$H-NMR measurement and $^{19}$F-NMR measurement of the obtained compound (BN1) were performed, and the structure was identified from the following results.

$^1$H-NMR (acetone-$d_6$): δ [ppm]=3.40-4.20(39H)

$^{19}$F-NMR (acetone-$d_6$): δ [ppm]=−51.99 to −55.72(6.8F), −78.48(2F), −80.66(2F), −89.16 to −91.14(13.6F)

Example 46

A compound (BO1) represented by Formula (BO1) shown above (in Formula (BO1), po1 indicating the average degree of polymerization is 3.4, and qo1 indicating the average degree of polymerization is 3.4) was obtained by the following method.

First, a compound represented by Formula (12-24) shown below was synthesized by the following method. 2,2,3,3,3-pentafluoro-1-propanol and allyl glycidyl ether were reacted, and the double bond was then oxidized with m-chloroperbenzoic acid, and thus the compound represented by Formula (12-24) shown below was synthesized.

(12-24)

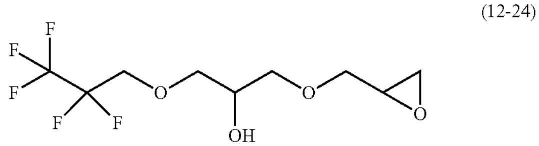 [SMILES: OC(COCC1CO1)COCC(F)(F)C(F)(F)F]

The same operation as in Example 1 was carried out except that the compound (6.46 g) represented by Formula (12-24) was used instead of the compound represented by Formula (11-2) used in Example 1, thereby obtaining 16.1 g of the compound (BO1).

$^1$H-NMR measurement and $^{19}$F-NMR measurement of the obtained compound (BO1) were performed, and the structure was identified from the following results.

$^1$H-NMR (acetone-$d_6$): δ [ppm]=3.40-4.20(39H)

$^{19}$F-NMR (acetone-$d_6$): δ [ppm]=−51.99 to −55.72(6.8F), −78.48(2F), −80.66(2F), −89.16 to −91.14(13.6F)

Example 47

A compound (BP1) represented by Formula (BP1) shown above (in Formula (BP1), pp1 indicating the average degree of polymerization is 3.4, and qp1 indicating the average degree of polymerization is 3.4) was obtained by the following method.

First, a compound represented by Formula (12-25) shown below was synthesized by the following method. A primary hydroxyl group of 3-allyloxy-1,2-propanediol was protected with a t-butyldimethylsilyl group, the secondary hydroxyl group was then protected with a methoxymethyl group, and the t-butyldimethylsilyl group was removed from the obtained compound. Finally, the produced primary hydroxyl group was reacted with 2-bromoethyl methyl ether, the double bond was then oxidized with m-chloroperbenzoic acid, and thus the compound represented by Formula (12-25) shown below was synthesized.

(12-25)

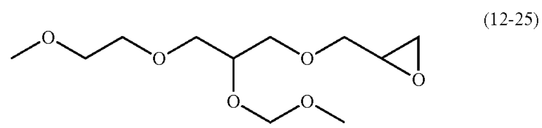 [SMILES: COCCOCC(COCC1CO1)OCOC]

The same operation as in Example 1 was carried out except that the compound (6.98 g) represented by Formula (12-25) was used instead of the compound represented by Formula (11-2) used in Example 1, thereby obtaining 16.4 g of the compound (BP1).

$^1$H-NMR measurement and $^{19}$F-NMR measurement of the obtained compound (BP1) were performed, and the structure was identified from the following results.

$^1$H-NMR (acetone-$d_6$): δ [ppm]=3.31(3H), 3.40-4.20 (41H)

$^{19}$F-NMR (acetone-$d_6$): δ [ppm]=−51.99 to −55.72(6.8F), −78.48(2F), −80.66(2F), −89.16 to −91.14(13.6F)

Example 481

A compound (BQ1) represented by Formula (BQ1) shown above (in Formula (BQ1), pq1 indicating the average degree of polymerization is 3.4, and qq1 indicating the average degree of polymerization is 3.4) was obtained by the following method.

First, a compound represented by Formula (12-27) shown below was synthesized by the following method. Ethylene glycol monoallyl ether was reacted with epibromohydrin, an epoxy was then hydrolyzed under acidic conditions, and thus the compound represented by Formula (12-26) shown below was synthesized. A primary hydroxyl group of the obtained compound represented by Formula (12-26) was protected with a t-butyldimethylsilyl group, the secondary hydroxyl group was then protected with a methoxymethyl group, and the t-butyldimethylsilyl group was removed from the obtained compound. Finally, the produced primary hydroxyl group was reacted with epibromohydrin, and thus the compound represented by Formula (12-27) shown below was synthesized.

(12-26)

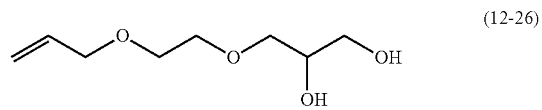

(12-27)

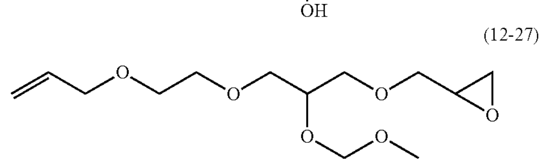

The same operation as in Example 1 was carried out except that the compound (7.12 g) represented by Formula (12-27) was used instead of the compound represented by Formula (11-2) used in Example 1, thereby obtaining 16.5 g of the compound (BQ1).

$^1$H-NMR measurement and $^{19}$F-NMR measurement of the obtained compound (BQ1) were performed, and the structure was identified from the following results.

$^1$H-NMR (acetone-$d_6$): δ [ppm]=3.40-4.20(43H), 5.10 (1H), 5.26(1H), 5.91(1H)

$^{19}$F-NMR (acetone-$d_6$): δ [ppm]=−51.99 to −55.72(6.8F), −78.48(2F), −80.66(2F), −89.16 to −91.14(13.6F)

Example 49

A compound (BR1) represented by Formula (BR1) shown above (in Formula (BR1), pr1 indicating the average degree of polymerization is 3.4, and qr1 indicating the average degree of polymerization is 3.4) was obtained by the following method.

First, a compound represented by Formula (12-28) shown below was synthesized by the following method. A compound represented by Formula (12-2) shown above was reacted with allyl alcohol, and then oxidized with m-chloroperbenzoic acid, and thus the compound represented by Formula (12-28) shown below was synthesized.

(12-28)

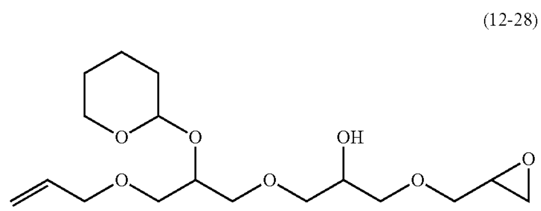 [SMILES: C=CCOCC(COCC(O)COCC1CO1)OC1CCCCO1]

The same operation as in Example 1 was carried out except that the compound (7.02 g) represented by Formula (12-28) was used instead of the compound represented by Formula (11-2) used in Example 1, thereby obtaining 16.6 g of the compound (BR1).

$^1$H-NMR measurement and $^{19}$F-NMR measurement of the obtained compound (BR1) were performed, and the structure was identified from the following results.

$^1$H-NMR (acetone-$d_6$): δ [ppm]=3.40-4.20(45H), 5.10 (1H), 5.25(1H), 5.91(1H)

$^{19}$F-NMR (acetone-$d_6$): δ [ppm]=−51.99 to −55.72(6.8F), −78.48(2F), −80.66(2F), −89.16 to −91.14(13.6F)

Example 50

A compound (CA1) represented by Formula (CA1) shown above (in Formula (CA1), ua1 indicating the average degree of polymerization is 3.4, and va1 indicating the average degree of polymerization is 3.4) was obtained by the following method.

First, ethylene glycol monoallyl ether was reacted with 3,4-dihydro-2H-pyran and then oxidized with m-chloroperbenzoic acid, and thus the compound represented by Formula (13-1) shown below was synthesized.

(13-1)

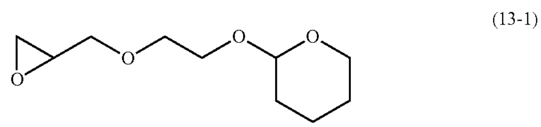 [SMILES: C1CCC(OCCOCC2CO2)OC1]

The same operation as in Example 1 was carried out except that the compound (6.02 g) represented by Formula (13-1) was used instead of the compound represented by Formula (11-2) used in Example 1, thereby obtaining 16.0 g of the compound (CA1).

$^1$H-NMR measurement and $^{19}$F-NMR measurement of the obtained compound (CA1) were performed, and the structure was identified from the following results.

$^1$H-NMR (acetone-$d_6$): δ [ppm]=3.40-4.20(36H)

$^{19}$F-NMR (acetone-$d_6$): δ [ppm]=−51.99 to −55.72(6.8F), −78.48(2F), −80.66(2F), −89.16 to −91.14(13.6F)

Example 51

A compound (CA2) represented by Formula (CA2) shown above (in Formula (CA2), va2 indicating the average degree of polymerization is 5.4) was obtained by the following method.

The same operation as in Example 50 was carried out except that, a fluoropolyether (a number-average molecular weight of 800 and a molecular weight distribution of 1.1) (40.0 g) represented by $HOCH_2CF_2O(CF_2CF_2O)_zCF_2CH_2OH$ (in the formula, z indicating the average degree of polymerization is 5.4) was used instead of a fluoropolyether (a number-average molecular weight of 800 and a molecular weight distribution of 1.1) represented by $HOCH_2CF_2O(CF_2CF_2O)_m(CF_2O)_nCF_2CH_2OH$ (in the formula, m indicating the average degree of polymerization is 3.4, and n indicating the average degree of polymerization is 3.4) used in Example 50, thereby obtaining 15.6 g of the compound (CA2).

$^1$H-NMR measurement and $^{19}$F-NMR measurement of the obtained compound (CA2) were performed, and the structure was identified from the following results.

$^1$H-NMR (acetone-$d_6$): δ [ppm]=3.40-4.20(36H)

$^{19}$F-NMR (acetone-$d_6$): δ [ppm]=−78.57(4F), −88.92 to −89.57(21.6F)

Example 52

A compound (CA3) represented by Formula (CA3) shown above (in Formula (CA3), va3 indicating the average degree of polymerization is 3.1) was obtained by the following method.

The same operation as in Example 50 was carried out except that, in Example 50, a fluoropolyether (a number-average molecular weight of 800 and a molecular weight distribution of 1.1) (40.0 g) represented by $HOCH_2CF_2CF_2O(CF_2CF_2CF_2O)_xCF_2CF_2CH_2OH$ (in the formula, x indicating the average degree of polymerization is 3.1) was used instead of a fluoropolyether (a number-average molecular weight of 800 and a molecular weight distribution of 1.1) represented by $HOCH_2CF_2O(CF_2CF_2O)_m(CF_2O)_nCF_2CH_2OH$ (in the formula, m indicating the average degree of polymerization is 3.4, and n indicating the average degree of polymerization is 3.4), thereby obtaining 15.3 g of the compound (CA3).

$^1$H-NMR measurement and $^{19}$F-NMR measurement of the obtained compound (CA3) were performed, and the structure was identified from the following results.

$^1$H-NMR (acetone-$d_6$): δ [ppm]=3.40-4.20(36H)

$^{19}$F-NMR (acetone-$d_6$): δ [ppm]=−84.22(12.4F), −86.40 (4F), −124.30(4F), −130.08(6.2F)

Example 53

A compound (CB1) represented by Formula (CB1) shown above (in Formula (CB1), ub1 indicating the average degree of polymerization is 3.4, and vb1 indicating the average degree of polymerization is 3.4) was obtained by the following method.

First, a compound represented by Formula (13-3) shown below was synthesized by the following method. 1 equivalent of 1,3-propanediol was reacted with 1 equivalent of allyl bromide, and thus the compound represented by Formula (13-2) shown below was synthesized. The obtained compound represented by Formula (13-2) was reacted with 3,4-dihydro-2H-pyran, and then oxidized with m-chloroperbenzoic acid, and thus the compound represented by Formula (13-3) shown below was synthesized.

(13-2)

(13-3)

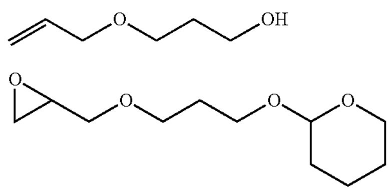

The same operation as in Example 1 was carried out except that the compound (6.22 g) represented by Formula (13-3) was used instead of the compound represented by Formula (11-2) used in Example 1, thereby obtaining 16.2 g of the compound (CB1).

$^1$H-NMR measurement and $^{19}$F-NMR measurement of the obtained compound (CB1) were performed, and the structure was identified from the following results.

$^1$H-NMR (acetone-$d_6$): δ [ppm]=1.75(2H), 3.40-4.20 (36H)

$^{19}$F-NMR (acetone-$d_6$): δ [ppm]=−51.99 to −55.72(6.8F), −78.48(2F), −80.66(2F), −89.16 to −91.14(13.6F)

Example 54

A compound (CB2) represented by Formula (CB2) shown above (in Formula (CB2), vb2 indicating the average degree of polymerization is 5.4) was obtained by the following method.

The same operation as in Example 53 was carried out except that, a fluoropolyether (a number-average molecular weight of 800 and a molecular weight distribution of 1.1) (40.0 g) represented by $HOCH_2CF_2O(CF_2CF_2O)_zCF_2CH_2OH$ (in the formula, z indicating the average degree of polymerization is 5.4) was used instead of a fluoropolyether (a number-average molecular weight of 800 and a molecular weight distribution of 1.1) represented by $HOCH_2CF_2O(CF_2CF_2O)_m(CF_2O)_nCF_2CH_2OH$ (in the formula, m indicating the average degree of polymerization is 3.4, and n indicating the average degree of polymerization is 3.4) used in Example 53, thereby obtaining 15.9 g of the compound (CB2).

$^1$H-NMR measurement and $^{19}$F-NMR measurement of the obtained compound (CB2) were performed, and the structure was identified from the following results.

$^1$H-NMR (acetone-$d_6$): δ [ppm]=1.75(2H), 3.40-4.20 (36H)

$^{19}$F-NMR (acetone-$d_6$): δ [ppm]=−78.57(4F), −88.92 to −89.57(21.6F)

Example 55

A compound (CB3) represented by Formula (CB3) shown above (in Formula (CB3), vb3 indicating the average degree of polymerization is 3.1) was obtained by the following method.

The same operation as in Example 53 was carried out except that, a fluoropolyether (a number-average molecular weight of 800 and a molecular weight distribution of 1.1) (40.0 g) represented by $HOCH_2CF_2CF_2O(CF_2CF_2CF_2O)_xCF_2CF_2CH_2OH$ (in the formula, x indicating the average degree of polymerization is 3.1) was used instead of a fluoropolyether (a number-average molecular weight of 800 and a molecular weight distribution of 1.1) represented by $HOCH_2CF_2O(CF_2CF_2O)_m(CF_2O)_nCF_2CH_2OH$ (in the formula, m indicating the average degree of polymerization is 3.4, and n indicating the average degree of polymerization is 3.4) used in Example 53, thereby obtaining 15.4 g of the compound (CB3).

$^1$H-NMR measurement and $^{19}$F-NMR measurement of the obtained compound (CB3) were performed, and the structure was identified from the following results.

$^1$H-NMR (acetone-$d_6$): δ [ppm]=1.75(2H), 3.40-4.20 (36H)

$^{19}$F-NMR (acetone-$d_6$): δ [ppm]=−84.22(12.4F), −86.40 (4F), −124.30(4F), −130.08(6.2F)

Example 56

A compound (CC1) represented by Formula (CC1) shown above (in Formula (CC1), uc1 indicating the average degree of polymerization is 3.4, and vc1 indicating the average degree of polymerization is 3.4) was obtained by the following method.

First, a compound represented by Formula (13-5) shown below was synthesized by the following method. 1 equivalent of 1,4-butanediol was reacted with 1 equivalent of allyl bromide, and thus the compound represented by Formula (13-4) shown below was synthesized. The obtained compound represented by Formula (13-4) was reacted with 3,4-dihydro-2H-pyran and then oxidized with m-chloroperbenzoic acid, and thus the compound represented by Formula (13-5) shown below was synthesized.

(13-4)

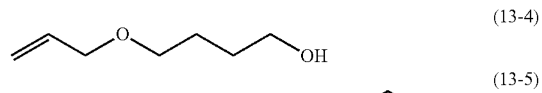

(13-5)

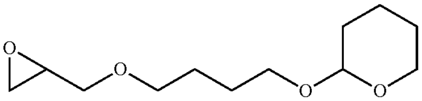

The same operation as in Example 1 was carried out except that the compound (6.56 g) represented by Formula (13-5) was used instead of the compound represented by Formula (11-2) used in Example 1, thereby obtaining 16.4 g of the compound (CC1).

$^1$H-NMR measurement and $^{19}$F-NMR measurement of the obtained compound (CC1) were performed, and the structure was identified from the following results.

$^1$H-NMR (acetone-$d_6$): δ [ppm]=1.75(4H), 3.40-4.20 (36H)

$^{19}$F-NMR (acetone-$d_6$): δ [ppm]=−51.99 to −55.72(6.8F), −78.48(2F), −80.66(2F), −89.16 to −91.14(13.6F)

Example 57

A compound (CD1) represented by Formula (CD1) shown above (in Formula (CD1), ud1 indicating the average degree of polymerization is 3.4, and vd1 indicating the average degree of polymerization is 3.4) was obtained by the following method.

First, 1,6-hexanediol was reacted with 1 equivalent of 3,4-dihydro-2H-pyran. The obtained compound was reacted with epibromohydrin, and the compound represented by Formula (13-6) shown below was synthesized.

(13-6)

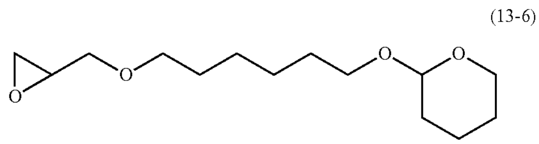 [SMILES: C(CCCOC1CCCCO1)CCOCC1CO1]

The same operation as in Example 1 was carried out except that the compound (6.98 g) represented by Formula (13-6) was used instead of the compound represented by Formula (11-2) used in Example 1, thereby obtaining 17.2 g of the compound (CD1).

$^1$H-NMR measurement and $^{19}$F-NMR measurement of the obtained compound (CD1) were performed, and the structure was identified from the following results.

$^1$H-NMR (acetone-$d_6$): δ [ppm]=1.20-1.80(8H), 3.40-4.20(36H)

$^{19}$F-NMR (acetone-$d_6$): δ [ppm]=−51.99 to −55.72(6.8F), −78.48(2F), −80.66(2F), −89.16 to −91.14(13.6F)

Example 58

A compound (CE1) represented by Formula (CE1) shown above (in Formula (CE1), ue1 indicating the average degree of polymerization is 3.4, and ve1 indicating the average degree of polymerization is 3.4) was obtained by the following method.

First, a compound represented by Formula (13-8) shown below was synthesized by the following method. A primary hydroxyl group of 3-allyloxy-1,2-propanediol was protected with a t-butyldimethylsilyl group. Then, the secondary hydroxyl group was protected with a methoxymethyl group, the t-butyldimethylsilyl group was removed from the obtained compound, and thus the compound represented by Formula (13-7) shown below was synthesized. The obtained compound represented by Formula (13-7) was reacted with 2-(2-chloroethoxy)tetrahydropyran, the double bond was then oxidized with m-chloroperbenzoic acid, and thus the compound represented by Formula (13-8) shown below was synthesized.

(13-7)

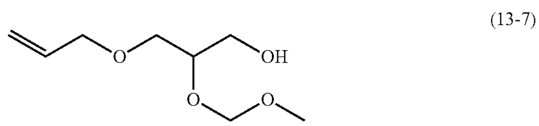

(13-8)

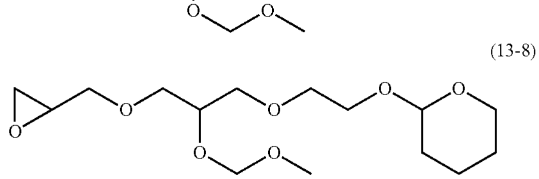

The same operation as in Example 1 was carried out except that the compound (7.45 g) represented by Formula (13-8) was used instead of the compound represented by Formula (11-2) used in Example 1, thereby obtaining 17.9 g of the compound (CE1).

$^1$H-NMR measurement and $^{19}$F-NMR measurement of the obtained compound (CE1) were performed, and the structure was identified from the following results.

$^1$H-NMR (acetone-$d_6$): δ [ppm]=3.40-4.20(42H)

$^{19}$F-NMR (acetone-$d_6$): δ [ppm]=−51.99 to −55.72(6.8F), −78.48(2F), −80.66(2F), −89.16 to −91.14(13.6F)

Example 59

A compound (CF1) represented by Formula (CF1) shown above (in Formula (CF1), uf1 indicating the average degree of polymerization is 3.4, and vf1 indicating the average degree of polymerization is 3.4) was obtained by the following method.

First, a compound represented by Formula (13-10) shown below was synthesized by the following method. A primary hydroxyl group of 3-allyloxy-1,2-propanediol was protected with a t-butyldimethylsilyl group. Then, the secondary hydroxyl group was protected with a methoxymethyl group, the t-butyldimethylsilyl group was removed from the obtained compound, and thus the compound represented by Formula (13-9) shown below was synthesized. The obtained compound represented by Formula (13-9) was reacted with 2-(3-chloropropoxy)tetrahydropyran, the double bond was then oxidized with m-chloroperbenzoic acid, and thus the compound represented by Formula (13-10) shown below was synthesized.

(13-9)

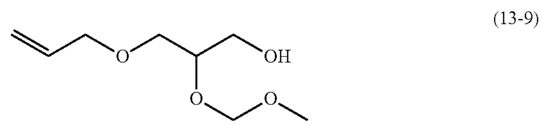

(13-10)

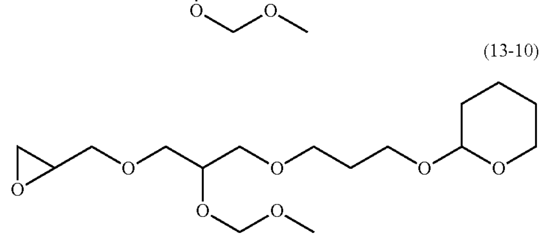

The same operation as in Example 1 was carried out except that the compound (7.21 g) represented by Formula (13-10) was used instead of the compound represented by Formula (11-2) used in Example 1, thereby obtaining 17.7 g of the compound (CF1).

$^1$H-NMR measurement and $^{19}$F-NMR measurement of the obtained compound (CF1) were performed, and the structure was identified from the following results.

$^1$H-NMR (acetone-$d_6$): δ [ppm]=1.75(2H), 3.40-4.20 (42H)

$^{19}$F-NMR (acetone-$d_6$): δ [ppm]=−51.99 to −55.72(6.8F), −78.48(2F), −80.66(2F), −89.16 to −91.14(13.6F)

Example 60

A compound (CG1) represented by Formula (CG1) shown above (in Formula (CG1), ug1 indicating the average degree of polymerization is 3.4, and vg1 indicating the average degree of polymerization is 3.4) was obtained by the following method.

First, for 2-allyloxytetrahydro-2H-pyran, the double bond was oxidized with m-chloroperbenzoic acid, and thus the compound represented by Formula (13-11) shown below was synthesized.

(13-11)

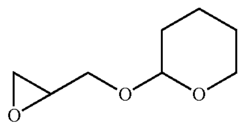

The same operation as in Example 1 was carried out except that the compound (5.21 g) represented by Formula (13-11) was used instead of the compound represented by Formula (11-2) used in Example 1, thereby obtaining 13.8 g of the compound (CG1).

$^1$H-NMR measurement and $^{19}$F-NMR measurement of the obtained compound (CG1) were performed, and the structure was identified from the following results.

$^1$H-NMR (acetone-d$_6$): δ [ppm]=3.40-4.20(32H)

$^{19}$F-NMR (acetone-d$_6$): δ [ppm]=−51.99 to −55.72(6.8F), −78.48(2F), −80.66(2F), −89.16 to −91.14(13.6F)

Example 61

A compound (CG2) represented by Formula (CG2) shown above (in Formula (CG2), vg2 indicating the average degree of polymerization is 5.4) was obtained by the following method.

The same operation as in Example 60 was carried out except that, a fluoropolyether (a number-average molecular weight of 800 and a molecular weight distribution of 1.1) (40.0 g) represented by $HOCH_2CF_2O(CF_2CF_2O)_zCF_2CH_2OH$ (in the formula, z indicating the average degree of polymerization is 5.4) was used instead of a fluoropolyether (a number-average molecular weight of 800 and a molecular weight distribution of 1.1) represented by $HOCH_2CF_2O(CF_2CF_2O)_m(CF_2O)_nCF_2CH_2OH$ (in the formula, m indicating the average degree of polymerization is 3.4, and n indicating the average degree of polymerization is 3.4) used in Example 60, thereby obtaining 15.4 g of the compound (CG2).

$^1$H-NMR measurement and $^{19}$F-NMR measurement of the obtained compound (CG2) were performed, and the structure was identified from the following results.

$^1$H-NMR (acetone-d$_6$): δ [ppm]=3.40-4.20(32H)

$^{19}$F-NMR (acetone-d$_6$): δ [ppm]=−78.57(4F), −88.92 to −89.57(21.6F)

Example 62

A compound (CG3) represented by Formula (CG3) shown above (in Formula (CG3), vg3 indicating the average degree of polymerization is 3.1) was obtained by the following method.

The same operation as in Example 60 was carried out except that, a fluoropolyether (a number-average molecular weight of 800 and a molecular weight distribution of 1.1) (40.0 g) represented by $HOCH_2CF_2CF_2O(CF_2CF_2CF_2O)_xCF_2CF_2CH_2OH$ (in the formula, x indicating the average degree of polymerization is 3.1) was used instead of a fluoropolyether (a number-average molecular weight of 800 and a molecular weight distribution of 1.1) represented by $HOCH_2CF_2O(CF_2CF_2O)_m(CF_2O)_nCF_2CH_2OH$ (in the formula, m indicating the average degree of polymerization is 3.4, and n indicating the average degree of polymerization is 3.4) used in Example 60, thereby obtaining 15.3 g of the compound (CG3).

$^1$H-NMR measurement and $^{19}$F-NMR measurement of the obtained compound (CG3) were performed, and the structure was identified from the following results.

$^1$H-NMR (acetone-d$_6$): δ [ppm]=3.40-4.20(32H)

$^{19}$F-NMR (acetone-d$_6$): δ [ppm]=−84.22(12.4F), −86.40 (4F), −124.30(4F), −130.08(6.2F)

Example 63

A compound (CH1) represented by Formula (CH1) shown above (in Formula (CH1), uh1 indicating the average degree of polymerization is 3.4, and vh1 indicating the average degree of polymerization is 3.4) was obtained by the following method.

First, 3-buten-1-ol was reacted with 3,4-dihydro-2H-pyran, the hydroxyl group was protected with a tetrahydropyranyl group and then oxidized with m-chloroperoxybenzoic acid, and thus the compound represented by Formula (13-12) shown below was synthesized.

(13-12)

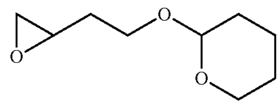

The same operation as in Example 1 was carried out except that the compound (5.98 g) represented by Formula (13-12) was used instead of the compound represented by Formula (11-2) used in Example 1, thereby obtaining 14.1 g of the compound (CH1).

$^1$H-NMR measurement and $^{19}$F-NMR measurement of the obtained compound (CH1) were performed, and the structure was identified from the following results.

$^1$H-NMR (acetone-d$_6$): δ [ppm]=1.40(2H), 3.40-4.20 (32H)

$^{19}$F-NMR (acetone-d$_6$): δ [ppm]=−51.99 to −55.72(6.8F), −78.48(2F), −80.66(2F), −89.16 to −91.14(13.6F)

Example 64

A compound (CH2) represented by Formula (CH2) shown above (in Formula (CH2), vh2 indicating the average degree of polymerization is 5.4) was obtained by the following method.

The same operation as in Example 63 was carried out except that, a fluoropolyether (a number-average molecular weight of 800 and a molecular weight distribution of 1.1) (40.0 g) represented by $HOCH_2CF_2O(CF_2CF_2O)_zCF_2CH_2OH$ (in the formula, z indicating the average degree of polymerization is 5.4) was used instead of a fluoropolyether (a number-average molecular weight of 800 and a molecular weight distribution of 1.1) represented by $HOCH_2CF_2O(CF_2CF_2O)_m(CF_2O)CF_2CH_2OH$ (in the formula, m indicating the average degree of polymerization is 3.4, and n indicating the average degree of polymerization is 3.4) used in Example 63, thereby obtaining 14.9 g of the compound ($CH_2$).

$^1$H-NMR measurement and $^{19}$F-NMR measurement of the obtained compound ($CH_2$) were performed, and the structure was identified from the following results.

$^1$H-NMR (acetone-d$_6$): δ [ppm]=1.40(2H), 3.40-4.20 (32H)

$^{19}$F-NMR (acetone-d$_6$): δ [ppm]=−78.57(4F), −88.92 to −89.57(21.6F)

Example 65

A compound (CH3) represented by Formula (CH3) shown above (in Formula (CH3), vh3 indicating the average degree of polymerization is 3.1) was obtained by the following method.

The same operation as in Example 63 was carried out except that, a fluoropolyether (a number-average molecular weight of 800 and a molecular weight distribution of 1.1) (40.0 g) represented by $HOCH_2CF_2CF_2O(CF_2CF_2CF_2O)_xCF_2CF_2CH_2OH$ (in the formula, x indicating the average degree of polymerization is 3.1) was used instead of a fluoropolyether (a number-average molecular weight of 800 and a molecular weight distribution of 1.1) represented by $HOCH_2CF_2O(CF_2CF_2O)_m(CF_2O)_nCF_2CH_2OH$ (in the formula, m indicating the average degree of polymerization is 3.4, and n indicating the average degree of polymerization is 3.4) used in Example 63, thereby obtaining 15.1 g of the compound (CH3).

$^1$H-NMR measurement and $^{19}$F-NMR measurement of the obtained compound (CH3) were performed, and the structure was identified from the following results.

$^1$H-NMR (acetone-$d_6$): δ [ppm]=1.40(2H), 3.40-4.20 (32H)

$^{19}$F-NMR (acetone-$d_6$): δ [ppm]=−84.22(12.4F), −86.40 (4F), −124.30(4F), −130.08(6.2F)

Example 66

A compound (CI1) represented by Formula (CI1) shown above (in Formula (CI1), ui1 indicating the average degree of polymerization is 3.4 and vi1 indicating the average degree of polymerization is 3.4) was obtained by the following method.

First, 4-penten-1-ol was reacted with 3,4-dihydro-2H-pyran, the hydroxyl group was protected with a tetrahydropyranyl group and then oxidized with m-chloroperoxybenzoic acid, and thus the compound represented by Formula (13-13) shown below was synthesized.

(13-13)

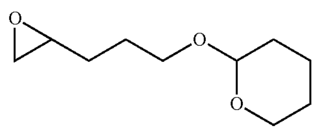

The same operation as in Example 1 was carried out except that the compound (6.01 g) represented by Formula (13-13) was used instead of the compound represented by Formula (11-2) used in Example 1, thereby obtaining 14.3 g of the compound (CI1).

$^1$H-NMR measurement and $^{19}$F-NMR measurement of the obtained compound (CI1) were performed, and the structure was identified from the following results.

$^1$H-NMR (acetone-$d_6$): δ [ppm]=1.40-1.60(4H), 3.40-4.20(32H)

$^{19}$F-NMR (acetone-$d_6$): δ [ppm]=−51.99 to −55.72(6.8F), −78.48(2F), −80.66(2F), −89.16 to −91.14(13.6F)

Example 67

A compound (CJ1) represented by Formula (CJ1) shown above (in Formula (CJ1), uj1 indicating the average degree of polymerization is 3.4 and vj1 indicating the average degree of polymerization is 3.4) was obtained by the following method.

First, 5-hexene-1-ol was reacted with 3,4-dihydro-2H-pyran, the hydroxyl group was protected with a tetrahydropyranyl group and then oxidized with m-chloroperoxybenzoic acid, and thus the compound represented by Formula (13-14) shown below was synthesized.

(13-14)

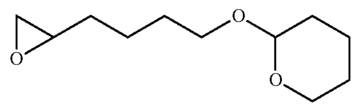

The same operation as in Example 1 was carried out except that the compound (6.11 g) represented by Formula (13-14) was used instead of the compound represented by Formula (11-2) used in Example 1, thereby obtaining 15.3 g of the compound (CJ1).

$^1$H-NMR measurement and $^{19}$F-NMR measurement of the obtained compound (CJ1) were performed, and the structure was identified from the following results.

$^1$H-NMR (acetone-$d_6$): δ [ppm]=1.40-1.60(6H), 3.40-4.20(32H)

$^{19}$F-NMR (acetone-$d_6$): δ [ppm]=−51.99 to −55.72(6.8F), −78.48(2F), −80.66(2F), −89.16 to −91.14(13.6F)

Example 68

A compound (CK1) represented by Formula (CK1) shown above (in Formula (CK1), uk1 indicating the average degree of polymerization is 3.4 and vk1 indicating the average degree of polymerization is 3.4) was obtained by the following method.

First, 6-hepten-1-ol was reacted with 3,4-dihydro-2H-pyran, the hydroxyl group was protected with a tetrahydropyranyl group and then oxidized with m-chloroperoxybenzoic acid, and thus the compound represented by Formula (13-15) shown below was synthesized.

(13-15)

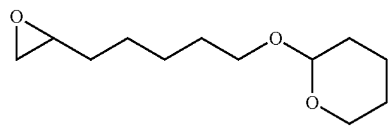

The same operation as in Example 1 was carried out except that the compound (6.45 g) represented by Formula (13-15) was used instead of the compound represented by Formula (11-2) used in Example 1, thereby obtaining 15.9 g of the compound (CK1).

$^1$H-NMR measurement and $^{19}$F-NMR measurement of the obtained compound (CK1) were performed, and the structure was identified from the following results.

$^1$H-NMR (acetone-$d_6$): δ [ppm]=1.40-1.60(8H), 3.40-4.20(32H)

$^{19}$F-NMR (acetone-$d_6$): δ [ppm]=−51.99 to −55.72(6.8F), −78.48(2F), −80.66(2F), −89.16 to −91.14(13.6F)

Example 69

A compound (CL1) represented by Formula (CL1) shown above (in Formula (CL1), ul1 indicating the average degree of polymerization is 3.4 and vl1 indicating the average degree of polymerization is 3.4) was obtained by the following method.

First, a compound represented by Formula (13-16) shown below was synthesized by the following method. 1 equivalent of 3-allyloxy-1,2-propanediol was reacted with 2 equivalents of 3,4-dihydro-2H-pyran, the hydroxyl group was protected with a tetrahydropyranyl group and then oxidized with m-chloroperoxybenzoic acid, and thus the compound represented by Formula (13-16) shown below was synthesized.

(13-16)

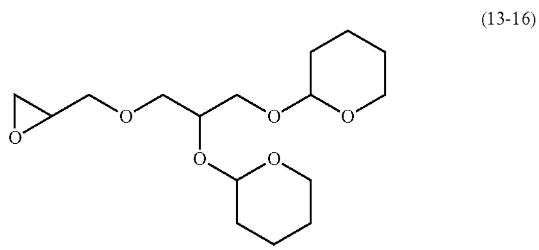 [SMILES: C1CCC(OCC(COCC2CO2)OC2CCCCO2)OC1]

The same operation as in Example 1 was carried out except that the compound (6.51 g) represented by Formula (13-16) was used instead of the compound represented by Formula (11-2) used in Example 1, thereby obtaining 15.5 g of the compound (CL1).

$^1$H-NMR measurement and $^{19}$F-NMR measurement of the obtained compound (CL1) were performed, and the structure was identified from the following results.

$^1$H-NMR (acetone-$d_6$): δ [ppm]=3.40-4.20(38H)

$^{19}$F-NMR (acetone-$d_6$): δ [ppm]=−51.99 to −55.72(6.8F), −78.48(2F), −80.66(2F), −89.16 to −91.14(13.6F)

Example 70

A compound (CM1) represented by Formula (CM1) shown above (in Formula (CM1), um1 indicating the average degree of polymerization is 3.4 and vm1 indicating the average degree of polymerization is 3.4) was obtained by the following method.

First, a compound represented by Formula (13-17) shown below was synthesized by the following method. The compound represented by Formula (13-12) shown above was reacted with allyl alcohol, and then reacted with 3,4-dihydro-2H-pyran, and thus the secondary hydroxyl group was protected with a tetrahydropyranyl group. Then, the double bond was oxidized with m-chloroperbenzoic acid, and thus the compound represented by Formula (13-17) shown below was synthesized.

(13-17)

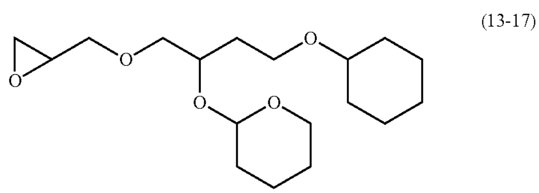 [SMILES: C1CCC(OCCC(COCC2CO2)OC2CCCCO2)CC1]

The same operation as in Example 1 was carried out except that the compound (7.21 g) represented by Formula (13-17) was used instead of the compound represented by Formula (11-2) used in Example 1, thereby obtaining 15.3 g of the compound (CM1).

$^1$H-NMR measurement and $^{19}$F-NMR measurement of the obtained compound (CM1) were performed, and the structure was identified from the following results.

$^1$H-NMR (acetone-$d_6$): δ [ppm]=1.40(2H), 3.40-4.20 (38H)

$^{19}$F-NMR (acetone-$d_6$): δ [ppm]=−51.99 to −55.72(6.8F), −78.48(2F), −80.66(2F), −89.16 to −91.14(13.6F)

Example 71

A compound (CN1) represented by Formula (CN1) shown above (in Formula (CN1), un1 indicating the average degree of polymerization is 3.4 and vn1 indicating the average degree of polymerization is 3.4) was obtained by the following method.

First, a compound represented by Formula (13-18) shown below was synthesized by the following method. The compound represented by Formula (13-13) shown above was reacted with allyl alcohol, and then reacted with 3,4-dihydro-2H-pyran, and thus the secondary hydroxyl group was protected with a tetrahydropyranyl group. Then, the double bond was oxidized with m-chloroperbenzoic acid, and thus the compound represented by Formula (13-18) shown below was synthesized.

(13-18)

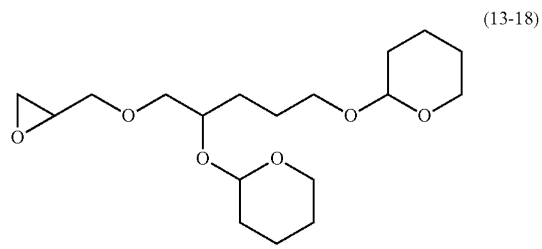 [SMILES: C1CCC(OCCCC(COCC2CO2)OC2CCCCO2)OC1]

The same operation as in Example 1 was carried out except that the compound (7.26 g) represented by Formula (13-18) was used instead of the compound represented by Formula (11-2) used in Example 1, thereby obtaining 15.5 g of the compound (CN1).

$^1$H-NMR measurement and $^{19}$F-NMR measurement of the obtained compound (CN1) were performed, and the structure was identified from the following results.

$^1$H-NMR (acetone-$d_6$): δ [ppm]=1.40-1.60(4H), 3.40-4.20(38H)

$^{19}$F-NMR (acetone-$d_6$): δ [ppm]=−51.99 to −55.72(6.8F), −78.48(2F), −80.66(2F), −89.16 to −91.14(13.6F)

Example 72

A compound (CO1) represented by Formula (COT) shown above (in Formula (CO1), uo1 indicating the average degree of polymerization is 3.4 and vo1 indicating the average degree of polymerization is 3.4) was obtained by the following method.

First, a compound represented by Formula (13-19) shown below was synthesized by the following method. The compound represented by Formula (13-14) shown above was reacted with allyl alcohol, and then reacted with 3,4-dihydro-2H-pyran, and thus the secondary hydroxyl group was protected with a tetrahydropyranyl group. Then, the double bond was oxidized with m-chloroperbenzoic acid, and thus the compound represented by Formula (13-19) shown below was synthesized.

(13-19)

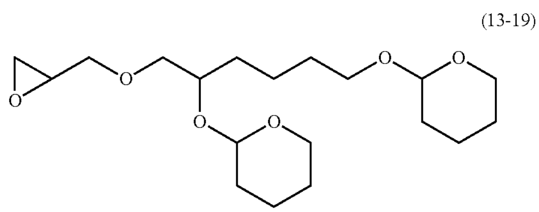 [SMILES: C(CCC(COCC1CO1)OC1CCCCO1)COC1CCCCO1]

The same operation as in Example 1 was carried out except that the compound (7.56 g) represented by Formula (13-19) was used instead of the compound represented by Formula (11-2) used in Example 1, thereby obtaining 15.3 g of the compound (CO1).

$^1$H-NMR measurement and $^{19}$F-NMR measurement of the obtained compound (CO1) were performed, and the structure was identified from the following results.

$^1$H-NMR (acetone-$d_6$): δ [ppm]=1.40-1.60(6H), 3.40-4.20(38H)

$^{19}$F-NMR (acetone-$d_6$): δ [ppm]=−51.99 to −55.72(6.8F), −78.48(2F), −80.66(2F), −89.16 to −91.14(13.6F)

Example 73

A compound (CP1) represented by Formula (CP1) shown above (in Formula (CP1), up1 indicating the average degree of polymerization is 3.4 and vp1 indicating the average degree of polymerization is 3.4) was obtained by the following method.

First, a compound represented by Formula (13-20) shown below was synthesized by the following method. 3-buten-1-ol was reacted with 2-(2-bromoethoxy)tetrahydro-2H-pyran and then oxidized with m-chloroperbenzoic acid, and thus the compound represented by Formula (13-20) shown below was synthesized.

(13-20)

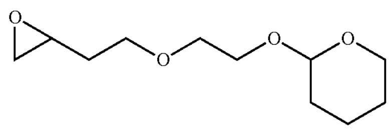

The same operation as in Example 1 was carried out except that the compound (5.98 g) represented by Formula (13-20) was used instead of the compound represented by Formula (11-2) used in Example 1, thereby obtaining 14.1 g of the compound (CP1).

$^1$H-NMR measurement and $^{19}$F-NMR measurement of the obtained compound (CP1) were performed, and the structure was identified from the following results.

$^1$H-NMR (acetone-$d_6$): δ [ppm]=1.58-1.82(2H), 3.40-4.20(36H)

$^{19}$F-NMR (acetone-$d_6$): δ [ppm]=−51.99 to −55.72(6.8F), −78.48(2F), −80.66(2F), −89.16 to −91.14(13.6F)

Example 74

A compound (CQ1) represented by Formula (CQ1) shown above (in Formula (CQ1), uq1 indicating the average degree of polymerization is 3.4 and vq1 indicating the average degree of polymerization is 3.4) was obtained by the following method.

First, a compound represented by Formula (13-21) shown below was synthesized by the following method. The compound represented by Formula (13-1) shown above was reacted with 3-buten-1-ol and then reacted with 3,4-dihydro-2H-pyran, and thus the secondary hydroxyl group was protected with a tetrahydropyranyl group. Then, the double bond was oxidized with m-chloroperbenzoic acid, and thus the compound represented by Formula (13-21) shown below was synthesized.

(13-21)

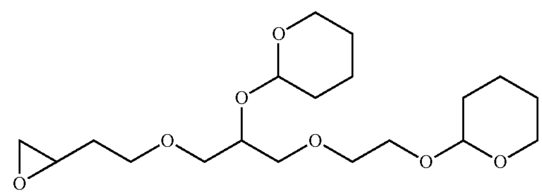

The same operation as in Example 1 was carried out except that the compound (6.24 g) represented by Formula (13-21) was used instead of the compound represented by Formula (11-2) used in Example 1, thereby obtaining 16.1 g of the compound (CQ1).

$^1$H-NMR measurement and $^{19}$F-NMR measurement of the obtained compound (CQ1) were performed, and the structure was identified from the following results.

$^1$H-NMR (acetone-$d_6$): δ [ppm]=1.58-1.82(2H), 3.40-4.20(42H)

$^{19}$F-NMR (acetone-$d_6$): δ [ppm]=−51.99 to −55.72(6.8F), −78.48(2F), −80.66(2F), −89.16 to −91.14(13.6F)

Example 75

A compound (CR1) represented by Formula (CR1) shown above (in Formula (CR1), ur1 indicating the average degree of polymerization is 3.4 and vr1 indicating the average degree of polymerization is 3.4) was obtained by the following method.

The same operation as in Example 50 was carried out except that the compound (6.80 g) represented by Formula (11-13) shown above was used instead of the compound represented by Formula (11-4) used in Example 50, thereby obtaining 14.2 g of the compound (CR1).

$^1$H-NMR measurement and $^{19}$F-NMR measurement of the obtained compound (CR1) were performed, and the structure was identified from the following results.

$^1$H-NMR (acetone-$d_6$): δ [ppm]=3.40-4.20(28H)

$^{19}$F-NMR (acetone-$d_6$): δ [ppm]=−51.99 to −55.72(6.8F), −78.48(2F), −80.66(2F), −89.16 to −91.14(13.6F)

Example 76

A compound (CS1) represented by Formula (CS1) shown above (in Formula (CS1), us1 indicating the average degree of polymerization is 3.4 and vs1 indicating the average degree of polymerization is 3.4) was obtained by the following method.

The same operation as in Example 50 was carried out except that the compound (6.10 g) represented by Formula (11-14) shown above was used instead of the compound represented by Formula (11-4) used in Example 50, thereby obtaining 14.8 g of the compound (CS1).

$^1$H-NMR measurement and $^{19}$F-NMR measurement of the obtained compound (CS1) were performed, and the structure was identified from the following results.

$^1H$-NMR (acetone-$d_6$): δ [ppm]=2.10(1H), 3.40-4.20 (29H)

$^{19}F$-NMR (acetone-$d_6$): δ [ppm]=−51.99 to −55.72(6.8F), −78.48(2F), −80.66(2F), −89.16 to −91.14(13.6F)

Example 771

A compound (CT1) represented by Formula (CT1) shown above (in Formula (CT1), ut1 indicating the average degree of polymerization is 3.4 and vt1 indicating the average degree of polymerization is 3.4) was obtained by the following method.

The same operation as in Example 50 was carried out except that the compound (6.80 g) represented by Formula (11-20) shown above was used instead of the compound represented by Formula (11-4) used in Example 50, thereby obtaining 16.1 g of the compound (CT1).

$^1H$-NMR measurement and $^{19}F$-NMR measurement of the obtained compound (CT1) were performed, and the structure was identified from the following results.

$^1H$-NMR (acetone-$d_6$): δ [ppm]=3.40-4.20(36H)

$^{19}F$-NMR (acetone-$d_6$): δ [ppm]=−51.99 to −55.72(6.8F), −78.48(2F), −80.66(2F), −89.16 to −91.14(13.6F)

Example 78

A compound (DA1) represented by Formula (DA1) shown above (in Formula (DA1), xa1 indicating the average degree of polymerization is 3.4 and ya1 indicating the average degree of polymerization is 3.4) was obtained by the following method.

A fluoropolyether (a number-average molecular weight of 800 and a molecular weight distribution of 1.1) (10.0 g) represented by $HOCH_2CF_2O(CF_2CF_2O)_m(CF_2O)_nCF_2CH_2OH$ (in the formula, m indicating the average degree of polymerization is 3.4, and n indicating the average degree of polymerization is 3.4), a compound represented by Formula (11-4) shown above (10.1 g), and t-BuOH (tertiary butyl alcohol) (20.0 mL) were charged into a 200 mL eggplant flask under a nitrogen gas atmosphere and stirred until the mixture became uniform at room temperature. In addition, t-BuOK (potassium tert-butoxide) (0.84 g) was added to the eggplant flask and heated to 70° C., and the mixture was stirred for 16 hours and reacted.

Then, the obtained reaction product was cooled to 25° C., a 7% hydrogen chloride/methanol reagent (45.6 g) was added, the mixture was stirred at room temperature for 3 hours, and a deprotection reaction was performed.

The obtained reaction product was added to 7% sodium bicarbonate water (150 mL) for neutralization, ethyl acetate was then added, the organic layer was extracted, and washing with water was performed. Anhydrous sodium sulfate was added to the organic layer for dehydration, the drying agent was filtered and the filtrate was then concentrated. The residue was purified by silica gel column chromatography, and thereby 10.5 g of the compound (DA1) was obtained.

$^1H$-NMR measurement and $^{19}F$-NMR measurement of the obtained compound (DA1) were performed, and the structure was identified from the following results.

$^1H$-NMR (acetone-$d_6$): δ [ppm]=3.40-4.20(46H)

$^{19}F$-NMR (acetone-$d_6$): δ [ppm]=−51.99 to −55.72(6.8F), −78.48(2F), −80.66(2F), −89.16 to −91.14(13.6F)

Example 79

A compound (DB1) represented by Formula (DB1) shown above (in Formula (DB1), xb1 indicating the average degree of polymerization is 3.4, and yb1 indicating the average degree of polymerization is 3.4) was obtained by the following method.

The same operation as in Example 78 was carried out except that a compound (4.71 g) represented by Formula (11-13) shown above was used instead of the compound represented by Formula (11-4) used in Example 78, thereby obtaining 8.65 g of the compound (DB1).

$^1H$-NMR measurement and $^{19}F$-NMR measurement of the obtained compound (DB1) were performed, and the structure was identified from the following results.

$^1H$-NMR (acetone-$d_6$): δ [ppm]=3.40-4.20(30H)

$^{19}F$-NMR (acetone-$d_6$): δ [ppm]=−51.99 to −55.72(6.8F), −78.48(2F), −80.66(2F), −89.16 to −91.14(13.6F)

Example 80

A compound (DC1) represented by Formula (DC1) shown above (in Formula (DC1), xc1 indicating the average degree of polymerization is 3.4, and yc1 indicating the average degree of polymerization is 3.4) was obtained by the following method.

The same operation as in Example 78 was carried out except that the compound (5.06 g) represented by Formula (11-14) shown above was used instead of the compound represented by Formula (11-4) used in Example 78, thereby obtaining 8.77 g of the compound (DC1).

$^1H$-NMR measurement and $^{19}F$-NMR measurement of the obtained compound (DC1) were performed, and the structure was identified from the following results.

$^1H$-NMR (acetone-$d_6$): δ [ppm]=2.10(2H), 3.40-4.20 (32H)

$^{19}F$-NMR (acetone-$d_6$): δ [ppm]=−51.99 to −55.72(6.8F), −78.48(2F), −80.66(2F), −89.16 to −91.14(13.6F)

Example 81

A compound (DD1) represented by Formula (DD1) shown above (in Formula (DD1), xd1 indicating the average degree of polymerization is 3.4 and yd1 indicating the average degree of polymerization is 3.4) was obtained by the following method.

The same operation as in Example 78 was carried out except that the compound (10.2 g) represented by Formula (11-20) shown above was used instead of the compound represented by Formula (11-4) used in Example 78, thereby obtaining 10.4 g of the compound (DD1).

$^1H$-NMR measurement and $^{19}F$-NMR measurement of the obtained compound (DD1) were performed, and the structure was identified from the following results.

$^1H$-NMR (acetone-$d_6$): δ [ppm]=3.40-4.20(46H)

$^{19}F$-NMR (acetone-$d_6$): δ [ppm]=−51.99 to −55.72(6.8F), −78.48(2F), −80.66(2F), −89.16 to −91.14(13.6F)

Example 82

A compound (DE1) represented by Formula (DE1) shown above (in Formula (DE1), xe1 indicating the average degree of polymerization is 3.4 and ye1 indicating the average degree of polymerization is 3.4) was obtained by the following method.

The same operation as in Example 1 was carried out except that the compound (7.28 g) represented by Formula (11-13) shown above was used instead of the compound represented by Formula (11-2) used in Example 1, thereby obtaining 15.0 g of the compound (DE1).

$^1$H-NMR measurement and $^{19}$F-NMR measurement of the obtained compound (DE1) were performed, and the structure was identified from the following results.

$^1$H-NMR (acetone-$d_6$): δ [ppm]=3.40-4.20(38H)

$^{19}$F-NMR (acetone-$d_6$): δ [ppm]=−51.99 to −55.72(6.8F), −78.48(2F), −80.66(2F), −89.16 to −91.14(13.6F)

Example 83

A compound (DF1) represented by Formula (DF1) shown above (in Formula (DF1), xf1 indicating the average degree of polymerization is 3.4 and yf1 indicating the average degree of polymerization is 3.4) was obtained by the following method.

The same operation as in Example 1 was carried out except that the compound (8.54 g) represented by Formula (11-14) shown above was used instead of the compound represented by Formula (11-2) used in Example 1, thereby obtaining 15.4 g of the compound (DF1).

$^1$H-NMR measurement and $^{19}$F-NMR measurement of the obtained compound (DF1) were performed, and the structure was identified from the following results.

$^1$H-NMR (acetone-$d_6$): δ [ppm]=2.10(2H), 3.40-4.20 (39H)

$^{19}$F-NMR (acetone-$d_6$): δ [ppm]=−51.99 to −55.72(6.8F), −78.48(2F), −80.66(2F), −89.16 to −91.14(13.6F)

Example 84

A compound (DG1) represented by Formula (DG1) shown above (in Formula (DG1), xg1 indicating the average degree of polymerization is 3.4 and yg1 indicating the average degree of polymerization is 3.4) was obtained by the following method.

The same operation as in Example 16 was carried out except that the compound (8.54 g) represented by Formula (11-14) shown above was used instead of the compound represented by Formula (11-2) used in Example 16, thereby obtaining 15.0 g of the compound (DG1).

$^1$H-NMR measurement and $^{19}$F-NMR measurement of the obtained compound (DG1) were performed, and the structure was identified from the following results.

$^1$H-NMR (acetone-$d_6$): δ [ppm]=2.10(2H), 3.40-4.20 (39H)

$^{19}$F-NMR (acetone-$d_6$): δ [ppm]=−51.99 to −55.72(6.8F), −78.48(2F), −80.66(2F), −89.16 to −91.14(13.6F)

Comparative Example 1

The compound (XA1) represented by Formula (XA1) shown below was synthesized by the method described in Patent Document 5.

Comparative Example 2

The compound (XB1) represented by Formula (XB1) shown below was synthesized by the method described in Patent Document 4.

Comparative Example 3

The compound (XC1) represented by Formula (XC1) shown below was synthesized by the method described in Patent Document 7.

Comparative Example 4

The compound (XD1) represented by Formula (XD1) shown below was synthesized by the method described in Patent Document 7.

Comparative Example 5

The compound (XE1) represented by Formula (XE1) shown below was synthesized by the method described in Patent Document 1.

Comparative Example 6

The compound (XF1) represented by Formula (XF1) shown below was synthesized by the method described in Patent Document 8.

Comparative Example 7

The compound (XG1) represented by Formula (XG1) shown below was synthesized by the method described in Patent Document 8.

(XA1)

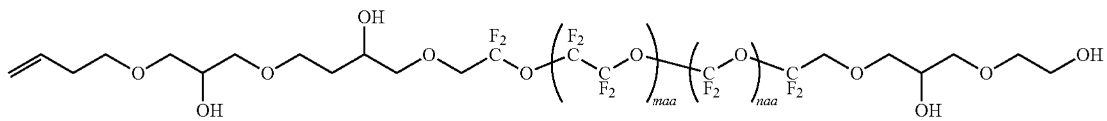

(XB1)

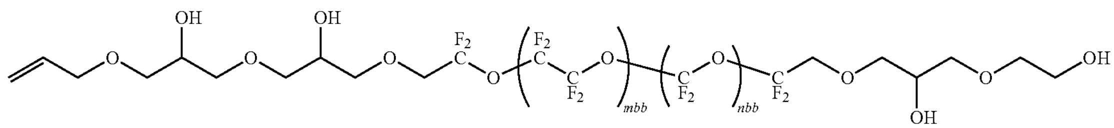

(XC1)

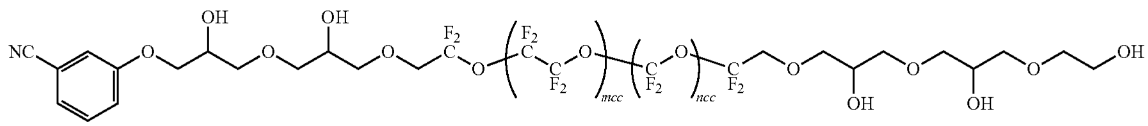

-continued (XD1)

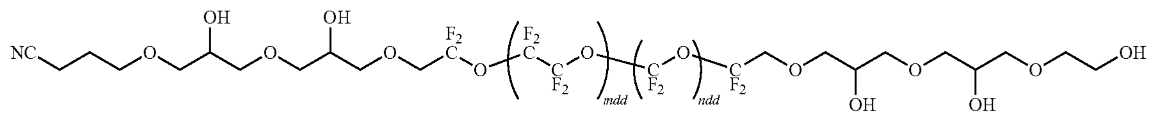

(XE1)

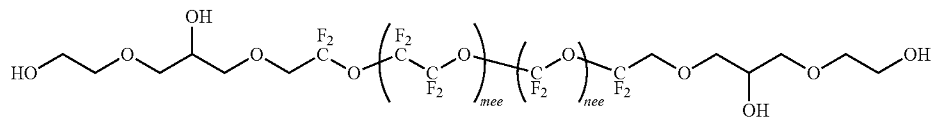

(XF1)

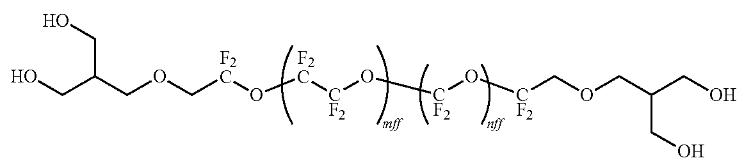

(XG1)

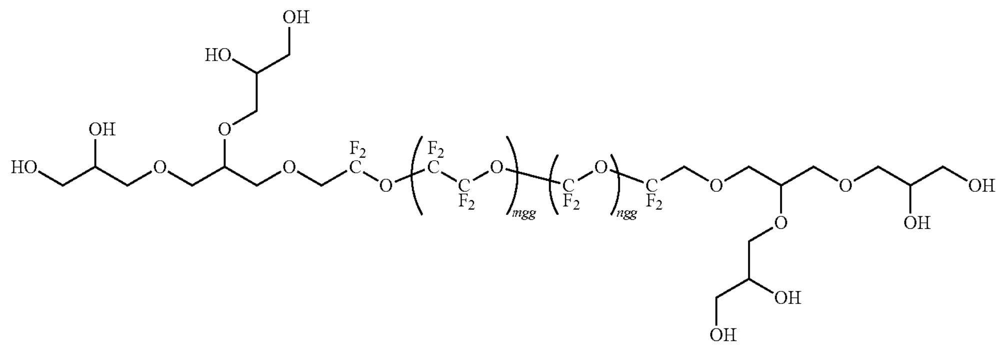

(in Formula (XA1), maa indicating the average degree of polymerization is 3.4 and naa indicating the average degree of polymerization is 3.4)

(in Formula (XB1), mbb indicating the average degree of polymerization is 3.4 and nbb indicating the average degree of polymerization is 3.4)

(in Formula (XC1), mcc indicating the average degree of polymerization is 3.4, and nce indicating the average degree of polymerization is 3.4)

(in Formula (XD1), mdd indicating the average degree of polymerization is 3.4 and ndd indicating the average degree of polymerization is 3.4)

(in Formula (XE1), mee indicating the average degree of polymerization is 3.4 and nee indicating the average degree of polymerization is 3.4)

(in Formula (XF1), mff indicating the average degree of polymerization is 3.4 and nff indicating the average degree of polymerization is 3.4)

(in Formula (XG1), mgg indicating the average degree of polymerization is 3.4 and ngg indicating the average degree of polymerization is 3.4)

Next, solutions for forming a lubricating layer were prepared using the compounds obtained in Examples 1 to 84 and Comparative Examples 1 to 7 by the following method. Then, using the obtained solutions for forming a lubricating layer, lubricating layers of the magnetic recording media were formed by the following method, and magnetic recording media of Examples 1 to 84 and Comparative Examples 1 to 7 were obtained.

[Solution for Forming Lubricating Layer]

The compounds obtained in Examples 1 to 84 and Comparative Examples 1 to 7 were each dissolved in a fluorine solvent VERTREL (registered trademark) XF (product name, commercially available from Du Pont-Mitsui Fluorochemicals Co., Ltd.), diluted with VERTREL XF so that the film thickness was 8.5 Å to 10 Å when applied onto the protective layer, and used as a solution for forming a lubricating layer in which the concentration of the compound was 0.001 mass % to 0.01 mass %.

[Magnetic Recording Medium]

An adhesive layer, a soft magnetic layer, a first underlayer, a second underlayer, a magnetic layer and a protective layer were sequentially provided on a substrate having a diameter of 65 mm. The protective layer was made of nitrogenated carbon.

The solutions for forming a lubricating layer of Examples 1 to 84 and Comparative Examples 1 to 7 were applied by the dipping method onto the protective layer of the substrate in which respective layers up to the protective layer were formed.

Then, the magnetic recording media to which the solution for forming a lubricating layer was applied were put into a thermostatic chamber at 120° C., and subjected to a thermal treatment for heating for 10 minutes. In this way, the lubricating layer was formed on the protective layer to obtain magnetic recording media of Examples 1 to 84 and Comparative Examples 1 to 7.

For the magnetic recording media of Examples 1 to 84 and Comparative Examples 1 to 7 obtained in this manner, by the following methods, the film thickness of the lubricating layer was measured, the adhesion (bond rate) between the lubricating layer and the protective layer was measured, the pickup characteristic test and the spin-off characteristic test were performed and evaluated. The results are shown in Table 1 to Table 5.

[Measurement of Film Thickness of Lubricating Layer]

Using a Fourier transform infrared spectrophotometer (FT-IR, product name: Nicolet iS50, commercially available from Thermo Fisher Scientific), the peak height of the C—F stretching vibration of the lubricating layer was measured. Then, using the correlation formula obtained by the following method, the film thickness of the lubricating layer was calculated from the measured value of the peak height of the C—F stretching vibration of the lubricating layer.

[Method of Calculating Correlation Formula]

A disk in which an adhesive layer, a soft magnetic layer, a first underlayer, a second underlayer, a magnetic layer and a protective layer were sequentially provided on a substrate having a diameter of 65 mm was prepared. A lubricating layer was formed on the protective layer of the disk with a film thickness of 6 to 20 Å (in increments of 2 Å).

Then, for each disk on which the lubricating layer was formed, the film thickness increment from the surface of the disk on which no lubricating layer was formed was measured using an ellipsometer, and used as the film thickness of the lubricating layer. In addition, for each disk on which the lubricating layer was formed, the peak height of the C—F stretching vibration was measured using FT-IR.

Then, a correlation formula between the peak height obtained by FT-IR and the film thickness of the lubricating layer obtained using an ellipsometer was obtained.

[Measurement of Adhesion (Bond Rate) Between Lubricating Layer and Protective Layer]

After the film thickness of the lubricating layer was measured by the above method, the magnetic recording medium in which the lubricating layer was formed was washed such that the magnetic recording medium was immersed in a solvent VERTREL XF for 10 minutes and then lifted. The speed at which the magnetic recording medium was immersed in a solvent was 10 mm/sec, and the lifting speed was 1.2 mm/sec. Then, the film thickness of the lubricating layer after immersion in the solvent was measured by the same method of measuring the film thickness of the lubricating layer performed before washing.

Then, the film thickness of the lubricating layer before washing was set as a, the film thickness of the lubricating layer after washing (after immersion in the solvent) was set as $\beta$, and the bonding rate (bond rate) of the lubricant was calculated from the ratio of $\alpha$ and $\beta$ $((\beta/\alpha)\times 100(\%))$. Using the calculated bond rate, based on the following criteria, the adhesion between the lubricating layer and the protective layer was evaluated.

The bond rate could be used as an index indicating the bonding force between the lubricating layer and the protective layer. If the adhesion between the lubricating layer and the protective layer was poor, a part of the fluorine-containing ether compound contained in the lubricating layer was eluted into VERTREL XF and washed away. Therefore, the film thickness of the lubricating layer after washing decreased and the bond rate decreased.

"Evaluation Criteria for Adhesion (Bond Rate)"

A (very good): bond rate of 75% or more

B (good): bond rate of 70% to 74%

C (acceptable): bond rate of 50% to 69%

D (poor): bond rate of 49% or less

[Pickup Characteristic Test]

A magnetic recording medium and a magnetic head were mounted on a spin stand, rotation was performed under a reduced pressure at room temperature (about 250 torr), and the magnetic head was floated at a fixed point for 10 minutes. Then, the surface of the magnetic head facing the magnetic recording medium was analyzed using an Electron Spectroscopy for Chemical Analysis (ESCA) analyzing device. The intensity of the fluorine-derived peak (signal intensity (a.u.)) obtained by analysis using the ESCA analyzing device indicated the amount of the lubricant adhered to the magnetic head. Using the obtained signal intensity, based on the following evaluation criteria, pickup characteristics were evaluated.

"Evaluation Criteria for Pickup Characteristics"

A (very good): signal intensity of 160 or less (very small adhesion amount)

B (good): signal intensity of 161 to 300 (small adhesion amount)

C (acceptable): signal intensity of 301 to 1,000 (large adhesion amount)

D (poor): signal intensity of 1,001 or more (very large adhesion amount)

[Spin-Off Characteristic Test]

A magnetic recording medium was mounted on a spin stand, and rotated under an environment of 80° C. and at a rotational speed of 10,000 rpm for 72 hours. Before and after this operation, the film thickness of the lubricating layer at a position with a radius of 20 mm from the center of the magnetic recording medium was measured using FT-IR, and the film thickness decrease ratio of the lubricating layer before and after the test was calculated. Using the calculated film thickness decrease ratio, based on the following evaluation criteria, spin-off characteristics were evaluated.

"Evaluation Criteria for Spin-Off Characteristics"

A (very good): film thickness decrease ratio of 2% or less

B (good): film thickness decrease ratio of more than 2% and 3% or less

C (acceptable): film thickness decrease ratio of more than 3% and 8% or less

D (poor): film thickness decrease ratio of more than 8%

From these results, based on the following evaluation criteria, comprehensive evaluation was performed.

"Comprehensive Evaluation"

A (very good): the bond rate, the pickup characteristics, and the spin-off characteristics were all evaluated as A.

B (good): the bond rate, the pickup characteristics, and the spin-off characteristics were evaluated as A or B, and one or more thereof were evaluated as B.

C (acceptable): one or more of the bond rate, the pickup characteristics, and the spin-off characteristics were evaluated as C, and there was no D.

D (poor): one or more of the bond rate, the pickup characteristics, and the spin-off characteristics were evaluated as D.

TABLE 1

| | Compound | Number-average molecular weight Mn PFPE chain | Number-average molecular weight Mn Whole molecule | PFPE ratio PFPE chain Mn/Whole molecule Mn | Film thickness (A) | Bond rate (%) | | Pickup characteristic signal intensity (a.u.) | | Spin-off characteristic film thickness decrease ratio (%) | | Comprehensive evaluation |
|---|---|---|---|---|---|---|---|---|---|---|---|---|
| Example 1 | (AA1) | 738 | 1253 | 0.59 | 9.0 | 81 | A | 121 | A | 1 | A | A |
| Example 2 | (AA2) | 738 | 1253 | 0.59 | 9.0 | 80 | A | 123 | A | 2 | A | A |
| Example 3 | (AA3) | 738 | 1253 | 0.59 | 9.0 | 78 | A | 134 | A | 2 | A | A |
| Example 4 | (AA4) | 738 | 1253 | 0.59 | 9.0 | 75 | A | 156 | A | 2 | A | A |
| Example 5 | (AB1) | 738 | 1281 | 0.58 | 9.0 | 79 | A | 131 | A | 2 | A | A |
| Example 6 | (AC1) | 738 | 1309 | 0.56 | 9.0 | 75 | A | 157 | A | 2 | A | A |
| Example 7 | (AD1) | 738 | 1267 | 0.58 | 9.0 | 79 | A | 131 | A | 2 | A | A |
| Example 8 | (AE1) | 738 | 1281 | 0.58 | 9.0 | 75 | A | 158 | A | 2 | A | A |
| Example 9 | (AF1) | 738 | 1327 | 0.56 | 9.0 | 83 | A | 109 | A | 1 | A | A |
| Example 10 | (AG1) | 738 | 1164 | 0.63 | 9.0 | 75 | A | 155 | A | 2 | A | A |
| Example 11 | (AH1) | 738 | 1178 | 0.63 | 9.0 | 76 | A | 142 | A | 2 | A | A |
| Example 12 | (AI1) | 738 | 1192 | 0.62 | 9.0 | 77 | A | 139 | A | 2 | A | A |
| Example 13 | (AJ1) | 738 | 1178 | 0.63 | 9.0 | 75 | A | 158 | A | 2 | A | A |
| Example 14 | (AK1) | 738 | 1239 | 0.60 | 9.0 | 81 | A | 113 | A | 1 | A | A |
| Example 15 | (AL1 ) | 738 | 1253 | 0.59 | 9.0 | 80 | A | 125 | A | 2 | A | A |
| Example 16 | (AM1) | 738 | 1253 | 0.59 | 9.0 | 81 | A | 121 | A | 1 | A | A |
| Example 17 | (AM2) | 738 | 1253 | 0.59 | 9.0 | 80 | A | 123 | A | 2 | A | A |
| Example 18 | (AM3) | 738 | 1253 | 0.59 | 9.0 | 78 | A | 134 | A | 2 | A | A |
| Example 19 | (AM4) | 738 | 1253 | 0.59 | 9.0 | 75 | A | 156 | A | 2 | A | A |

TABLE 2

| | Compound | Number-average molecular weight Mn PFPE chain | Number-average molecular weight Mn Whole molecule | PFPE ratio PFPE chain Mn/Whole molecule Mn | Film thickness (A) | Bond rate (%) | | Pickup characteristic signal intensity (a.u.) | | Spin-off characteristic film thickness decrease ratio (%) | | Comprehensive evaluation |
|---|---|---|---|---|---|---|---|---|---|---|---|---|
| Example 20 | (AN1) | 738 | 1281 | 0.58 | 9.0 | 80 | A | 131 | A | 2 | A | A |
| Example 21 | (AO1) | 738 | 1309 | 0.56 | 9.0 | 75 | A | 151 | A | 2 | A | A |
| Example 22 | (AP1) | 738 | 1341 | 0.55 | 9.0 | 77 | A | 134 | A | 2 | A | A |
| Example 23 | (AQ1) | 738 | 1208 | 0.61 | 9.0 | 75 | A | 159 | A | 2 | A | A |
| Example 24 | (AR1) | 738 | 1379 | 0.54 | 9.0 | 74 | B | 169 | B | 3 | B | B |
| Example 25 | (AS1) | 738 | 1435 | 0.51 | 9.0 | 72 | B | 195 | B | 3 | B | B |
| Example 26 | (AT1) | 738 | 1249 | 0.59 | 9.0 | 73 | B | 189 | B | 3 | B | B |
| Example 27 | (AU1) | 738 | 1365 | 0.54 | 9.0 | 74 | B | 171 | B | 3 | B | B |
| Example 28 | (AV1) | 738 | 1365 | 0.54 | 9.0 | 72 | B | 191 | B | 3 | B | B |
| Example 29 | (BA1) | 738 | 1224 | 0.60 | 9.0 | 82 | A | 117 | A | 1 | A | A |

TABLE 2-continued

| Compound | | Number-average molecular weight Mn PFPE chain | Whole molecule | PFPE ratio PFPE chain Mn/Whole molecule Mn | Film thickness (A) | Bond rate (%) | | Pickup characteristic signal intensity (a.u.) | | Spin-off characteristic film thickness decrease ratio (%) | | Comprehensive evaluation |
|---|---|---|---|---|---|---|---|---|---|---|---|---|
| Example 30 | (BA2) | 738 | 1224 | 0.60 | 9.0 | 80 | A | 124 | A | 2 | A | A |
| Example 31 | (BA3) | 738 | 1224 | 0.60 | 9.0 | 78 | A | 132 | A | 2 | A | A |
| Example 32 | (BA4) | 738 | 1224 | 0.60 | 9.0 | 75 | A | 155 | A | 2 | A | A |
| Example 33 | (BB1) | 738 | 1239 | 0.60 | 9.0 | 81 | A | 120 | A | 1 | A | A |
| Example 34 | (BC1) | 738 | 1253 | 0.59 | 9.0 | 80 | A | 124 | A | 2 | A | A |
| Example 35 | (BD1) | 738 | 1222 | 0.60 | 9.0 | 81 | A | 119 | A | 1 | A | A |
| Example 36 | (BE1) | 738 | 1250 | 0.59 | 9.0 | 79 | A | 121 | A | 2 | A | A |
| Example 37 | (BF1) | 738 | 1295 | 0.57 | 9.0 | 81 | A | 110 | A | 1 | A | A |
| Example 38 | (BG1) | 738 | 1279 | 0.58 | 9.0 | 79 | A | 121 | A | 2 | A | A |
| Example 39 | (BH1) | 738 | 1291 | 0.57 | 9.0 | 81 | A | 126 | A | 1 | A | A |

TABLE 3

| Compound | | Number-average molecular weight Mn PFPE chain | Whole molecule | PFPE ratio PFPE chain Mn/Whole molecule Mn | Film thickness (A) | Bond rate (%) | | Pickup characteristic signal intensity (a.u.) | | Spin-off characteristic film thickness decrease ratio (%) | | Comprehensive evaluation |
|---|---|---|---|---|---|---|---|---|---|---|---|---|
| Example 40 | (BI1) | 738 | 1286 | 0.57 | 9.0 | 78 | A | 141 | A | 2 | A | A |
| Example 41 | (BJ1) | 738 | 1252 | 0.59 | 9.0 | 81 | A | 115 | A | 1 | A | A |
| Example 42 | (BK1) | 738 | 1266 | 0.58 | 9.0 | 77 | A | 136 | A | 2 | A | A |
| Example 43 | (BL1) | 738 | 1198 | 0.62 | 9.0 | 80 | A | 114 | A | 2 | A | A |
| Example 44 | (BM1) | 738 | 1227 | 0.60 | 9.0 | 78 | A | 142 | A | 2 | A | A |
| Example 45 | (BN1) | 738 | 1266 | 0.58 | 9.0 | 77 | A | 131 | A | 2 | A | A |
| Example 46 | (BO1) | 738 | 1316 | 0.56 | 9.0 | 75 | A | 155 | A | 2 | A | A |
| Example 47 | (BP1) | 738 | 1243 | 0.59 | 9.0 | 77 | A | 138 | A | 2 | A | A |
| Example 48 | (BQ1) | 738 | 1269 | 0.58 | 9.0 | 77 | A | 145 | A | 2 | A | A |
| Example 49 | (BR1) | 738 | 1299 | 0.57 | 9.0 | 81 | A | 117 | A | 1 | A | A |
| Example 50 | (CA1) | 738 | 1154 | 0.64 | 9.0 | 84 | A | 100 | A | 1 | A | A |
| Example 51 | (CA2) | 738 | 1154 | 0.64 | 9.0 | 82 | A | 117 | A | 1 | A | A |
| Example 52 | (CA3) | 738 | 1154 | 0.64 | 9.0 | 81 | A | 128 | A | 1 | A | A |
| Example 53 | (CB1) | 738 | 1168 | 0.63 | 9.0 | 83 | A | 110 | A | 1 | A | A |
| Example 54 | (CB2) | 738 | 1168 | 0.63 | 9.0 | 81 | A | 124 | A | 1 | A | A |
| Example 55 | (CB3) | 738 | 1168 | 0.63 | 9.0 | 81 | A | 123 | A | 1 | A | A |
| Example 56 | (CC1) | 738 | 1182 | 0.62 | 9.0 | 81 | A | 129 | A | 1 | A | A |
| Example 57 | (CD1) | 738 | 1211 | 0.6 | 9.0 | 80 | A | 131 | A | 2 | A | A |

TABLE 3-continued

| Compound | | Number-average molecular weight Mn PFPE chain | Whole molecule | PFPE ratio PFPE chain Mn/Whole molecule Mn | Film thickness (A) | Bond rate (%) | | Pickup characteristic signal intensity (a.u.) | | Spin-off characteristic film thickness decrease ratio (%) | | Comprehensive evaluation |
|---|---|---|---|---|---|---|---|---|---|---|---|---|
| Example 58 | (CE1) | 738 | 1228 | 0.60 | 9.0 | 85 | A | 91 | A | 1 | A | A |
| Example 59 | (CF1) | 738 | 1243 | 0.59 | 9.0 | 85 | A | 98 | A | 1 | A | A |

TABLE 4

| Compound | | Number-average molecular weight Mn PFPE chain | Whole molecule | PFPE ratio PFPE chain Mn/Whole molecule Mn | Film thickness (A) | Bond rate (%) | | Pickup characteristic signal intensity (a.u.) | | Spin-off characteristic film thickness decrease ratio (%) | | Comprehensive evaluation |
|---|---|---|---|---|---|---|---|---|---|---|---|---|
| Example 60 | (CG1) | 738 | 1110 | 0.66 | 9.0 | 82 | A | 121 | A | 1 | A | A |
| Example 61 | (CG2) | 738 | 1110 | 0.66 | 9.0 | 81 | A | 126 | A | 1 | A | A |
| Example 62 | (CG3) | 738 | 1110 | 0.66 | 9.0 | 80 | A | 132 | A | 2 | A | A |
| Example 63 | (CH1) | 738 | 1124 | 0.66 | 9.0 | 83 | A | 108 | A | 1 | A | A |
| Example 64 | (CH2) | 738 | 1124 | 0.66 | 9.0 | 82 | A | 118 | A | 1 | A | A |
| Example 65 | (CH3) | 738 | 1124 | 0.66 | 9.0 | 80 | A | 133 | A | 2 | A | A |
| Example 66 | (CI1) | 738 | 1138 | 0.65 | 9.0 | 82 | A | 116 | A | 1 | A | A |
| Example 67 | (CJ1) | 738 | 1152 | 0.64 | 9.0 | 81 | A | 120 | A | 1 | A | A |
| Example 68 | (CK1) | 738 | 1166 | 0.63 | 9.0 | 79 | A | 135 | A | 2 | A | A |
| Example 69 | (CL1) | 738 | 1184 | 0.62 | 9.0 | 84 | A | 101 | A | 1 | A | A |
| Example 70 | (CM1) | 738 | 1198 | 0.62 | 9.0 | 84 | A | 105 | A | 1 | A | A |
| Example 71 | (CN1) | 738 | 1212 | 0.61 | 9.0 | 83 | A | 109 | A | 1 | A | A |
| Example 72 | (CO1) | 738 | 1227 | 0.60 | 9.0 | 82 | A | 115 | A | 1 | A | A |
| Example 73 | (CP1) | 738 | 1168 | 0.63 | 9.0 | 82 | A | 117 | A | 1 | A | A |
| Example 74 | (CQ1) | 738 | 1243 | 0.59 | 9.0 | 85 | A | 97 | A | 1 | A | A |
| Example 75 | (CR1) | 738 | 1066 | 0.69 | 9.0 | 79 | A | 125 | A | 2 | A | A |
| Example 76 | (CS1) | 738 | 1080 | 0.68 | 9.0 | 83 | A | 110 | A | 1 | A | A |
| Example 77 | (CT1) | 738 | 1154 | 0.64 | 9.0 | 84 | A | 102 | A | 1 | A | A |
| Example 78 | (DA1) | 738 | 1273 | 0.58 | 9.0 | 85 | A | 91 | A | 1 | A | A |
| Example 79 | (DB1) | 738 | 1096 | 0.67 | 9.0 | 82 | A | 114 | A | 1 | A | A |

TABLE 5

| | Compound | Number-average molecular weight Mn PFPE chain | Number-average molecular weight Mn Whole molecule | PFPE ratio PFPE chain Mn/Whole molecule Mn | Film thickness (A) | Bond rate (%) | | Pickup characteristic signal intensity (a.u.) | | Spin-off characteristic film thickness decrease ratio (%) | | Comprehensive evaluation |
|---|---|---|---|---|---|---|---|---|---|---|---|---|
| Example 80 | (DC1) | 738 | 1124 | 0.66 | 9.0 | 85 | A | 95 | A | 1 | A | A |
| Example 81 | (DD1) | 738 | 1273 | 0.58 | 9.0 | 83 | A | 111 | A | 1 | A | A |
| Example 82 | (DE1) | 738 | 1184 | 0.62 | 9.0 | 84 | A | 102 | A | 1 | A | A |
| Example 83 | (DF1) | 738 | 1198 | 0.62 | 9.0 | 84 | A | 100 | A | 1 | A | A |
| Example 84 | (DG1) | 738 | 1198 | 0.62 | 9.0 | 83 | A | 109 | A | 1 | A | A |
| Comparative Example 1 | (XA1) | 738 | 1208 | 0.61 | 9.0 | 61 | C | 3034 | D | 26 | D | D |
| Comparative Example 2 | (XB1) | 738 | 1106 | 0.67 | 9.0 | 56 | C | 3621 | D | 28 | D | D |
| Comparative Example 3 | (XC1) | 738 | 1241 | 0.59 | 9.0 | 68 | C | 512 | C | 9 | D | D |
| Comparative Example 4 | (XD1) | 738 | 1207 | 0.61 | 9.0 | 67 | C | 698 | C | 11 | D | D |
| Comparative Example 5 | (XE1) | 738 | 1036 | 0.71 | 9.0 | 61 | C | 1024 | D | 21 | D | D |
| Comparative Example 6 | (XF1) | 738 | 976 | 0.76 | 9.0 | 55 | C | 2986 | D | 25 | D | D |
| Comparative Example 7 | (XG1) | 738 | 1244 | 0.59 | 9.0 | 65 | C | 811 | C | 9 | D | D |

As shown in Table 1 to Table 5, in the magnetic recording media of Examples 1 to 84 in which the lubricating layer was formed using the fluorine-containing ether compound represented by Formula (1), the bond rate, the pickup characteristics, and the spin-off characteristics were all evaluated as A (very good) or B (good), and the comprehensive evaluation was A (very good) or B (good).

On the other hand, in the magnetic recording media of Comparative Examples 1 to 7 having no -[C]-[D]-$R^3$ structure in the fluorine-containing ether compound represented by Formula (1), all of the results of the bond rate, the pickup characteristics, and the spin-off characteristics were evaluated as being inferior to those of the magnetic recording media of Examples 1 to 84.

In the compound (XF1) of Comparative Example 6, terminal groups having two primary hydroxyl groups were arranged at both molecular terminals, but there were no divalent linking groups corresponding to the -[B]-[A]-structure and the -[C]-[D]-structure in the fluorine-containing ether compound represented by Formula (1). Therefore, it was inferred that the compound (XF1) of Comparative Example 6 had a weaker adsorption force to the protective layer than the compounds of Examples 1 to 84.

In addition, similarly, for the compound (XG1) of Comparative Example 7, terminal groups having two primary hydroxyl groups were arranged at both molecular terminals, but there were no divalent linking groups corresponding to the -[B]-[A]-structure and the -[C]-[D]-structure, and thus it was inferred that it had a weaker adsorption force to the protective layer than the compounds of Examples 1 to 84.

INDUSTRIAL APPLICABILITY

A fluorine-containing ether compound is provided that allows a lubricating layer to be formed which has favorable adhesion to a protective layer and can prevent the occurrence of pickup and spin-off and is suitably used as a material of a lubricant for a magnetic recording medium.

REFERENCE SIGNS LIST

10 Magnetic recording medium
11 Substrate
12 Adhesive layer
13 Soft magnetic layer
14 First underlayer
15 Second underlayer
16 Magnetic layer
17 Protective layer
18 Lubricating layer

The invention claimed is:

1. A fluorine-containing ether compound represented by Formula (1) shown below:

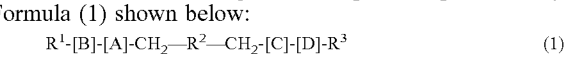

$$R^1\text{-[B]-[A]-}CH_2\text{—}R^2\text{—}CH_2\text{-[C]-[D]-}R^3 \quad (1)$$

(in Formula (1), $R^2$ is a perfluoropolyether chain; [A] is represented by Formula (2-1) shown below, and in Formula (2-1), a is an integer of 0 to 3; [B] is represented by Formula (2-2) shown below, and in Formula (2-2), b is an integer of 0 to 3, and c is an integer of 2 to 5; provided that, a sum of values of a and b is 1 to 3; in Formula (1), [A] and [B] may be interchanged; [C] is represented by Formula (3-1) shown below, and in Formula (3-1), d is an integer of 0 to 2; [D] is represented by Formula (3-2) shown below, and in Formula (3-2), e is an integer of 0 to 2, and f is an integer of 2 to 5; provided that, a sum of values of d and e is 1 or 2; in Formula (1), [C] and [D] may be interchanged; $R^3$ is a branched terminal group having 3 to 30 carbon atoms and represented by Formula (4) shown below; in Formula (4), L represents an integer of 0 to 6; in Formula (4), $Y^1$ and $Y^2$ are each independently a hydrocarbon group containing one primary hydroxyl group and optionally containing an ether oxygen atom; in Formula (4), $Y^3$ is a hydrogen atom or a hydrocarbon group containing one primary hydroxyl group and optionally containing an ether oxygen atom; and $R^1$ and $R^3$ are terminal groups which may be the same or may be different from each other)

(2-1)

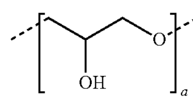

-continued (2-2)

(3-1)

(3-2)

(4)

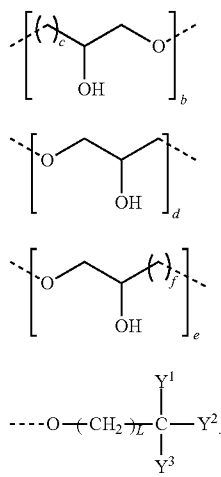

2. The fluorine-containing ether compound according to claim 1, wherein, in Formula (1), $R^3$ is a branched terminal group of any of Formulae (5-1) to (5-3) shown below:

(5-1)

(5-2)

(5-3)

(6)

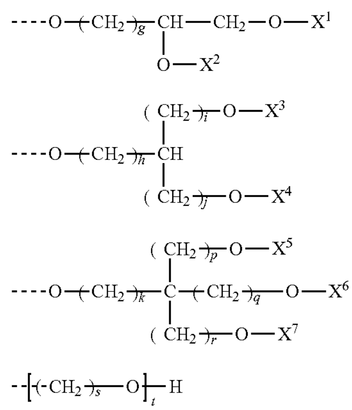

(in Formula (5-1), g represents an integer of 1 to 6; $X^1$ and $X^2$ are represented by Formula (6); and $X^1$ and $X^2$ may be the same or may be different from each other)

(in Formula (5-2), h represents an integer of 0 to 6; i and j each independently represents an integer of 1 to 6; $X^3$ and $X^4$ are a hydrogen atom or represented by Formula (6); and $X^3$ and $X^4$ may be the same or may be different from each other)

(in Formula (5-3), k represents an integer of 0 to 6; p, q and r each independently represents an integer of 1 to 6; $X^5$, $X^6$ and $X^7$ are a hydrogen atom or represented by Formula (6); $X^5$, $X^6$ and $X^7$ may be different from each other, or some or all of them may be the same)

(in Formula (6), s represents an integer of 2 to 6, and t represents 1 or 2).

3. The fluorine-containing ether compound according to claim 1, wherein, in Formula (1), $R^1$ is a branched terminal group having 3 to 30 carbon atoms, and represented by Formula (4).

4. The fluorine-containing ether compound according to claim 2, wherein, in Formula (1), both $R^1$ and $R^3$ are a branched terminal group of any of Formulae (5-1) to (5-3).

5. The fluorine-containing ether compound according to claim 1, wherein, in Formula (1), $R^1$-[B]-[A]- and -[C]-[D]-$R^3$ are the same.

6. The fluorine-containing ether compound according to claim 1, wherein $R^1$ in Formula (1) is represented by Formula (7) shown below:

(7)

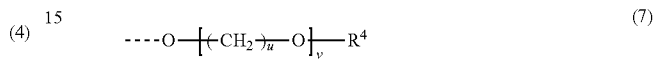

(in Formula (7), u represents an integer of 2 to 6, v represents 0 or 1; $R^4$ is any of a hydrogen atom, an alkyl group which may have a substituent containing no hydroxyl group, and an organic group having at least one double bond or triple bond; and the alkyl group and the organic group may be linear or branched).

7. The fluorine-containing ether compound according to claim 6, wherein $R^4$ in Formula (7) is an alkyl group having 1 to 6 carbon atoms.

8. The fluorine-containing ether compound according to claim 6, wherein $R^4$ in Formula (7) is an alkyl group having a substituent and having 1 to 6 carbon atoms, and the substituent is a fluoro group or a cyano group.

9. The fluorine-containing ether compound according to claim 6, wherein $R^4$ in Formula (7) is any of an aromatic hydrocarbon-containing organic group having 6 to 12 carbon atoms, an aromatic heterocycle-containing organic group having 3 to 10 carbon atoms, an alkenyl group having 2 to 8 carbon atoms, and an alkynyl group having 3 to 8 carbon atoms.

10. The fluorine-containing ether compound according to claim 6, wherein $R^4$ in Formula (7) is one group selected from a group consisting of a methyl group, ethyl group, n-propyl group, isopropyl group, 2,2,2-trifluoroethyl group, 2,2,3,3,3-pentafluoropropyl group, 2,2,2,2,2,2-hexafluoroisopropyl group, 2-cyanoethyl group, 3-cyanopropyl group, 4-cyanobutyl group, phenyl group, methoxyphenyl group, cyanophenyl group, phenethyl group, thienylethyl group, N-methylpyrazolylmethyl group, allyl group, 3-butenyl group, 4-pentenyl group, propargyl group, 3-butynyl group, and 4-pentynyl group.

11. The fluorine-containing ether compound according to claim 6, wherein $R^4$ in Formula (7) is a hydrogen atom.

12. The fluorine-containing ether compound according to claim 1, wherein $R^2$ in Formula (1) is any one of Formulae (8-1) to (8-4) shown below:

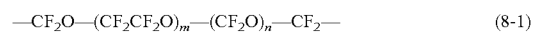

$$-CF_2O-(CF_2CF_2O)_m-(CF_2O)_n-CF_2- \quad (8\text{-}1)$$

(in Formula (8-1), m and n indicate an average degree of polymerization, and each are 0 to 30, provided that m or n is 0.1 or more)

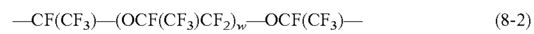

$$-CF(CF_3)-(OCF(CF_3)CF_2)_w-OCF(CF_3)- \quad (8\text{-}2)$$

(in Formula (8-2), w indicates an average degree of polymerization, and is 0.1 to 30)

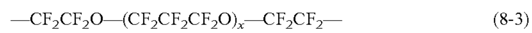

$$—CF_2CF_2O—(CF_2CF_2CF_2O)_x—CF_2CF_2— \quad (8\text{-}3)$$

(in Formula (8-3), x indicates an average degree of polymerization, and is 0.1 to 30)

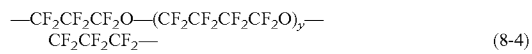

$$—CF_2CF_2CF_2O—(CF_2CF_2CF_2CF_2O)_y—CF_2CF_2CF_2— \quad (8\text{-}4)$$

(in Formula (8-4), y indicates an average degree of polymerization, and is 0.1 to 30).

13. The fluorine-containing ether compound according to claim 1, wherein the number-average molecular weight thereof is in a range of 500 to 10,000.

14. A lubricant for a magnetic recording medium, comprising the fluorine-containing ether compound according to claim 1.

15. A magnetic recording medium comprising, on a substrate, at least a magnetic layer, a protective layer, and a lubricating layer in this order, wherein the lubricating layer contains the fluorine-containing ether compound according to claim 1.

16. The magnetic recording medium according to claim 15, wherein the lubricating layer has an average film thickness of 0.5 nm to 2.0 nm.

* * * * *